US010108390B2

(12) United States Patent
Liu et al.

(10) Patent No.: US 10,108,390 B2
(45) Date of Patent: *Oct. 23, 2018

(54) METHODS, SYSTEMS, AND MEDIA FOR PRESENTING REQUESTED CONTENT ON PUBLIC DISPLAY DEVICES

(71) Applicant: Google LLC, Mountain View, CA (US)

(72) Inventors: Eric H C Liu, Redwood City, CA (US); Kenneth Wayne Dauber, Palo Alto, CA (US); Michel Weksler, El Cerrito, CA (US); Jeremy Lyon, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/837,831

(22) Filed: Dec. 11, 2017

(65) Prior Publication Data
US 2018/0113670 A1    Apr. 26, 2018

Related U.S. Application Data

(63) Continuation of application No. 14/575,688, filed on Dec. 18, 2014, now Pat. No. 9,841,939.

(51) Int. Cl.
H04W 24/00    (2009.01)
G06F 3/14    (2006.01)
(Continued)

(52) U.S. Cl.
CPC ....... *G06F 3/1454* (2013.01); *G06Q 30/0267* (2013.01); *G06Q 30/0269* (2013.01);
(Continued)

(58) Field of Classification Search
USPC ........................................... 705/14.49, 14.58
See application file for complete search history.

(56) References Cited

U.S. PATENT DOCUMENTS 6,571,279 B1    5/2003    Herz et al.
7,191,338 B2    3/2007    Stern et al.
(Continued)

FOREIGN PATENT DOCUMENTS

EP    1158821    11/2001
EP    2704085    3/2014
(Continued)

OTHER PUBLICATIONS

Debevc et al., "Adaptive Bar Implementation and Ergonomics", In Informatica, vol. 18, No. 3, Oct. 1, 1994, pp. 357-366.
(Continued)

*Primary Examiner* — David Q Nguyen
(74) *Attorney, Agent, or Firm* — Byrne Poh LLP

(57) ABSTRACT

Methods, systems, and media for presenting requested content on public display devices are provided. In some implementations a method for presenting content on a display device is provided, the method comprising: receiving a request from a mobile device to present content, including image data, on a display device; receiving a graphical representation associated with a user; receiving location information associated with the mobile device; receiving display device information associated with display devices, including location information associated with that display device; selecting, without user input, a first display device on which to present the content based on the location information associated with the mobile device and the location information associated with each of the plurality of display devices; and in response to selecting the first display device, causing both the graphical representation associated with the user of the mobile device and the content to be presented by the first display device.

21 Claims, 21 Drawing Sheets

(51) Int. Cl.
*G06Q 30/02* (2012.01)
*G09G 5/12* (2006.01)
*G09G 5/00* (2006.01)
*H04L 29/08* (2006.01)
*H04W 4/02* (2018.01)
*H04W 4/021* (2018.01)

(52) U.S. Cl.
CPC ............ *G09G 5/005* (2013.01); *G09G 5/12* (2013.01); *H04L 67/20* (2013.01); *H04W 4/02* (2013.01); *H04W 4/021* (2013.01); *G09G 2340/0442* (2013.01); *G09G 2370/022* (2013.01); *G09G 2370/16* (2013.01); *G09G 2370/22* (2013.01); *G09G 2380/06* (2013.01)

(56) References Cited

U.S. PATENT DOCUMENTS

| | | | |
|---|---|---|---|
| 7,920,849 | B2 | 4/2011 | Pop |
| 8,073,460 | B1 | 12/2011 | Scofield et al. |
| 8,126,774 | B2 | 2/2012 | Hendrickson |
| 8,239,764 | B2 | 8/2012 | Pong et al. |
| 8,356,251 | B2 | 1/2013 | Strober |
| 8,411,655 | B2 | 4/2013 | Khare et al. |
| 8,462,949 | B2 | 6/2013 | Anderson et al. |
| 8,507,755 | B2 | 8/2013 | Block et al. |
| 8,516,393 | B2 | 8/2013 | Davis |
| 8,655,891 | B2 | 2/2014 | Ramer et al. |
| 9,841,939 | B2* | 12/2017 | Liu ............... G06F 3/1454 |
| 2002/0008626 | A1 | 1/2002 | Waters et al. |
| 2009/0079765 | A1 | 3/2009 | Hoover |
| 2009/0267867 | A1 | 10/2009 | Gonia |
| 2011/0035282 | A1 | 2/2011 | Spatscheck et al. |
| 2011/0205435 | A1 | 8/2011 | Lee et al. |
| 2011/0283334 | A1 | 11/2011 | Choi et al. |
| 2012/0206319 | A1 | 8/2012 | Lucero et al. |
| 2012/0221657 | A1 | 8/2012 | Zeevi et al. |
| 2012/0272145 | A1 | 10/2012 | Ryan et al. |
| 2013/0103446 | A1 | 4/2013 | Bragdon et al. |
| 2013/0103943 | A1 | 4/2013 | Hirsch et al. |
| 2013/0113993 | A1 | 5/2013 | Dagit |
| 2013/0117121 | A1 | 5/2013 | Raman et al. |
| 2013/0143651 | A1 | 6/2013 | Harrison et al. |
| 2013/0169755 | A1 | 7/2013 | Choo et al. |
| 2013/0254023 | A1* | 9/2013 | Krantz ............ G06Q 30/02 705/14.49 |
| 2013/0268357 | A1 | 10/2013 | Heath |
| 2013/0304817 | A1 | 11/2013 | Hu et al. |
| 2014/0067549 | A1 | 3/2014 | Park et al. |
| 2014/0085179 | A1 | 3/2014 | Krig et al. |
| 2014/0164940 | A1 | 6/2014 | Fisher |
| 2014/0195972 | A1 | 7/2014 | Lee et al. |
| 2014/0335897 | A1 | 11/2014 | Clem et al. |
| 2015/0089438 | A1 | 3/2015 | Wu et al. |
| 2016/0063559 | A1* | 3/2016 | Hargrove ........ G06Q 30/0261 705/14.58 |
| 2017/0371608 | A1* | 12/2017 | Wasserman ........... G06F 3/14 |
| 2018/0032997 | A1* | 2/2018 | Gordon ............ G06Q 20/3224 |

FOREIGN PATENT DOCUMENTS

| | | |
|---|---|---|
| EP | 2747393 | 6/2014 |
| WO | WO/2002/029665 | 4/2002 |
| WO | WO/2002/071285 | 9/2002 |
| WO | WO/2012/080790 | 6/2012 |

OTHER PUBLICATIONS

Holleis et al., "Advertising with NFC", In Proceedings of Workshop on Pervasive Advertising and Shopping, in Conjunction With the 8th International Conference on Pervasive Computing, Helsinki, FI, May 17-20, 2010.
International Preliminary Report on Patentability dated Jun. 20, 2017 in International Patent Application No. PCT/US2015/059,769.
International Preliminary Report on Patentability dated Jun. 20, 2017 in International Patent Application No. PCT/US2015/059,773.
International Preliminary Report on Patentability dated Jun. 20, 2017 in International Patent Application No. PCT/US2015/059,779.
International Preliminary Report on Patentability dated Jun. 20, 2017 in International Patent Application No. PCT/US2015/059,783.
International Search Report & Written Opinion of the International Search Authority dated Jan. 17, 2016 in International Patent Application No. PCT/US2015/059773.
International Search Report & Written Opinion of the International Search Authority dated Feb. 8, 2016 in International Patent Application No. PCT/US2015/059783.
International Search Report & Written Opinion of the International Search Authority dated Feb. 19, 2016 in International Patent Application No. PCT/US2015/059769.
International Search Report & Written Opinion of the International Search Authority dated Apr. 11, 2016 in International Patent Application No. PCT/US2015/059779.
Notice of Allowance dated Aug. 7, 2017 in U.S. Appl. No. 14/575,688.
Notice of Allowance dated Oct. 23, 2017 in U.S. Appl. No. 14/575,603.
Office Action dated Feb. 10, 2017 in U.S. Appl. No. 14/575,655.
Office Action dated Feb. 10, 2017 in U.S. Appl. No. 14/575,603.
Office Action dated Apr. 28, 2017 in U.S. Appl. No. 14/575,688.
Office Action dated May 1, 2017 in U.S. Appl. No. 14/575,630.
Office Action dated May 18, 2017 in U.S. Appl. No. 14/575,603.
Office Action dated Jun. 9, 2017 in U.S. Appl. No. 14/575,655.
Office Action dated Aug. 28, 2017 in U.S. Appl. No. 14/575,630.
Office Action dated Oct. 3, 2016 in U.S. Appl. No. 14/575,630.
Office Action dated Dec. 1, 2016 in U.S. Appl. No. 14/575,603.
Examination Report dated Jan. 20, 2017 in UK Patent Application No. 1621677.2.
Examination Report dated Feb. 22, 2018 in UK patent Application No. 1621677.2.
Examination Report dated Nov. 29, 2017 in UK Patent Application No. 1621677.2.
Notice of Allowance dated Dec. 29, 2017 in U.S. Appl. No. 14/575,630.
Office Action dated Aug. 27, 2018 in U.S. Appl. No. 15/972,936, pp. 1-39.
Examination Report dated Aug. 28, 2018 in UK Patent Application No. 1621677.2, pp. 1-3.

* cited by examiner

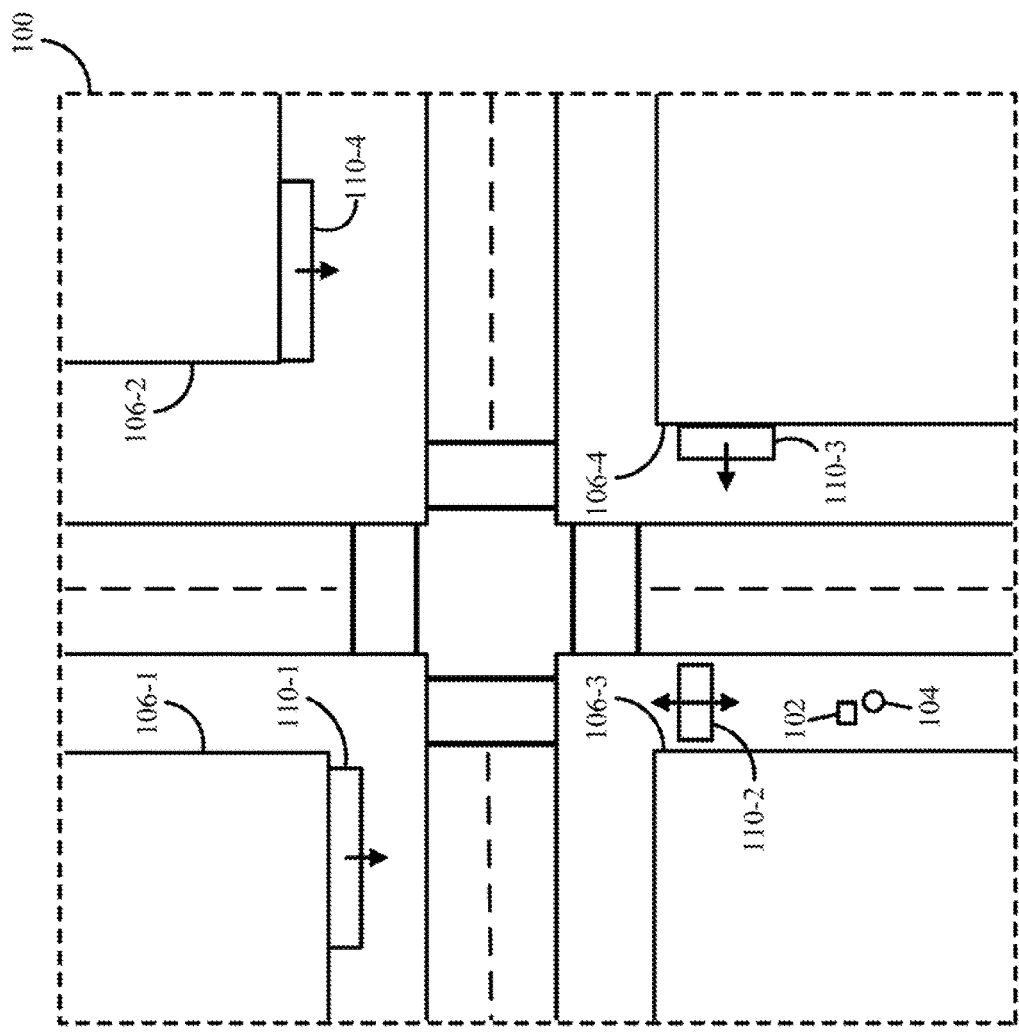
FIG. 1
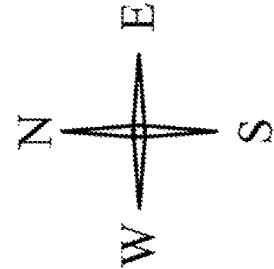

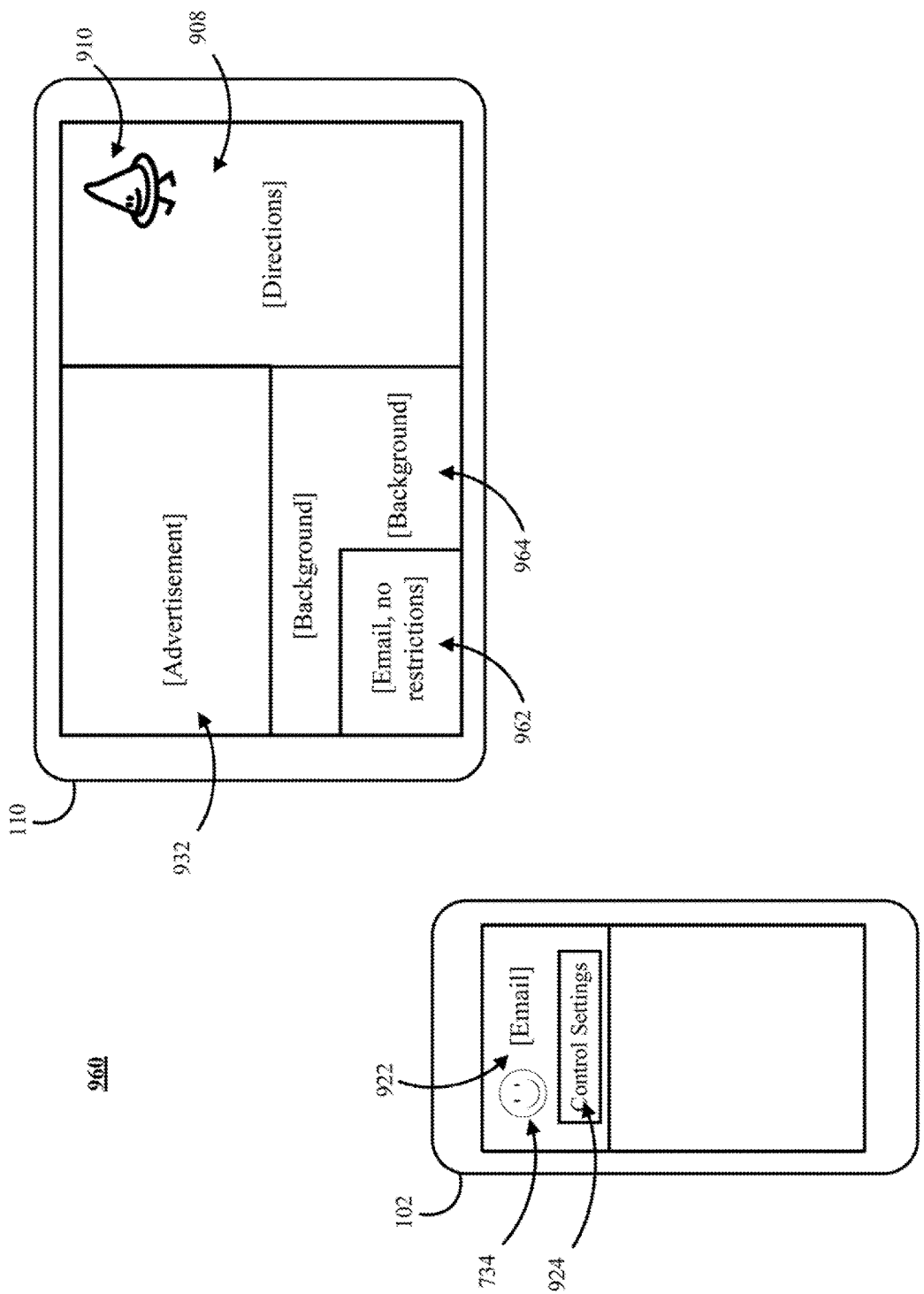

METHODS, SYSTEMS, AND MEDIA FOR PRESENTING REQUESTED CONTENT ON PUBLIC DISPLAY DEVICES

CROSS-REFERENCE TO RELATED APPLICATION

This application is a continuation of U.S. patent application Ser. No. 14/575,688, filed Dec. 18, 2014, which is hereby incorporated by reference herein in its entirety.

This application is related to U.S. patent application Ser. No. 14/575,655, filed Dec. 18, 2014, U.S. patent application Ser. No. 14/575,603, filed Dec. 18, 2014, and U.S. patent application Ser. No. 14/575,630, filed Dec. 18, 2014, each of which is incorporated by reference herein in its entirety.

TECHNICAL FIELD

The disclosed subject matter relates to methods, systems, and media for presenting requested content on public display devices.

BACKGROUND

Devices such as smartphones, tablet computers and wearable computers are becoming ubiquitous and indispensable tools used by many people to access information from a wide variety of sources. For example, many people use a smartphone for accessing email, navigation, exchanging messages with others, reading, and performing many other functions. However, these user devices often have relatively small screens and may be difficult or cumbersome to use and/or access when walking, driving, bicycling, etc. Additionally, the small screens associated with these devices can make certain tasks, such as reading a detailed map of an area, difficult due to the small amount of the detailed map that can be presented at one time.

Accordingly, it is desirable to provide methods, systems, and media for presenting requested content on public display devices.

SUMMARY

In accordance with various implementations of the disclosed subject matter, methods, systems, and media for presenting requested content on public screens are provided.

In accordance with some implementations of the disclosed subject matter, a method for presenting content on a public display device is provided, the method comprising: receiving, using a hardware processor, a request from a mobile device to present content on a display device, wherein the content includes image data; receiving a graphical representation associated with a user of the mobile device; receiving location information associated with the mobile device; receiving display device information associated with each of a plurality of display devices, wherein the display device information associated with each of the plurality of display devices includes location information associated with that display device and an indication that the display device is configured to present content associated with the mobile device; selecting, without user input, a first display device of the plurality of display devices on which to present the content based at least in part on the location information associated with the mobile device and the location information associated with each of the plurality of display devices; and in response to selecting the first display device, causing both the graphical representation associated with the user of the mobile device and at least a portion of the content to be presented by the first display device.

In accordance with some implementations of the disclosed subject matter, a system for presenting content on a public display device is provided, the system comprising: at least one hardware processor that is programmed to: receive a request from a mobile device to present content on a display device, wherein the content includes image data; receive a graphical representation associated with a user of the mobile device; receive location information associated with the mobile device; receive display device information associated with each of a plurality of display devices, wherein the display device information associated with each of the plurality of display devices includes location information associated with that display device and an indication that the display device is configured to present content associated with the mobile device; select, without user input, a first display device of the plurality of display devices on which to present the content based at least in part on the location information associated with the mobile device and the location information associated with each of the plurality of display devices; and in response to selecting the first display device, cause both the graphical representation associated with the user of the mobile device and at least a portion of the content to be presented by the first display device.

In accordance with some implementations of the disclosed subject matter, a non-transitory computer-readable medium containing computer executable instructions that, when executed by a processor, cause the processor to perform a method for presenting content on a public display device is provided, the method comprising: receiving a request from a mobile device to present content on a display device, wherein the content includes image data; receiving a graphical representation associated with a user of the mobile device; receiving location information associated with the mobile device; receiving display device information associated with each of a plurality of display devices, wherein the display device information associated with each of the plurality of display devices includes location information associated with that display device and an indication that the display device is configured to present content associated with the mobile device; selecting, without user input, a first display device of the plurality of display devices on which to present the content based at least in part on the location information associated with the mobile device and the location information associated with each of the plurality of display devices; and in response to selecting the first display device, causing both the graphical representation associated with the user of the mobile device and at least a portion of the content to be presented by the first display device.

In accordance with some implementations of the disclosed subject matter, a system for presenting content on a public display device is provided, the system comprising: means for receiving a request from a mobile device to present content on a display device, wherein the content includes image data; means for receiving a graphical representation associated with a user of the mobile device; means for receiving location information associated with the mobile device; means for receiving display device information associated with each of a plurality of display devices, wherein the display device information associated with each of the plurality of display devices includes location information associated with that display device and an indication that the display device is configured to present content associated with the mobile device; means for selecting, without user input, a first display device of the plurality of display devices on which to present the content based at least in part on the location information associated with the mobile device and the location information associated with each of the plurality of display devices; and means for causing both the graphical representation associated with the user of the mobile device and at least a portion of the content to be presented by the first display device, wherein the means for causing is responsive to selecting the first display device.

In some implementations, the system further comprises means for determining an address associated with the content, wherein causing at least a portion of the content to be presented on the first display device comprises communicating the address to the first display device with instructions to retrieve and present content using the address.

In some implementations, the system further comprises: means for receiving updated location information associated with the mobile device; means for selecting, without user input, a second display device of the plurality of display devices on which to present at least a portion of the content based at least in part on the updated location information associated with the mobile device and the location information associated with each of the plurality of display devices; means for causing both the graphical representation associated with the user of the mobile device and at least a portion of the content to be presented by the second display device, wherein the means for causing is responsive to selecting the second display device; and means for inhibiting presentation of the graphical representation associated with the user of the mobile device and presentation of the content by the first display device, wherein the means for inhibiting presentation is responsive to selecting the second display device.

In some implementations, the system further comprises: means for receiving updated location information associated with the mobile device; means for determining that the mobile device has moved closer with respect to the first display device based at least in part on the updated location information associated with the mobile device and location information associated with the first display device; and means for causing the graphical representation associated with the user of the mobile device to be presented by the first display device at a size that is smaller than a size at which the graphical representation was originally presented, wherein the means for causing is responsive to determining that the mobile device has moved closer to the first display device.

In some implementations, the system further comprises: determining an initial control setting to be used in determining whether to present personal information on a first display device of the plurality of display devices based at least in part on the display information associated with the first display device; and controlling presentation of personal information associated with the content based on the initial setting.

In some implementations, the display device information associated with the first display device includes information indicating a number of potential observers detected to be in a viewable area associated with the first display device.

In some implementations, the determination of the initial control setting is further based on a distance determined based on the location information associated with the mobile device and the location information associated with the first display device.

In some implementations, the system further comprises: means for receiving an indication of an updated control level from the mobile device; means for determining an updated control setting based at least in part on the updated control level and the initial control setting; and means for controlling presentation of personal information associated with the content based on the updated control setting.

In some implementations, the system further comprises: means for determining that the content is associated with an application; means for determining that presentation of content associated with the application is permitted based on user settings associated with the mobile device, wherein the means for determining is responsive to determining that the content is associated with the application; and means for causing the first portion of the content to be presented, wherein the means for causing is responsive to determining that presentation of content associated with the application is permitted.

In some implementations, the system further comprises: means for selecting, without user input, a second display device of the plurality of display devices on which to present the content based at least in part on the location information associated with the mobile device and the location information associated with each of the plurality of display devices; means for determining at least a second portion of the content that is to be presented using the second display device based on a comparison of the location information associated with the first display device and the location information associated with the second device, wherein the second portion of the content is different than the first portion of the content; and means for causing both the graphical representation associated with the user of the mobile device and the second portion of the content to be presented by the second display device, wherein the means for causing is responsive to selecting the second display device.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 1 shows an example of a portion of a system for presenting requested content on public display devices in accordance with some implementations of the disclosed subject matter.

FIGS. 9A-9F show examples of a user interface for setting control settings and content presented by a public display device in accordance with the control settings in accordance with some implementations of the disclosed subject matter.

DETAILED DESCRIPTION

Figure 2:
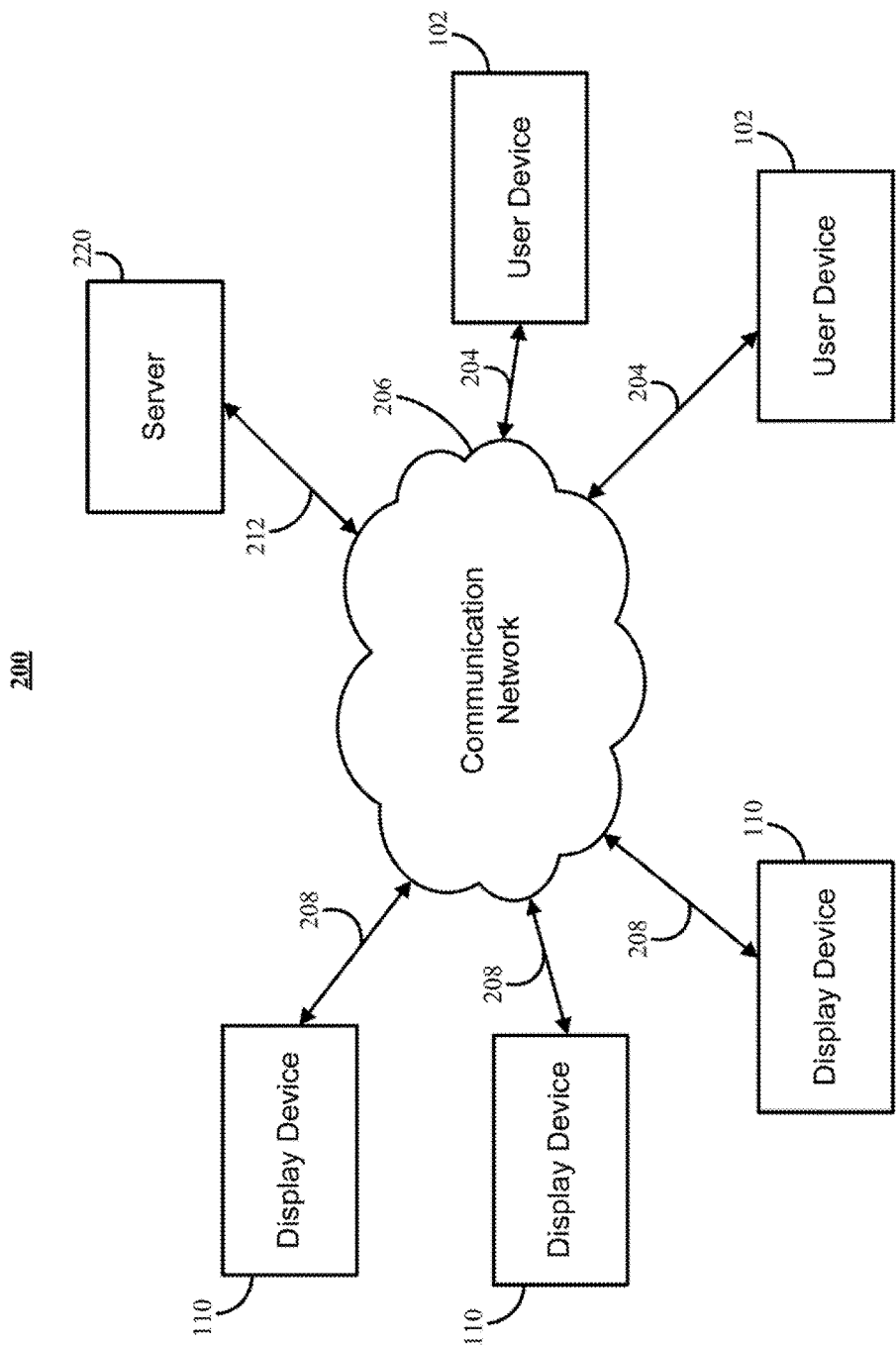
FIG. 2 shows an example of a generalized schematic diagram of a system on which the mechanisms for presenting requested content on public display devices as described herein can be implemented in accordance with some implementations.

In accordance with various implementations, mechanisms (which can include methods, systems, and/or media) for presenting requested content on public display devices are provided.

In some implementations, these mechanisms can facilitate the presentation of content associated with a particular user and/or user device by a display that the user can readily view. For example, in some implementations, presentation of content by a public display device can be initiated from the user device. As described herein, any suitable content associated with the user and/or user device can be presented by a public display device. For example, the user can request that walking directions to a particular retail store be presented using public screens from a navigation application installed on and being executed by the user's smartphone.

In some implementations, the mechanisms described herein can select one or more public display devices on which to present the requested content using any suitable technique or combination of techniques. For example, using information about the location of the user device and/or the one or more public display devices, the mechanisms described herein can determine which display is most likely to be viewable to the user. In a more particular example, if the user requested, via a smartphone, walking directions to a retail store, the mechanisms can select a nearest public display device to the smartphone that is on the way to the retail store.

As another example, using information about the content to be presented, the mechanisms described herein can determine which nearby display is appropriate to present the type of content that is to be presented. In a more particular example, if the content to be presented includes personal information, the mechanisms described herein can select a display that is more secluded or in a more private location with respect to other nearby display devices.

In some implementations, the mechanisms described herein can cause the content to be presented by a selected public display device. The mechanisms can use any suitable technique or combination of techniques to cause a particular display device to present the requested content. For example, having selected a display device on which to present the requested content, the mechanisms described herein can communicate an address corresponding to the requested content to the selected display device. In a more particular example, in the case where the user requested, via a smartphone, walking directions to a retail store, the mechanisms can generate and/or identify an address associated with the directions and communicate the address to a selected public display device. This public display device can then, in some implementations, use the address to retrieve and present the walking directions.

In situations in which the mechanisms described herein record personal information about users, or can make use of personal information, the users are provided with an opportunity to control whether programs or features of the mechanisms described herein record user information (e.g., information about user actions stored on a user device, information about user actions stored on a remote device such as a server, information about content presented by display device, etc.), and/or to control whether and/or how much personal information is presented and/or shared. In addition, certain data can be treated in one or more ways before it is stored or used, so that personal information is removed. For example, a user's identity can be treated so that no personal information can be determined for the user, or a user's geographic location can be generalized where location information is obtained (such as to a city block, a city, ZIP code, or state level), so that a particular location of a user cannot be determined. Thus, the user can have control over how information is recorded about the user and used by a content server.

Turning to FIG. 1, an example of a portion of a system for presenting requested content on public display devices is shown in accordance with some implementations of the disclosed subject matter. As shown in FIG. 1, the system can include a user device 102 associated with a user 104. In some implementations, user 104 can be located within a portion 100 of an environment that includes one or more display devices 110-1 to 110-4 on which content can be presented.

In some implementations, one or more of display devices 110-1 to 110-4 in environment 100 can be a public display device on which content associated with a user, such as user 104, can be presented in response to a request from a device, such as user device 102. In some implementations, such a public display device can occupy a space that might otherwise be used to convey information to the public such as a billboard, a store window, a bus or subway sign, a display space for presenting a map of a local area, etc. Additionally, in some implementations, as described below in connection with FIG. 4, a display device 110 that is a public display device can be programmed to accept only certain types of content for presentation. For example, display device 110-1 can be programmed to accept any content that is appropriate for all ages, while display device 110-2 can be programmed to accept only advertisements, directions and weather information as content that is to be presented. In some implementations, such programming can be time-based, such that a particular display device (e.g., display device 110-3) can be programmed to act as a public display device during certain periods of time, and to act as a non-public display device during other periods of time.

In some implementations, each display device 110 that is to act as a public display device can be coupled to a network, such as the Internet, over which it can receive content that is to be presented. For example, as described below in connection with FIG. 4, a display device 110 that is to act as a public display device can receive content that is to be presented from a remote server. Additionally or alternatively, each display device 110 that is to act as a public display device can communicate with one or more other devices, such as user device 102 or another display device 110, without using a non-local network, such as the Internet. For example, display device 110 can communicate with another device using peer-to-peer communication techniques (e.g., using a Bluetooth connection, using one or more wireless ad-hoc connections, and/or using any other suitable technique or combination of techniques). As another example, display device 110 can communicate with another device using an ad-hoc network where one or more intermediate devices (e.g., one or more other display devices and/or user devices) that form a part of the ad-hoc network between user device 102 and a display device 110 that is to be used as a public display device on which to present content. As yet another example, display device 110 and a user device 102 can both be coupled to a local area network over which display device 110 and user device 102 can communicate. In some implementations, display device 110 can include a wireless access point to which a user device 102 can be coupled for communication over a local network and/or a non-local network (e.g., the Internet) to which display device 110 is connected.

In some implementations, each display device 110 can be associated with location information. For example, the location information associated with a display device can be represented by coordinates at which the display device is located. As another example, the location information can be represented as location information relative to another object or feature for which location information is known. As a more particular example, the location of a display device, such as display device 110-1, can be represented as location information relative to a building 106-1 to which display device 110-1 is coupled. In such an example, the location information associated with display device 110-1 can include information indicating that display device 110-1 is coupled to building 106-1 at the southeast corner, where building 106-1 can be identified by an address, coordinates, and/or any other suitable location information.

In some implementations, location information associated with a display device can include height information. For example, location information for display device 110-1, which is coupled to building 106-1, can include a height at which a center (or other reference point or points) of display device 110-1 is positioned above ground level and/or with respect to any other suitable reference point. Similarly, location information for display device 110-2, which is positioned over a sidewalk area, can include a height at which a center (or other reference point or points) of display device 110-2 is positioned above ground level and/or with respect to any other suitable reference point (e.g., the sidewalk on which user 104 is walking).

In some implementations, the location information can be determined using any suitable technique or combination of techniques. For example, a display device (e.g., display device 110-1) can include one or more sensors for determining a location relative to the surface of the earth (e.g., using the Global Positioning System, which is sometimes referred to as GPS) and/or relative to other objects (e.g., one or more wireless access points, one or more devices that includes a wireless transmitter, etc.). As another example, one or more devices remote from a display device can determine location information associated with the display device based on a signal received from the display device. In a more particular example, a remote device can receive a signal transmitted from display device 110-1 and—based on the strength of the received signal, timing information of the received signal, and/or using any other suitable technique or combinations of techniques—can determine a distance from the display device to the remote device and/or a direction in which the display device is located. In some implementations, distance and/or direction information determined by multiple remote devices can be used to determine a more accurate location of a display device by, for example, using known location information associated with the remote devices and multilateration, trilateration and/or any other suitable technique or combination of techniques to determine the location of the display device.

As another example, the location information can be set by an owner and/or operator of the display device as information related to the display device. In such an example, an owner and/or operator can program the location of the display device using software, firmware and/or hardware of the display device. This location information can then be transmitted by the display device to a device that requests the location information associated with the display device.

As yet another example, location information associated with a display device can be stored in memory of a remote device in association with identifying information of the display device. In a more particular example, a database of display device information, including the location information associated with the display device, can be maintained. Such a database can be accessed to retrieve location information associated with a particular display device or devices (e.g., in response to a database query using identifying information of one or more display devices), and/or to retrieve identifying information of display devices near a particular location (e.g., in response to a database query using location information associated with a user device). In some implementations, location information and/or identifying information of display devices can be entered into the database by a user, entered into the database automatically based on communications from a display device or other suitable device, and/or using any other suitable technique or combination of techniques.

In some implementations, each display device can be associated with direction information. Such direction information can, for example, indicate one or more directions in which audio and/or visual information presented by the display device can be perceived. For example, as shown by arrows in FIG. 1, display device 110-1 is directed south, display device 110-2 can include screens that are directed both north and south, display device 110-3 is directed west and display device 110-4 is directed south. In some implementations, such direction information can be determined using any suitable technique or combination of techniques. For example, the direction information can be set by an owner and/or operator of the display device as information about the display device. As another example, one or more sensors of the display device and/or any other suitable device can be used to determine direction information of the display device.

In some implementations, direction information of a display device can be stored locally by the display device (e.g., to be transmitted to a device requesting direction information), stored remotely in a database (e.g., as described above in connection with location information), and/or determined on an as-needed basis when a query for direction information is received (e.g., received by a display device from a server). In some implementations, a direction of a display device can be fixed with relation to its surroundings. For example, display device 110-1 can be fixed facing south based on its mounting to building 106-1. Alternatively, in some implementations, a direction of a display device can be variable, such as in a case where the display device rotates and/or a structure to which the display device is coupled moves or otherwise changes position. In some implementations, a screen of a display device can be curved and different portions of the screen of the display device can be directed in different directions. Note that a screen of a display device can be any surface or other medium that is used by the display device to present content and need not be a physical screen included in or electronically coupled to the display device itself. For example, a screen can include a window or wall onto which an image is projected by the display device.

In some implementations, a viewing area from which a particular screen or portion of a screen of the display device can be viewed can be determined based on location information associated with a display device, direction information associated with the display device, viewing angle information associated with the display device, and/or information about an area surrounding the display device, such as the location of walls, structures, windows, people, etc. For example, this information can be used to map areas from which a typical or average user can perceive information presented by a particular screen of a display device. Such viewing area information can be stored locally by the display device, stored remotely in a database (e.g., as described above in connection with location information), determined on an as-needed basis, and/or can be made available using any other suitable technique or combination of techniques.

In some implementations, user 104 and/or user device 102 can be associated with direction information. Such direction information associated with user 104 and/or user device 102 can be determined explicitly using a sensor associated with user 104, such as a sensor of user device 102. Additionally or alternatively, the position of user 104 and/or user device 102 at different points in time can be used to infer a direction that user 104 and/or user device 102 is facing based on a direction of motion of user 104 and/or user device 102.

In some implementations, a location of user device 102 can be determined using any suitable techniques. For example, user device 102 can include one or more sensors for determining a location relative to the surface of the earth (e.g., using GPS) and/or relative to other objects (e.g., one or more wireless access points, one or more devices that include a wireless transmitter). As another example, a computing device that is remote from a user device can determine location information associated with the user device based on a signal received from the user device. In a more particular example, a remote computing device can receive a signal transmitted from user device 102 and can determine a distance from the user device to the remote device and/or a direction in which the user device is located using any suitable technique or combination of techniques. For example, the remote computing device can determine a distance to the user device based on the strength of the received signal. As another example, the remote computing device can determine a distance to the user device based on timing information of the received signal. In some implementations, distance and/or direction information determined by multiple remote devices can be used to determine location information associated with user device 102 by, for example, using known location information associated with the remote devices and multilateration, trilateration and/or any other suitable technique or combination of techniques to determine the location of user device 102.

As described below in connection with FIG. 4, in some implementations, the mechanisms described herein can select one or more display devices, such as display devices 110-1 to 110-4, on which content associated with user device 102 is to be presented. In selecting the display device or devices, the location information associated with the display devices and the location information associated with a user device (and/or user) can be used to determine which display device or devices are likely to be visible to the user at the time when the content is to be presented. As shown in FIG. 1, based on the relative locations of user device 102 and display devices 110-1 to 110-4, the mechanisms described herein can select the south-facing screen of display device 110-2 as a display device on which to present content associated with user device 102. In some implementations, as user 104 moves through environment 100, the mechanisms can select an additional display device or screen of a display device on which to present the content. For example, as user 104 moves north and draws even with or passes a location of display device 110-2, the mechanisms can select the south-facing screen of display device 110-1 to present the content.

As described below, in some implementations, the mechanisms described herein can cause any suitable information to be presented on a selected display device to indicate to a user associated with the user device (e.g., user 104) that the content being presented is intended for that user. For example, as shown in and described below in connection with FIG. 7C, an avatar associated with user 104 can be presented in association with the content that is to be presented for user 104.

FIG. 2 shows an example 200 of a generalized schematic diagram of a system on which the mechanisms for presenting requested content on public display devices as described herein can be implemented in accordance with some implementations. As illustrated, system 200 can include one or more user devices 102. User devices 102 can be local to each other or remote from each other. User devices 102 can be connected by one or more communications links 204 to a communication network 206 that can, in turn, be linked to a server 220 via a communications link 212.

System 200 can include one or more display devices 110. Display devices 110 can be local to each other or remote from each other. Each display device 110 can be connected by one or more communications links 208 to communication network 206 that can, in turn, be linked to server 220 via communications link 212 and/or user device 102 via communications link 204.

System 200 can include one or more servers 220. Server 220 can be any suitable server or servers for providing access to the mechanisms described herein for presenting requested content on public display devices, such as a processor, a computer, a data processing device, or any suitable combination of such devices. For example, the mechanisms for presenting requested content on public display devices can be distributed into multiple backend components and multiple frontend components and/or user interfaces. In a more particular example, backend components (such as mechanisms for receiving requests to present content, selecting a display device on which to present the content, formatting the content for presentation on a selected display device, making the content available to the selected display device, etc.) can be performed on one or more servers 220. In another more particular example, frontend components (such as presentation of content, requesting that content be presented by a public display device, detecting that a user device is near a public display device, etc.) can be performed on one or more user devices 102 and/or display devices 110.

In some implementations, each of user devices 102, display device 110 and server 220 can be any of a general purpose device, such as a computer, or a special purpose device, such as a client, a server, etc. Any of these general or special purpose devices can include any suitable components such as a hardware processor (which can be a microprocessor, a digital signal processor, a controller, etc.), memory, communication interfaces, display controllers, input devices, etc. For example, user device 102 can be implemented as a smartphone, a tablet computer, a wearable computer, a vehicle computing and/or entertainment system (e.g., as used in a car, a boat, an airplane, or any other suitable vehicle), a laptop computer, a portable game console, any other suitable computing device, or any suitable combination thereof. As another example, display device 110 can be implemented as a television, a projector, a large-scale video screen, multiple screens of various dimensions, a collection of display elements such as light emitting diode modules, a desk-top computer, a set-top box, a digital media receiver, a game console, any other suitable computing device, or any suitable combination thereof.

Communications network 206 can be any suitable computer network or combination of such networks including the Internet, an intranet, a wide-area network (WAN), a local-area network (LAN), a wireless network, a Wi-Fi network, a digital subscriber line (DSL) network, a frame relay network, an asynchronous transfer mode (ATM) network, a virtual private network (VPN), a peer-to-peer connection, etc. Each of communications links 204, 208, and 212 can be any communications links suitable for communicating data among user devices 102, display devices 110 and server 220, such as network links, dial-up links, wireless links, hard-wired links, any other suitable communications links, or any suitable combination of such links. Note that, in some implementations, multiple servers 220 can be used to provide access to different mechanisms associated with the mechanisms described herein for presenting requested content on public display devices. For example, system 200 can include: a display device selection server 220 that facilitates selection of a public display device on which to present content using the mechanisms described herein; a public display device data server 220 that maintains one or more databases of location information and/or other information related to public display devices; a content delivery server 220 that formats and makes available content to be presented by a public display device; and/or any other suitable servers for performing any suitable functions of the mechanisms described herein.

Figure 3:
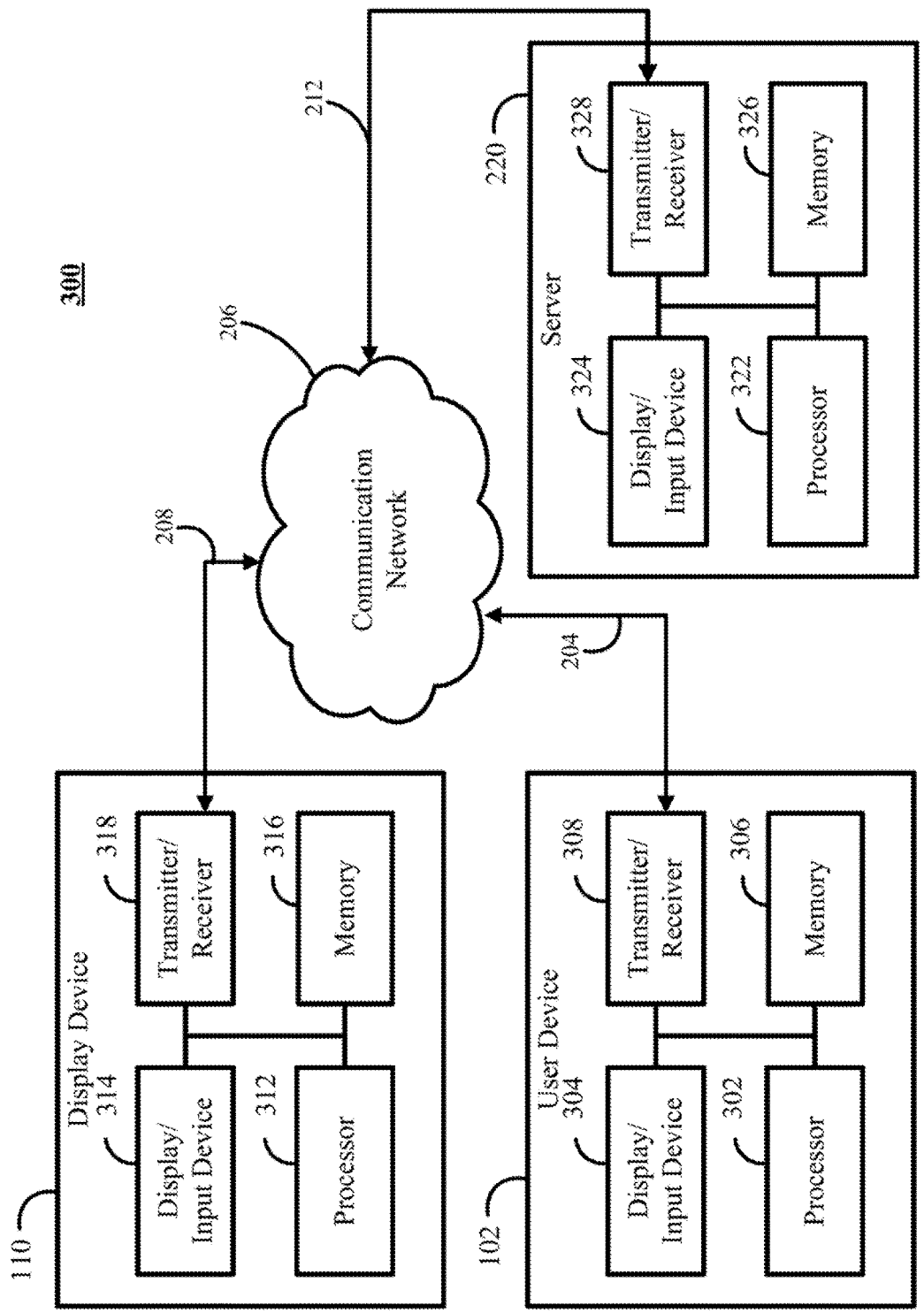
FIG. 3 shows an example of hardware that can be used to implement one or more of the user devices, display devices, and servers depicted in FIG. 2 in accordance with some implementations of the disclosed subject matter.

FIG. 3 shows an example 300 of hardware that can be used to implement one or more of user devices 102, display devices 110 and servers 220 depicted in FIG. 2 in accordance with some implementations of the disclosed subject matter. Referring to FIG. 3, user device 102 can include a hardware processor 302, a display/input device 304, memory 306 and a transmitter/receiver 308, which can be interconnected. In some implementations, memory 306 can include a storage device (such as a computer-readable medium) for storing a user device program for controlling hardware processor 302.

Figure 4:
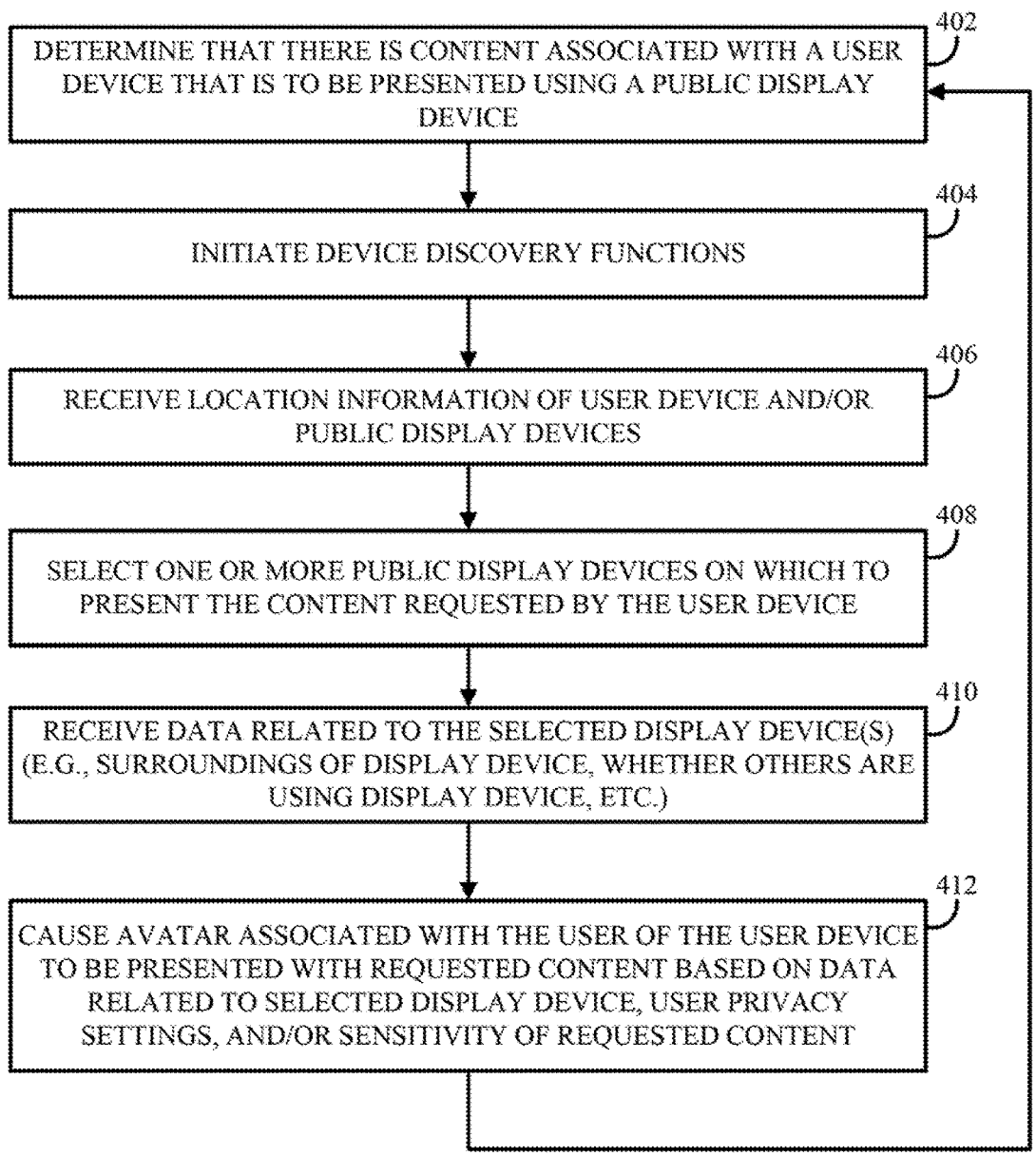
FIG. 4 shows an example of a process for presenting requested content on public display devices in accordance with some implementations of the disclosed subject matter.
Figure 7A:
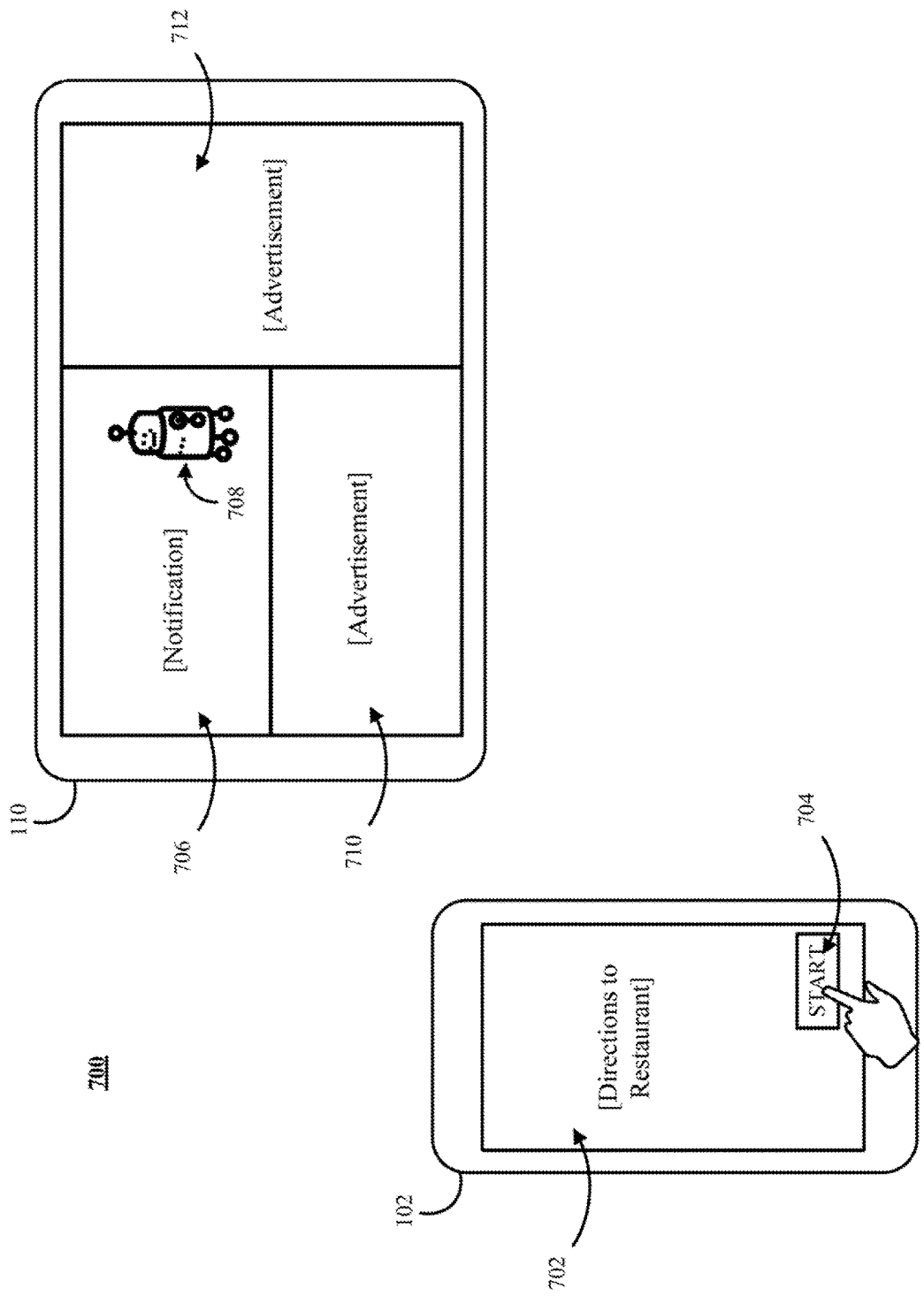
FIGS. 7A-7D show examples of a user interface for causing content to be presented by a public display device and presentation of content by a public display device in accordance with some implementations of the disclosed subject matter.
Figure 7B:
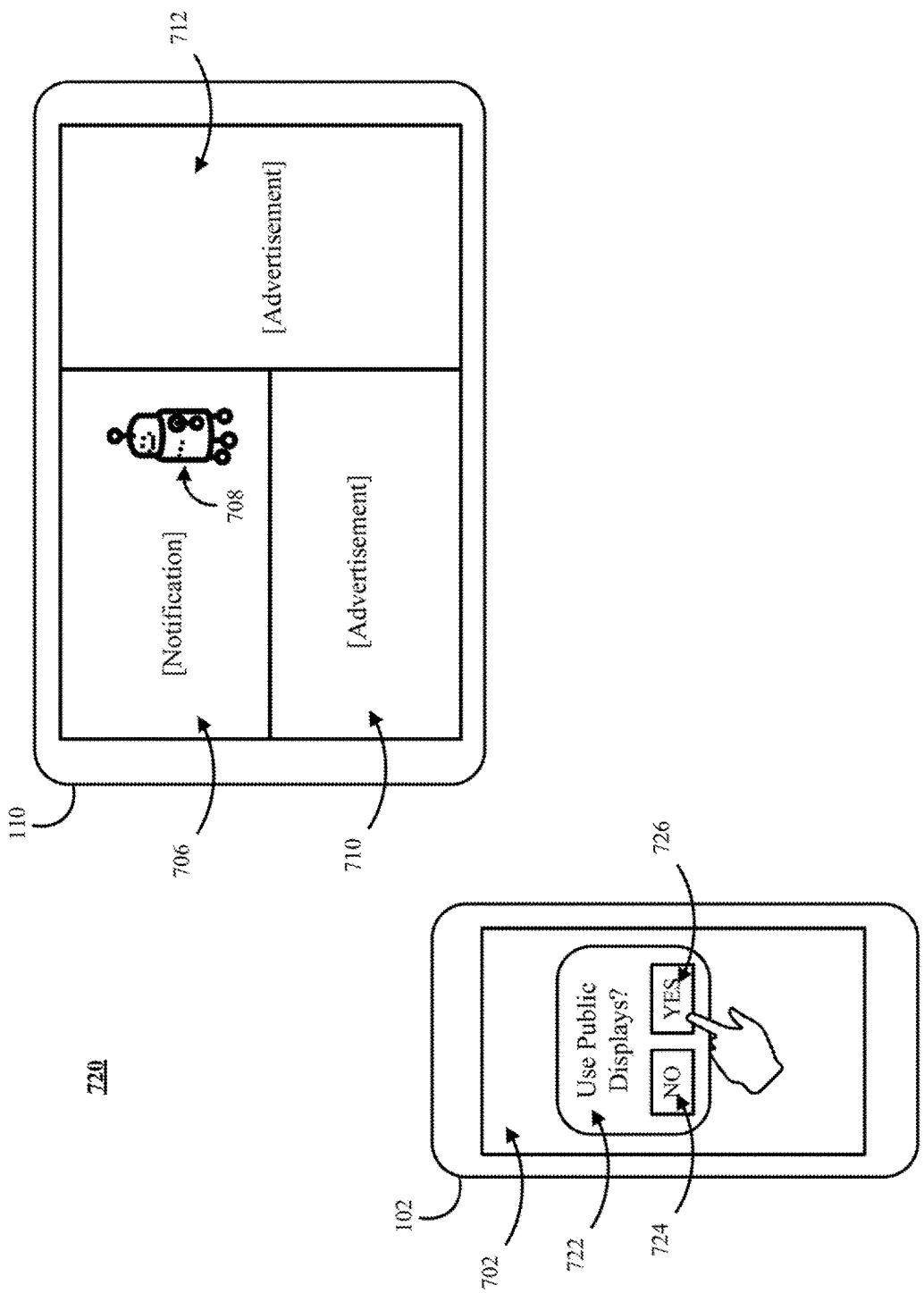
Figure 7C:
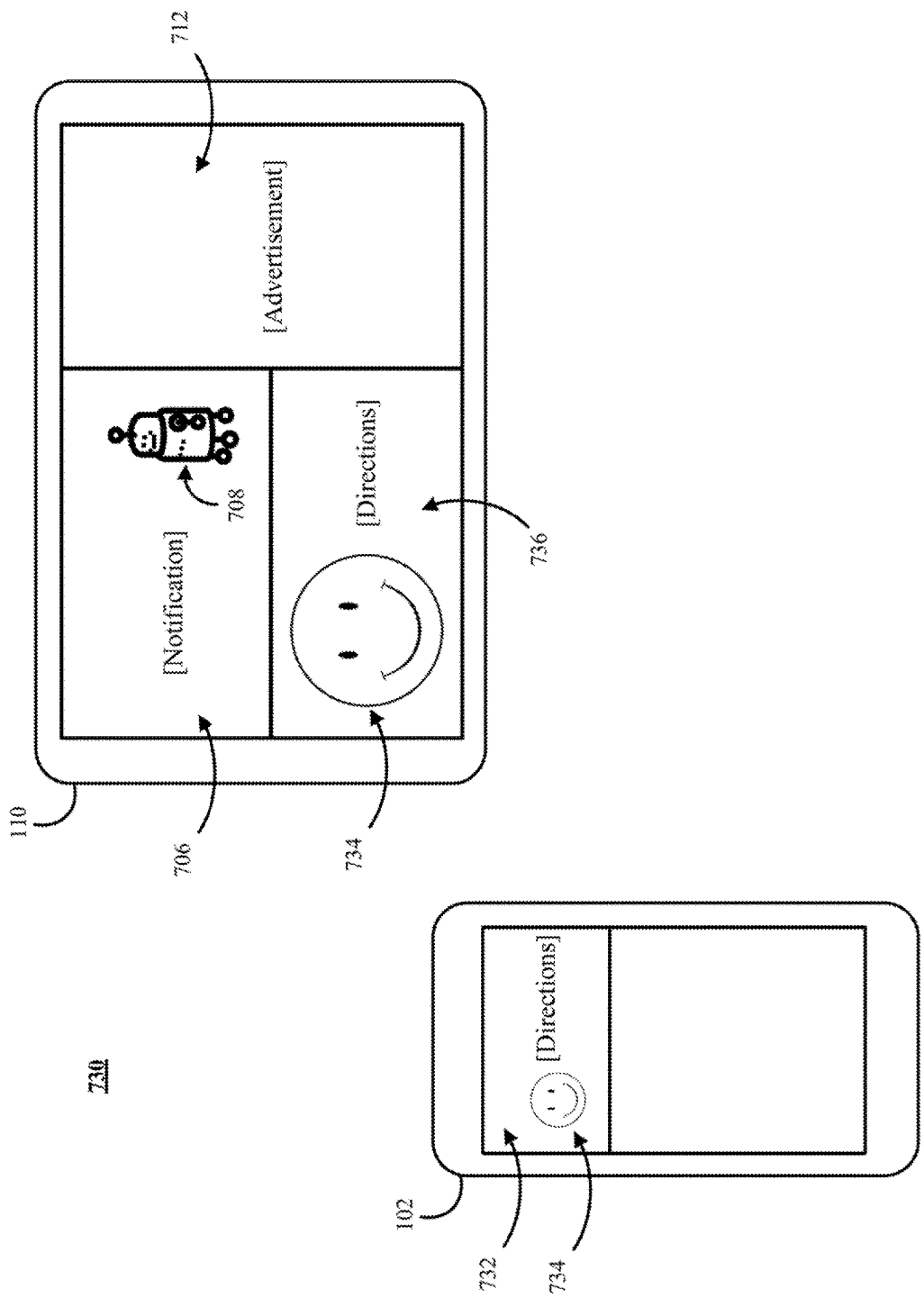
Figure 7D:
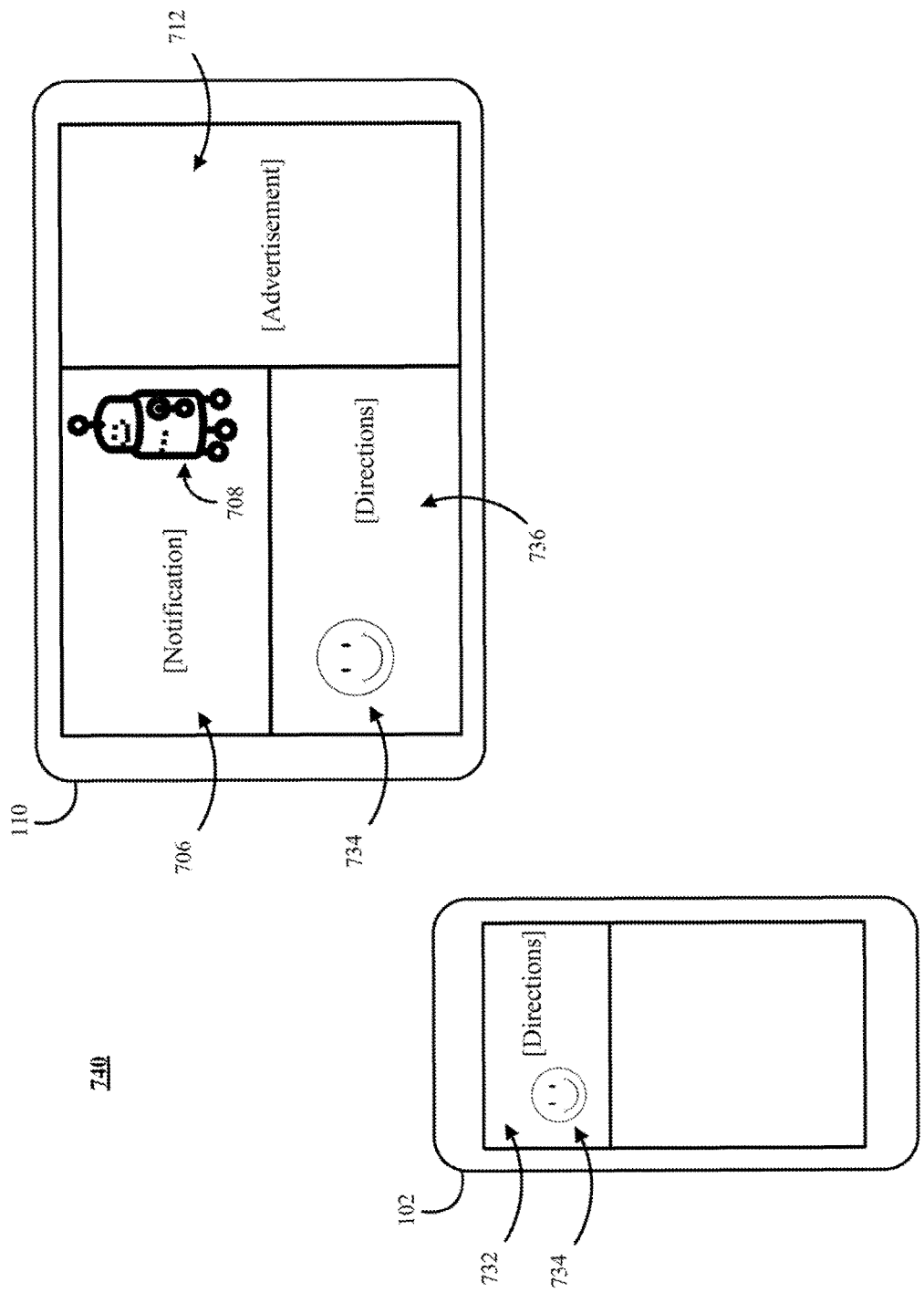
Figure 8:
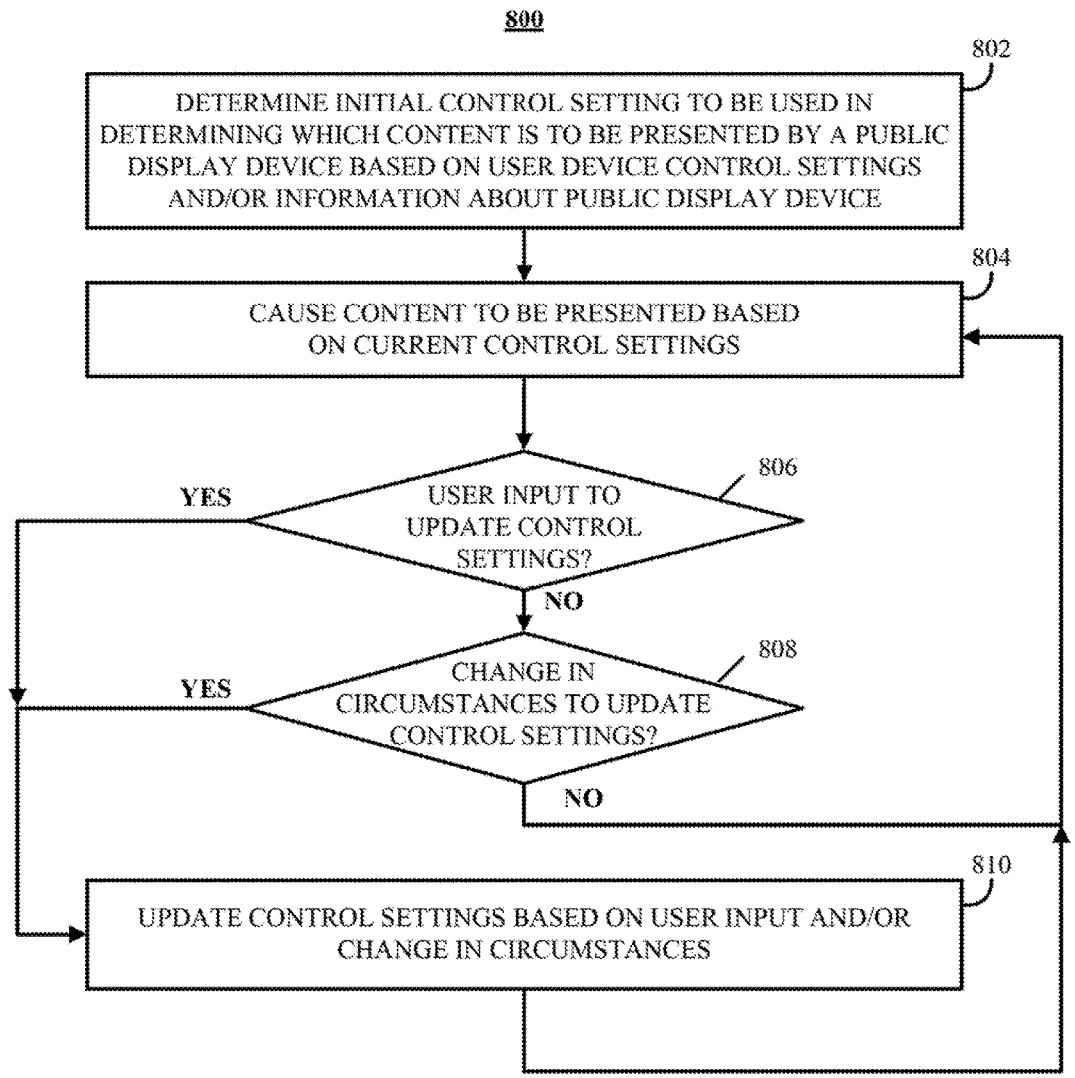
FIG. 8 shows an example of a process for determining which content is to be presented on public display devices based on control settings in accordance with some implementations of the disclosed subject matter.

Hardware processor 302 can use the user device program to execute and/or interact with the mechanisms described herein for: requesting that content be presented by a public display device; controlling presentation of the content on the public display device; setting a control level for the content shown on the public display device; presenting a user interface on display/input device 304 (e.g., as described below in connection with FIGS. 7A-7D and 9A-9D); performing any other suitable functions in accordance with instructions received as a result of, for example, process 400 described below in connection with FIG. 4 and/or process 800 described below in connection with FIG. 8; and/or transmitting and receiving data through communications link 204. In some implementations, the user device program can cause hardware process 302 to, for example, execute at least a portion of process 400 as described below in connection with FIG. 4 and/or at least a portion of process 800 as described below in connection with FIG. 8. In some implementations, hardware processor 302 can transmit and receive data through communications link 204 or any other communication links using, for example, a transmitter, a receiver, a transmitter/receiver, a transceiver, and/or any other suitable communication device, such as transmitter/receiver 308. Display/input device 304 can include a touchscreen, a flat panel display, a cathode ray tube display, a projector, a speaker or speakers, and/or any other suitable display and/or presentation devices, and/or can include a computer keyboard, a computer mouse, one or more physical buttons, a microphone, a touchpad, a voice recognition circuit, a touch interface of a touchscreen, a camera, a motion sensor such as an optical motion sensor and/or an accelerometer, a temperature sensor, a near field communication (NFC) sensor, a biometric data sensor, and/or any other suitable input device. Transmitter/receiver 308 can include any suitable transmitter and/or receiver for transmitting and/or receiving, among other things, instructions for presenting content, information related to a current control level, requests for location information, etc., and can include any suitable hardware, firmware and/or software for interfacing with one or more communication networks, such as network 206 shown in FIG. 2. For example, transmitter/receiver 308 can include: network interface card circuitry, wireless communication circuitry, and/or any other suitable type of communication network circuitry; one or more antennas; and/or any other suitable hardware, firmware and/or software for transmitting and/or receiving signals.

Display device 110 can include a hardware processor 312, a display/input device 314, memory 316 and a transmitter/receiver 318, which can be interconnected. In some implementations, memory 316 can include a storage device (such as a computer-readable medium) for storing a display device program for controlling hardware processor 312.

Hardware processor 312 can use the display device program to execute and/or interact with the mechanisms described herein for: receiving content to be presented by a public display device; controlling presentation of the content on the public display device (e.g., as described below in connection with FIGS. 7A-7D and 9A-9D); presenting a user interface on display/input device 314; transmitting information related to display device 110; performing any other suitable functions in accordance with instructions received as a result of, for example, process 400 described below in connection with FIG. 4 and/or process 800 described below in connection with FIG. 8; and/or transmitting and receiving data through communications link 208. In some implementations, the display device program can cause hardware process 312 to, for example, execute at least a portion of process 400 as described below in connection with FIG. 4 and/or at least a portion of process 800 as described below in connection with FIG. 8. In some implementations, hardware processor 312 can transmit and receive data through communications link 214 or any other communication links using, for example, a transmitter, a receiver, a transmitter/receiver, a transceiver, and/or any other suitable communication device such as transmitter/receiver 318. Display/input device 314 can include a touchscreen, a flat panel display, a cathode ray tube display, a projector, a speaker or speakers, and/or any other suitable display and/or presentation devices, and/or can include a computer keyboard, a computer mouse, one or more physical buttons, a microphone, a touchpad, a voice recognition circuit, a touch interface of a touchscreen, a camera, a motion sensor such as an optical motion sensor and/or an accelerometer, a temperature sensor, a near field communication sensor, a biometric data sensor, and/or any other suitable input device. Transmitter/receiver 318 can include any suitable transmitter and/or receiver for transmitting and/or receiving, among other things, content to be presented, requests for status information of display device 110, requests for content, requests for location information, etc., and can include any suitable hardware, firmware and/or software for interfacing with one or more communication networks, such as network 206 shown in FIG. 2. For example, transmitter/receiver 318 can include: network interface card circuitry, wireless communication circuitry, and/or any other suitable type of communication network circuitry; one or more antennas; and/or any other suitable hardware, firmware and/or software for transmitting and/or receiving signals.

Server 220 can include a hardware processor 322, a display/input device 324, memory 326 and a transmitter/receiver 328, which can be interconnected. In some implementations, memory 326 can include a storage device for storing data received through communications link 212 or through other links. The storage device can further include a server program for controlling hardware processor 322. In some implementations, memory 326 can include information stored as a result of user activity (e.g., user preferences, content to be presented, requests for content to be presented, user credentials for use in accessing content to be presented, etc.), information stored as a result of activity related to public display devices (e.g., location information associated with one or more public display devices, status information of one or more public display devices, etc.), and/or any other suitable information. In some implementations, the server program can cause hardware process 322 to, for example, execute at least a portion of process 400 as described below in connection with FIG. 4 and/or at least a portion of process 800 as described below in connection with FIG. 8.

Hardware processor 322 can use the server program to communicate with user devices 102 and/or display devices 110 as well as provide access to and/or copies of the mechanisms described herein. It should also be noted that data received through communications link 212 or any other communications links can be received from any suitable source. In some implementations, hardware processor 322 can transmit and receive data through communications link 212 or any other communication links using, for example, a transmitter, a receiver, a transmitter/receiver, a transceiver, and/or any other suitable communication device, such as transmitter/receiver 328. In some implementations, hardware processor 322 can receive commands and/or values transmitted by one or more user devices 102, display devices 110, one or more other servers 220, and/or one or more users of server 220 such as a user that makes changes to adjust settings associated with the mechanisms described herein for presenting requested content on public display devices. Display 324 can include a touchscreen, a flat panel display, a cathode ray tube display, a projector, a speaker or speakers, and/or any other suitable display and/or presentation devices, and/or can include a computer keyboard, a computer mouse, one or more physical buttons, a microphone, a touchpad, a voice recognition circuit, a touch interface of a touchscreen, a camera, a motion sensor such as an optical motion sensor and/or an accelerometer, a temperature sensor, a near field communication sensor, a biometric data sensor, and/or any other suitable input device. Transmitter/receiver 328 can include any suitable transmitter and/or receiver for transmitting and/or receiving, among other things, content to be presented, requests for status information of display device 110, requests for content, requests for location information, etc., and can include any suitable hardware, firmware and/or software for interfacing with one or more communication networks, such as network 206 shown in FIG. 2. For example, transmitter/receiver 328 can include: network interface card circuitry, wireless communication circuitry, and/or any other suitable type of communication network circuitry; one or more antennas; and/or any other suitable hardware, firmware and/or software for transmitting and/or receiving signals.

In some implementations, server 220 can be implemented in one server or can be distributed as any suitable number of servers. For example, multiple servers 220 can be implemented in various locations to increase reliability and/or increase the speed at which the server can communicate with user devices 102 and/or display devices 110. Additionally or alternatively, as described above in connection with FIG. 2, multiple servers 220 can be implemented to perform different tasks associated with the mechanisms described herein.

FIG. 4 shows an example 400 of a process for presenting requested content on public display devices in accordance with some implementations of the disclosed subject matter. At 402, process 400 can determine that there is content associated with a user device and that the content is to be presented using a public display device. In some implementations, content that is associated with a user device can include any suitable content, such as static image data, video data, text data, formatting data, and/or any other suitable content. For example, content that is associated with a user device can include an avatar or other information associated with a user or user device to identify that the content that is being presented is directed at the user and/or a user of the user device. In a more particular example, an avatar associated with a user account authenticated on the user device can be retrieved and used by the public display device to identify content pertaining to the user device. As another example, content that is associated with a user device can include content accessible through an application installed on the user device, such as email messages, directions, notifications, personal content, text messages, etc.

As yet another example, content that is associated with a user device can include content accessible through an association with a public screen, such as an interactive catalog of products available from a nearby retail store, a map of a facility and/or area in which the public screen is located, a ticket purchasing application, etc. In some implementations, content associated with a particular public screen can be made accessible through an application program interface ("API"). Using such an API, a user device can request content associated with the public display device based on one or more received inputs and/or based on information associated with the user device such as settings, a user's history and/or revealed preferences, and/or any other suitable information. Additionally, in some implementations, the API can receive instructions initiated by the user device (and/or any other suitable device) to control presentation of the content made accessible through the API. For example, a public display device in a mall can make an interactive map available for presentation to a user associated with a particular user device. The user device can then be used to issue instructions to control presentation of the map, to search for a store in the mall, highlight the store on the map, and/or get directions to the store using the public display device and/or other public display devices. In some implementations, an owner of a public display device, an operator of a public display device, and/or any other suitable entity can designate content that is to be presented by the display device. Additionally, in some implementations, such an owner, operator, and/or any other suitable entity can design how a user interface for interacting with the content is to be presented, and/or how interaction with the content is to proceed.

In some implementations, the content that is to be presented by a public display device can be related to a user device in any suitable manner. For example, content that is to be presented by a public display device can be related to a user device because presentation of the content by the public display device was requested by the user device. In a more particular example, if a user device such as a smartphone requests that directions to a restaurant be presented by a public display device (e.g., using a map application installed on the smartphone, using a web page for requesting and/or presenting directions, etc.), directions that are to be presented on one or more public display devices can be associated with the smartphone.

As another example, content that is to be presented by a public display device can be related to a user device because a user associated with the user device is also associated with a device that requested that the content be presented by a public display device. In a more particular example, if a user device such as a tablet computer is used to request that directions to a restaurant be presented by a public display device and a particular user is associated with the tablet computer, any device associated with the user can be associated with the content to be presented. For example, a vehicle computing and/or entertainment system that is also associated with the particular user can also be associated with the content. The fact that another device (e.g., the vehicle computing and/or entertainment system) is also associated with the user can be determined based on one or more factors. In such an example, any suitable technique or combination of techniques can be used to determine that a particular user is associated with the tablet computer and/or with the vehicle computing and/or entertainment system. In a more particular example, a particular user can be determined to be associated with a user device if the particular user logged in as a user of the user device (e.g., on a log-in screen, in a settings user interface, during set-up of the device, etc.). In another more particular example, a particular user can be determined to be associated with a user device if the particular user logged in to an application used to request that the content be presented by a public display device. Any other suitable technique or combination of techniques can be used to determine that the user is associated with a particular device.

As yet another example, content that is to be presented by a public display device can be related to a user device based on a user account associated with the content being, in turn, associated with a particular user device. For example, if a notification (e.g., to inform a user about a change associated with an account) is directed at a particular user account, a device associated with that user account can also be associated with the content that is to be presented by the public display device.

In some implementations, process 400 can determine that such content associated with a user device (such as user device 102) exists based on any suitable condition or combination of conditions. For example, process 400 can determine that user device 102 has transmitted a request to present content using a public display device. As another example, process 400 can determine that content associated with user device 102 (e.g., directions) is currently being presented by a public display device and can determine that such content is to be presented on a continuing basis. In a more particular example, process 400 can determine that content associated with user device 102 is currently being presented, and can also determine that presentation of such content is to continue because at least a portion of the content associated with user device 102 has not yet been presented and/or because an instruction has not been received to inhibit presentation of the content on the public display devices. As yet another example, process 400 can determine that content associated with user device 102 is to be presented by one or more public display devices based on instructions received from a server (and/or any other suitable computing device) and/or settings associated with a user of user device 102 indicating that content associated with user device 102 is to be presented using one or more public display devices. In a more particular example, in response to a notification being directed to user device 102, process 400 can determine that content related to the notification is content that is to be presented by a public display device based on the notification itself and, in some cases, settings associated with a user of user device 102.

In some implementations, at 402, process 400 can determine whether an application and/or service associated with the content to be presented using a public display device is permitted to present content using a public display device. In some implementations, process 400 can determine whether an application is permitted to present content on a public display device based on user settings. For example, a user can provide input to any suitable application and/or service to indicate which applications and/or services are permitted to present content associated with that user. In a more particular example, the user can provide input to an operating system of a user device, to an application that controls presentation of content on public display devices, to a service associated with a user account that controls presentation of content on public display devices, and/or to any other suitable application and/or service, where the input indicates whether presentation of content associated with particular applications and/or services is permitted using a public display device. In some implementations, a user can be required to affirmatively permit content associated with a particular application and/or service to be presented before process 400 will permit content associated with that particular application and/or service to be presented by a public display device. Additionally, in some implementations, if process 400 determines that the content to be presented using a public display device is associated with an application and/or service that is not permitted to present content using a public display device, process 400 can inhibit the content from being presented using a public display device by inhibiting any suitable portion of process 400 from being carried out with respect to that content (e.g., by inhibiting discovery as described below in connection with 404, by inhibiting selection as described below in connection with 408, by inhibiting the content from being presented as described below in connection with 412, and/or by inhibiting any other suitable action from being performed). In some implementations, when process 400 inhibits the content from being presented, process 400 can cause a user device with which the content is associated to provide an indication that presentation of the content has been inhibited, information identifying which application and/or service the content is associated with, and/or instructions and/or options indicating to the user one or more actions that the user may take to permit the content to be presented using a public display device.

As another example, in some implementations, an administrator of a display device for presenting content and/or an administrator of a server that causes content to be presented using a display device, can provide input to any suitable application and/or service to indicate which applications and/or services are permitted to present content on one or more public display devices (e.g., public display devices associated with the administrator, all public display devices, public display devices in a particular area, etc.). In a more particular example, the administrator can provide input to an operating system of a server and/or display device, to an application that controls presentation of content on public display devices, to a service associated with one or more display devices that controls presentation of content on those display devices, and/or to any other suitable application and/or service, where the input indicates whether presentation of content associated with particular applications and/or services is permitted using a public display device. In some implementations, an administrator can be required to affirmatively permit presentation of content associated with a particular application and/or service before process 400 will permit content associated with that particular application and/or service to be presented using a public display device. Additionally, in some implementations, if process 400 determines that the content to be presented using a public display device is associated with an application and/or service that is not permitted to present content on a public display device, process 400 can inhibit the content from being presented on a public display device by inhibiting any suitable portion of process 400 from being carried out with respect to that content (e.g., by inhibiting discovery as described below in connection with 404, by inhibiting selection as described below in connection with 408, by inhibiting the content from being presented as described below in connection with 412, and/or by inhibiting any other suitable action from being performed). In some implementations, when process 400 inhibits the content from being presented, process 400 can cause a user device with which the content is associated to provide an indication that presentation of the content has been inhibited due to the application and/or service not being permitted to present content on public screens.

In some implementations, process 400 can determine whether the content that is to be presented is authentic content that has been requested by a valid user device. Process 400 can use any suitable technique or combination of techniques to authenticate the content such that the likelihood that presentation of the content by public display devices in response to a requested by a malware application and/or a malicious user is reduced.

At 404, process 400 can initiate device discover functions to determine which public display device or devices are near the user device associated with content that is to be presented by a public display device. In some implementations, such device discovery functions can be initiated in response to determining that content is to be presented by a public display device at 402. Additionally or alternatively, in some implementations, such device discovery functions can be initiated from any suitable device and can use any suitable information to determine which public display device or devices are near the user device.

In some implementations, the user device with which content is associated, such as user device 102 can, in response to initiating presentation of content by a public display device (e.g., in response to a user input), determine whether any public display devices are nearby. User device 102 can use any suitable technique or combination of techniques to determine whether any public display devices are nearby. For example, user device 102 can transmit a signal or signals including a message requesting that nearby public display devices (e.g., public display devices which receive the signal) to respond with a message indicating that the public display device received the signal. As another example, user device 102 can receive a signal or signals transmitted by a public display device including a message indicating that the display device is available for presentation of content. Such signals can be transmitted using, for example, peer-to-peer communication techniques such as Bluetooth, using RFID techniques, and/or using any other suitable technique or combinations of techniques for communicating between user device 102 and display device 110. As another example, user device 102 can transmit a message to a server that maintains a database and/or list of public display device locations. Such a message can include current location information associated with the user device.

In some implementations, a public display device, such as display device 110, can receive a signal indicating that a user device, such as user device 102, is requesting that content be presented by a public display device. Display device 110 can use any suitable technique or combination of techniques to determine whether a user device requesting that content be presented is nearby. For example, display device 110 can listen for a signal or signals including a message requesting that nearby public display devices (e.g., a display of display device 110) present content. As another example, display device 110 can transmit a signal or signals including a message indicating that display device 110 is available for presentation of content. Such signals can be transmitted using, for example, peer-to-peer communication techniques, such as Bluetooth, using RFID techniques, and/or using any other suitable technique or combinations of techniques for communicating between user device 102 and display device 110. As another example, display device 110 can receive a message from a server indicating that content is to be presented.

In some implementations, a server can receive a message indicating that content associated with a user device is to be presented by a public display device. Such a message can include any suitable information such as the content that is to be presented, location information associated with the user device, etc., and can be from any suitable source such as the user device, another server (e.g., a notification server, a mail server, etc.) and/or any other suitable source. In some implementations, in response to receiving such a message, the server can determine which public display devices, if any, are located in an area near the user device's location. As described above, the server can access a database and/or list of public display devices to determine which public display devices are near the user device. A public display device can be determined to be near the user device based on any suitable criteria or criterion, in some implementations. For example, the server can determine that public display devices that are less than or equal to a threshold distance to the user device are near the user device. As another example, the server can determine that public display devices for which the user device is in a viewable area (e.g., as described above in connection with FIG. 1) are near the user device. As yet another example, the server can determine that up to a predetermined number of public display devices that are closest to the user device are near the user device. As still another example, the server can transmit a message to one or more display devices that can be used as public display devices in an area near the user device (e.g., based on a location of the user device), where the message requests an indication of whether the public display device detects a signal from the user device (e.g., using any suitable type of communication). In such an example, the server can use responses to the message to determine one or more public display devices that are near the user device. As a further example, the server can determine a public display device along a route of travel of the user device (e.g., based on directions requested by the user device, a destination of the user device, an inferred route of the user device, etc.) as being a public display device that is near to the user device. As another further example, any suitable combination of techniques can be used to determine one or more public display devices that are near the user device.

At 406, process 400 can receive location information associated with the user device and/or location information associated with public display devices near the user device. In some implementations, for example as described above in connection with FIG. 1, location information can include any suitable information that can be used to determine the relative locations of the user device and one or more public display devices near the user device. For example, the location of a user device can be represented using coordinates and, in some cases, a margin of uncertainty around those coordinates. In a more particular example, coordinates can be determined using any suitable technique or combination of techniques, such as by using GPS signals, by using multilateration, trilateration, and/or any other suitable techniques. As another example, the location of a user device can be represented using a direction and/or a distance and, in some cases, a margin of uncertainty around the direction and/or distance, from a known object, such as a public display device.

In some implementations, a location of a user device can be determined by the user device using one or more sensors such as a GPS sensor, a sensor used in multilateration using multiple signal sources (e.g., signals from cellular telephone and/or data antennas, signals from one or more public display devices, etc.), and/or any other suitable sensors. In such implementations, location information associated with the user device can be transmitted to any suitable device executing at least a portion of process 400.

Additionally or alternatively, in some implementations, a location of a user device can be determined by one or more devices remote from the user device. For example, one or more public display devices can each determine an approximate distance to the user device using any suitable technique or combination of techniques. As described above in connection with FIG. 1, a remote device, such as a public display device, can use any suitable technique or combination of techniques to determine a distance to the user device.

In some implementations, the presence and/or magnitude of a margin of uncertainty in the location information associated with the user device can be based on technological limitations in how precisely the location of the user device can be determined (e.g., based on how accurately the location of the user device can be determined using a particular technique such as a technique using GPS signals, a technique using multilateration of signals, etc.). Additionally or alternatively, the presence and/or magnitude of a margin of uncertainty in the location information associated with the user device can be based on user settings regarding how precisely the location information associated with the user device is permitted to be specified. For example, the settings associated with a user device and/or a user can permit the position of the user device to be specified to within a certain area in which the user device is present. As a more particular example, with reference to environment 100 of FIG. 1, settings associated with user device 102 and/or user 104 can inhibit a relatively precise location of user device 102 from being specified. In such an example, such settings can limit the location of user device 102 to be specified based on a block of environment 100 on which user device 102 is located, a viewing area of a display device in which user device 102 is located (e.g., the location of user device 102 can be specified as within the viewing area of the south-facing screen of public display device 110-2), with any other level of specificity, and/or any suitable combination thereof.

In some implementations, process 400 can receive location information associated with one of more public display device on which content may be presented from any suitable source and/or in response to any suitable query. For example, as described above in connection with FIG. 1, a database and/or list of location information for public display devices and/or screens of public display devices can be maintained (by one or more computing devices that are part of the mechanisms described herein and/or by one or more computing devices that are maintained separately from the mechanisms described herein). In such an example, location information associated with the user device and/or any other suitable location information can be used as a query to the database and/or list of location information for public display devices. As another example, process 400 can cause messages to be transmitted to one or more particular public display devices to determine location information associated with the public display device. Such messages can be addressed, for example, by broadcasting a message to all or a subset of display devices known to be in a particular area that is near the user device. In some implementations, address information for a public display device can be assigned based on the location such that messages can be addressed to the public display device using the location-based address without querying a database to determine the location and/or address of the display device prior to sending the message.

At 408, process 400 can select one or more public display devices on which to present the content requested by the user device. In some implementations, any suitable criteria and/or criterion can be used for selecting a public display device on which to present the content. For example, based on the device discovery initiated at 404 and/or location information received at 406, one or more public display devices nearest to the user device can be selected at 408. In such an example, any suitable number of nearest display devices can be selected. As another example, based on the device discovery initiated at 404 and/or location information received at 406, one or more display devices of which process 400 determines the user is most likely to be able to view can be selected at 408. As yet another example, process 400 can select a display device based at least in part on information about a particular display device (e.g., as received at 410 as described below). In a more particular example, process 400 can select a display device that permits the requested content to be presented (e.g., as described above in connection with FIG. 1, certain display devices can inhibit particular content or particular types of content from being presented). In another more particular example, process 400 can select a display device that is being used by less than a threshold number of other users and/or user devices to present requested content.

In some implementations, process 400 can inhibit at least a portion of the requested content from being presented based on any suitable criteria or criterion being met. For example, if one or more contacts of a user associated with the user device are nearby the user device and/or the public display device that is to be used to present the content (which can be determined using any suitable technique or combination of techniques), process 400 can inhibit presentation of the content and/or presentation of an avatar associated with the user. Additionally, in some implementations, process 400 can cause an indication to be presented to the user (e.g., by user device 102) indicating that presentation of the content and/or avatar was inhibited due to the proximity of contacts of the user. In some implementations, process 400 can cause identifying information of those contacts to be presented to the user (which can be based on whether the contact has affirmatively chosen for identifying information to be presented to nearby contacts, such as the user of user device 102). Additionally, in some implementations, process 400 can cause user device 102 to prompt a user to select whether to present the content and/or avatar despite the proximity of the contacts.

As another example, process 400 can inhibit sensitive and/or personal content from being presented based on information about the public display device and/or a location of user device 102 with respect to the public display device. In a more particular example, if process 400 determines that multiple other users are using a public display device, process 400 can control the amount of personal content that is presented by the public display device. In another more particular example, as the user moves closer to the public display device more personal content can be presented, and the content can be presented at a smaller scale (e.g., to make it less likely that others will be able to view the content).

In some implementations, process 400 can select a public display device and/or determine whether to inhibit the presentation of certain content based on the type of content to be presented. For example, for content that includes personal information and/or sensitive information, process 400 can select a display device based more on which display device is likely to allow for more privacy and based less on which display device is most conveniently located. Additionally or alternatively, in some implementations, a user (e.g., via user device 102) can designate one or more display devices as being a private display device. For example, in such implementations, a private display device can be a display device that can otherwise act as a public display device, but that the user has designated as a private display device which is to be used to present content associated with the user that includes personal information and/or sensitive information. As another example, a private display device can be a display device located in a user's home, workplace, etc., that the user designates as a private display device. In some implementations, a display device designated as a private display device can be inhibited from acting as a public display device.

In some implementations, process 400 can select a display device or devices based on the location of user device 102 for content that serves a notifying function. For example, for assisting a user in finding information that is already being presented, process 400 can select a display device or devices that are determined to be most likely to be visible to the user of user device 102. In a more particular example, to assist a user in locating flight information (e.g., departure time, gate, etc.) when the user is at the airport, process 400 can cause an avatar associated with the user to be presented in proximity to such flight information on an airport monitor to assist the user in quickly locating such information. As another example, to assist the user in locating an item in a grocery store (e.g., if the user has requested the location of salad dressing), process 400 can cause an avatar associated with the user to be presented in proximity to an aisle where the salad dressing is normally stocked.

In some implementations, process 400 can select a display device or devices based on a predicted location of the user device associated with the content. For example, if the content includes directions to a particular location, process 400 can determine one or more display devices that are likely to be visible to a user associated with the user device if the user follows the directions. In a more particular example, process 400 can select one or more display device based on the progress of user device 102 along a planned route, and process 400 can anticipate a next display device to use based on the directions/route, in addition to or in lieu of the location of user device 102.

In some implementations, process 400 can select a public display device and/or determine whether to inhibit the presentation of certain content based on whether the request for content was an active request initiated by a user or a passive request initiated automatically (e.g., in response to a notification directed at the user device). For example, for an active request for content, process 400 can select a display device and/or determine whether to inhibit the presentation of certain content (e.g., personal information and/or sensitive information) with a bias toward providing more information, and can, in some cases, select to present such information using a display device that is likely to allow for more privacy. In such an example, as the user has actively requested content, process 400 can infer that the user would like to be presented with more complete content at the expense of the convenience and/or the privacy with which the content can be viewed based on the active request. As another example, for a passive request for content, process 400 can select a display device and/or determine whether to inhibit the presentation of certain content (e.g., personal information and/or sensitive information) with a bias toward providing less information, and can, in some cases, select to present such information using a display device that is more likely to be viewable by the user (e.g., based on the location of the user device).

At 410, process 400 can receive data related to the one or more public display devices selected at 408. In some implementations, such data related to the one or more public display devices can be received prior to, concurrently with, and/or after selecting one or more display devices at 408. Additionally, in some implementations, process 400 can select a display device at 406 based on the data related to the display devices that is received at 410.

In some implementations, the data related to the one or more public display devices can include any suitable data about the public display devices that may be relevant to the content that is to be presented. For example, the data related to the one or more public display devices can include a number of other users for which a particular display device is presenting data. As another example, the data related to the one or more public display devices can include data related to the surroundings of the public display device, such as an area from which the display device is viewable, which can take account of structures such as walls, floors, ceilings, pillars, stairs, etc., as well as transient structures, such as vehicles, banners, etc. As yet another example, data related to the one or more public display devices can include specifications of one or more screens of the public display device, such as a size of a screen of the display device to be used, an amount of the screen that is available for presenting content, an area of the screen that can currently be used to present content, a resolution of the screen, and/or any other suitable information about the display device and/or a screen of the display device. As still another example, data related to the one or more public display devices can include a number of people that are near the display device, which can be determined based on sensors associated with the display device. As a further example, data related to the one or more public display devices can include an indication of whether the display device is configured to act as a public display device on which any suitable content associated with any suitable user device, user and/or user account can be presented.

In some implementations, the data related to the one or more public display devices can be received from any suitable source. For example, the data can be received from one or more other processes and/or other instances of process 400 being executed concurrently to present content on public display devices. Such other processes or instances of process 400 can be executed by a computing device executing process 400 and/or by any other suitable computing device. As another example, the data can be received from the public display devices on a periodic basis and/or in response to request for such data. As yet another example, the data can be received from a database (or other data structure) that includes such data related to the public display devices. The related data can be received from any other suitable source and/or any suitable combination of sources.

In some implementations, the data related to the one or more public display devices can include one or more types of content that are permitted to be presented by the display device (e.g., based on settings that are set by an owner and/or operator of the display device). These settings can limit the types of content that can be presented using the public display device. For example, the settings can limit the types of advertisements and/or the content of advertisements that can be presented on the public display device and/or inhibit advertisements from being presented by the public display device. As another example, the settings can limit the types of content that can be presented to specified categories, such as maps and/or directions content, weather content, news content, notifications, etc. As yet another example, the settings can inhibit particular types of content from being presented such as email, text messages, images, social media, etc.

At 412, process 400 can cause an avatar associated with a user of the user device to be presented on the selected display device or devices in association with the content to be presented (e.g., the content to be presented as described above in connection with 402). In some implementations, the avatar can be any suitable graphical representation that is associated with one or more of the user device, the user of the user device and/or the content that is to be presented on one or more public display devices.

In some implementations, a user can select an avatar to be associated with the user and/or with the user device (e.g., user device 102). For example, the user can select an avatar during setup of an account associated with the user device and/or an application to be executed by the user device that is associated with content that is to be presented. As another example, the user can select an avatar to be presented during set up of a request for content (e.g., by selecting from a list of possible avatars, by inputting information identifying an avatar to be used, using any other suitable technique for selecting an avatar, and/or any combination of techniques).

In some implementations, an avatar can be assigned to a user, a user device and/or content to be presented. For example, process 400 (and/or any other suitable process) can select an avatar to be associated with a particular user, a particular user device and/or with particular content. In some implementations, an assigned avatar can be a default avatar if a user has not selected an avatar to be used. Additionally or alternatively, an assigned avatar can be used in situations where presentation of an avatar associated with the user and/or user device is to be inhibited. For example, if a user, through a user device, requests that content be presented by a public display device but wishes to not use an avatar associated with the user, an avatar can be assigned to the user for the requested content.

In some implementations, different avatars for a single user can be associated with different applications and/or different types of content. For example, a user can be associated with a first avatar for social media content and can be associated with a second avatar for directions.

In some implementations, process 400 (and/or any other suitable process) can determine which content is to be presented based on any suitable factor or factors. For example, process 400 can determine which content is to presented based on the data related to the selected display device or devices received at 410. In a more particular example, process 400 (and/or any other suitable process) can format the content to be presented based on specifications of the selected display device or devices, an amount of space available on the selected display device or devices, how much space has been allotted to the content on the selected display device or devices, and/or any other suitable factors. As another example, process 400 (and/or any other suitable process) can determine which content is to presented based on control settings associated with a user and/or a user device associated with the content. A more detailed example of determining content to be presented based on control settings is described below in connection with FIG. 8. As yet another example, process 400 (and/or any other suitable process) can determine which content is to presented based on sensitivity of at least a portion of the content to be presented. In a more particular example, process 400 (and/or any other suitable process) can determine that portions of content that include personal information of the user associated with the content and/or any other suitable user are to be inhibited from being presented. In another more particular example, process 400 (and/or any other suitable process) can determine that portions of content that include material that certain members of the public may find objectionable, such as depictions of violence, nudity, certain words or phrases, etc., are to be inhibited from being presented.

In some implementations, process 400 can cause a size at which an avatar is presented to be changed based on a distance between the user device associated with the content and a public display device presenting the content. For example, the avatar can be presented at a particular maximum size when process 400 determines that the user device is more than a threshold distance from the public display device (e.g., based on the location information received at 406). As the user device moves closer to a public display device presenting the avatar, process 400 can cause the size of the avatar to decrease, as the user can more easily perceive the avatar as they move closer. In some implementations, process 400 can cause presentation of the avatar to be inhibited in response to the user device being less than a minimum threshold distance from the public display device on which the avatar was previously presented. Additionally, in some implementations, as process 400 causes the size at which the avatar is presented to decrease, process 400 can cause a size at which the content is presented to increase. In some implementations, process 400 can cause the avatar to be presented as a background over which the content is presented.

In some implementations, as a distance between the user device and a public display device being used to present the content decreases, process 400 can cause an area of the public display device used to present the content associated with the user device to decrease. Additionally or alternatively, process 400 can cause the size at which portions of the content are presented to decrease in size as a distance between the user device and a public display device being used to present the content decreases. For example, an image in the content can be presented at an initial size (e.g., in comparison to a total screen area of the public screen) and as the user device moves closer, process 400 can cause the image to be presented at a decreasing size. As another example, text within the content can be presented using an initial font size which process 400 can cause to decrease as the user device moves closer. This can allow for content to be more visible when a user is at a greater distance from the public display device and for more content to be presented when the user is at a closer distance to the public display device.

In some implementations, process 400 can cause a message to be presented by the user device associated with the content that is being presented to inform a user as to which public display device or devices are being used to present the content. For example, user device 102 can request that email associated with a particular user account be presented by a public display device. Process 400 can cause the email content to be presented on one or more selected public display devices and can cause a message (and/or other suitable information) to be presented by user device 102 to inform the user of user device 102 of which public display device or devices are being used to present the email content.

In some implementations, information to inform a user of a public display device being used to present content can be conveyed using any suitable technique or combination of techniques. For example, process 400 (and/or any other suitable process) can cause a map to be presented by user device 102 (and/or any other suitable device), where the map includes positions of user device 102 and one or more public display devices that are being used to present the content. In a more particular example, process 400 can cause directions to the display device being used to present the content to be presented by user device 102. As another example, process 400 (and/or any other suitable process) can cause one or more arrows to be presented by a display of user device 102 pointing toward a public screen or screens that are being used to present the content. In such an example, the direction of the arrow(s) can be determined based on outputs from one or more sensors of user device 102 (e.g., an electronic compass, one or more accelerometers, etc.), and a length of the arrow can represent a distance to the corresponding public display device. As yet another example, process 400 (and/or any other suitable process) can cause a public display device being used to present the content to be highlighted in an augmented reality image produced by the user device. In a more particular example, information about a location of the user device, a location of the selected public display device or devices, and size information of the selected public display device or devices can be used by any suitable process to overlay a highlight on a location of the public display device within a field of view of a camera of user device 102 (or any other suitable device in communication with user device 102) that captures images of the surroundings of user device 102. As still another example, process 400 can cause contextual information that can be used to locate a display device that is being used to present the content to be presented by user device 102 as, for example, text and/or audio data. In a more particular example, process 400 can cause text stating "look up when you get to the corner of fifth and main" to be presented to the user. In such example, process 400 can generate such contextual information based on any suitable information, such as location information associated with user device 102, including direction information of user device 102. Additionally or alternatively, if further information about a direction in which a user is likely to be looking is known (e.g., based on eye gaze detection, based on orientation information of a wearable user device, etc.), process 400 can generate the contextual information using such further direction information of the user to provide further guidance to locate the display device that is being used to present the content. In another more particular example, process 400 can cause audio stating "turn your head left" to be presented to the user.

In some implementations, process 400 can use any suitable technique or combination of techniques to cause a message to be presented by the user device associated with the content to be presented. For example, in some implementations, process 400 can cause an application that requested that the content be presented to present a message to the user. As another example, in some implementations, process 400 can cause a notification to be transmitted to the user device associated with the content, where the notification includes a message and/or can be selected to cause a message to be presented by the user device.

In some implementations, any other suitable technique or combination of techniques can be used to draw user attention to a display device that is to be used to present the content. For example, an avatar presented in association with the content can be animated to draw the user's attention to the avatar. As another example, a portion of a screen of the display device that is being used to present the content can present a pattern of brightness and/or colors to draw the user's attention.

In some implementations, process 400 can cause presentation of the content on one or more selected public display devices to be inhibited until a user acknowledgment is received indicating that the content is to be presented. For example, process 400 can determine that content is to be presented by a public display device and can select a public display device on which to present the content, but presentation of the content can be inhibited until the user indication to present the content is received. This can, for example, facilitate the user in determining which display device is to be used to present the content and can allow the user to approach the display device prior to the content being presented.

In some implementations, process 400 can cause the user to be prompted to select a public display device from among nearby public display devices. The nearby public display devices available for selection can be presented to the user using any suitable technique or combination of techniques. For example, process 400 can cause a list of nearby public display devices to be presented by a user device associated with the user, and can receive a user selection of a public display device from the user device. As another example, process 400 can prompt the user (e.g., using a message transmitted to the user device associated with the user) to move toward a public display device to be used to present the content, and process 400 can cause the content to be presented on the public display device towards which movement (e.g., of the user device) is detected. As yet another example, process 400 can prompt the user to perform a particular action, such as a gesture, in front of a public display device to be used to present the content, and process 400 can cause the content to be presented on that public display device in response to the gesture being recognized by process 400 and/or receiving a signal from the public display device indicating that such a gesture was recognized from the user. As still another example, process 400 can prompt the user to aim a camera of a user device (e.g., a smartphone, a tablet computer, a wearable computer, etc.) associated with the user at a public display device to be used to present content. In such an example, process 400 can cause the nearby public display devices that can be selected to present the content to be highlighted in an image captured by the camera and presented by the user device. Process 400 can receive a signal indicating that a particular public display device is to be used to present content from the user device that includes the camera (and/or any other suitable device in communication with the camera). Such a signal can be based on any suitable criteria being met for a user selection based on the image data captured by the camera. In a more particular example, process 400 can receive a signal based on the camera capturing an image of a particular public display device for at least a threshold amount of time (e.g., the camera was capturing images of a particular public display device for at least two seconds, five seconds, etc.). In another more particular example, process 400 can receive a signal based on the user device receiving a selection of an area of a touchscreen associated with an image of a particular public display device (e.g., the image data captured by the camera is presented on a touchscreen and a selection corresponding to an area of the image including the particular public display device is received).

As a further example, process 400 can prompt the user to bring a particular user device within a threshold distance of a particular public display device and/or a sensor associated with the particular public display device. Any suitable technique can be used to determine the proximity of the user to the particular public display device and/or sensor associated with the public display device. In such an example, the public display device can detect that the user device is within a threshold distance of the public display device (and/or a sensor associated with the public display device) and transmit a signal to a device executing process 400 that the user device was brought within the threshold distance of the public display device. In a more particular example, the user device can include an NFC antenna and the public display device can be associated with a sensor for detecting a signal from the NFC antenna of the user device. The NFC antenna of the user device can emit a signal that can be received by the public display device's sensor when the user device is brought to within a threshold distance of the sensor. Any other suitable technique or combination of techniques can be used to determine that the user device is within a particular distance of the public display device and/or a sensor associated with the public display device. In some implementations, the user bringing the user device within the threshold distance can be used to select a particular display device and/or verify the user device's presence at the display (e.g., prior to presenting certain content in accordance with process 800 described below in connection with FIG. 8).

In some implementations, process 400 can use any suitable technique or combination of techniques to cause the avatar and/or the requested content to be presented by the one or more selected display devices. For example, process 400 can cause the content and/or avatar to be made available at one or more particular addresses, and these one or more addresses can be communicated to the public display device that is to present the requested content. In such an example, the public display device can use the one or more addresses to request the content and/or avatar to be presented, and can receive the content and/or avatar in response.

As another example, process 400 can cause the content and/or avatar to be pushed to the one or more selected display devices based on address information of the one or more selected display devices.

In some implementations, process 400 can return to 402 to determine if there continues to be content associated with a user device that is to be presented. Additionally or alternatively, process 400 can determine whether a public display device on which the content is being presented is still an appropriate display device on which to present the content. Such a determination can be based on any suitable factor or factors, such as location information received at 406, whether particular sensitive or personal information is still included in the content and/or is no longer included in the content, and/or any other suitable factors. For example, as user 104 moves through environment 100 shown in FIG. 1, process 400 can continuously and/or periodically determine which public display device or devices are to be used to present content based on the location of user 104 with respect to the public display devices, based on what information is included in the content to be presented, based on the surroundings of the display devices, based on whether a contact of the user is nearby, etc.

Figure 5A:
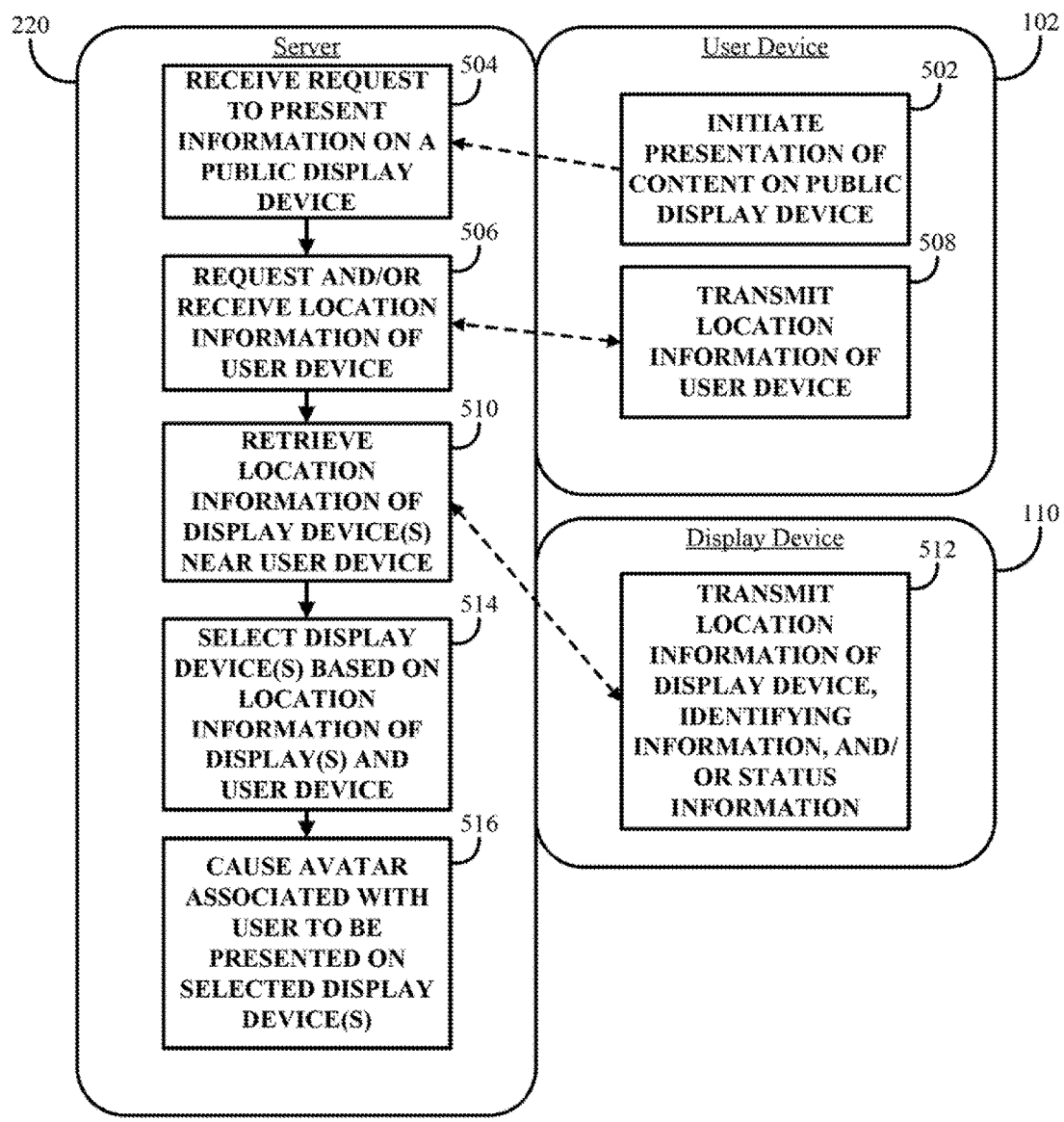
FIGS. 5A-5C show diagrams illustrating examples of data flows that can be used in conjunction with the process of FIG. 4 to discover and/or select public display devices on which to present content in accordance with some implementations of the disclosed subject matter.
Figure 5B:
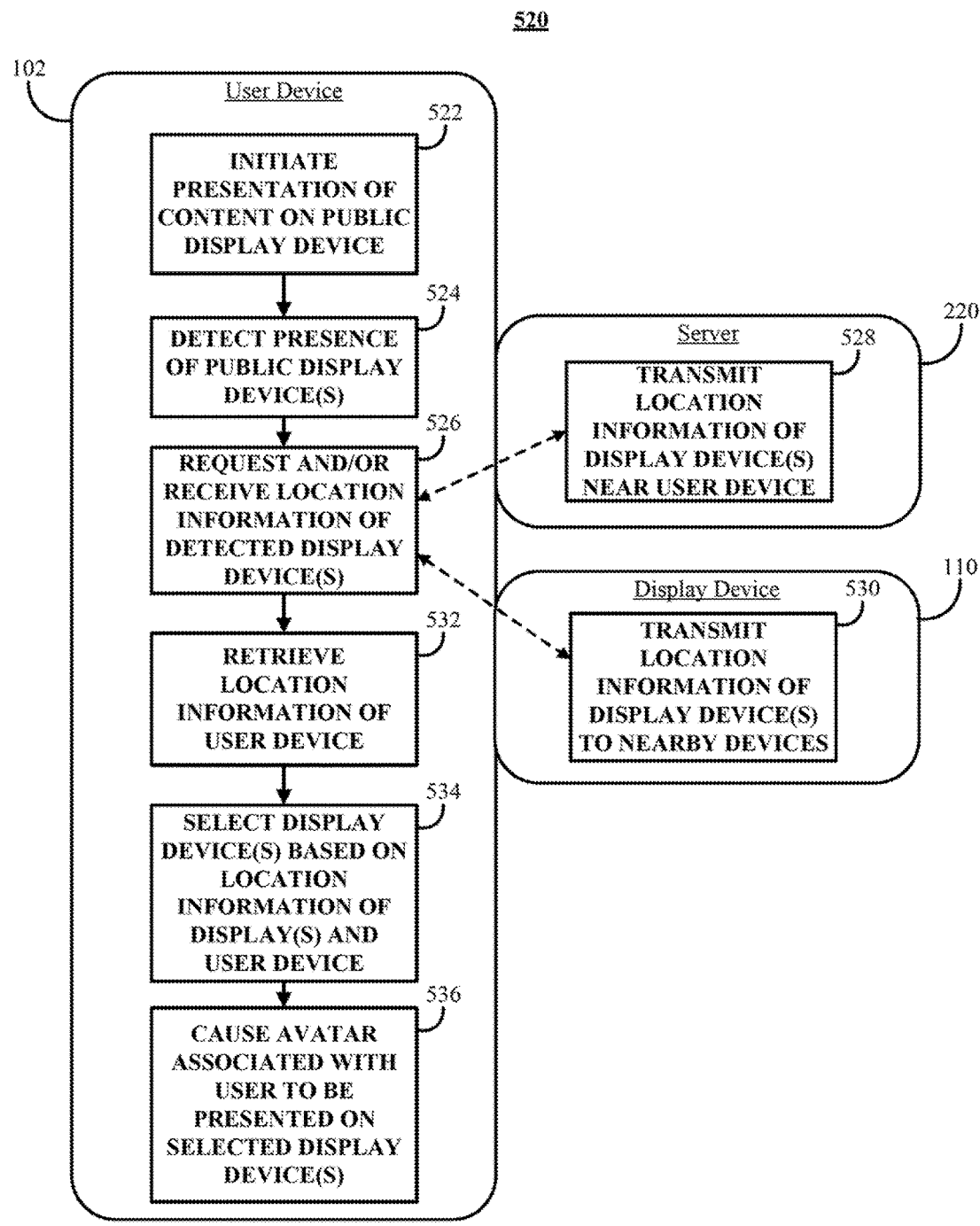
Figure 5C:
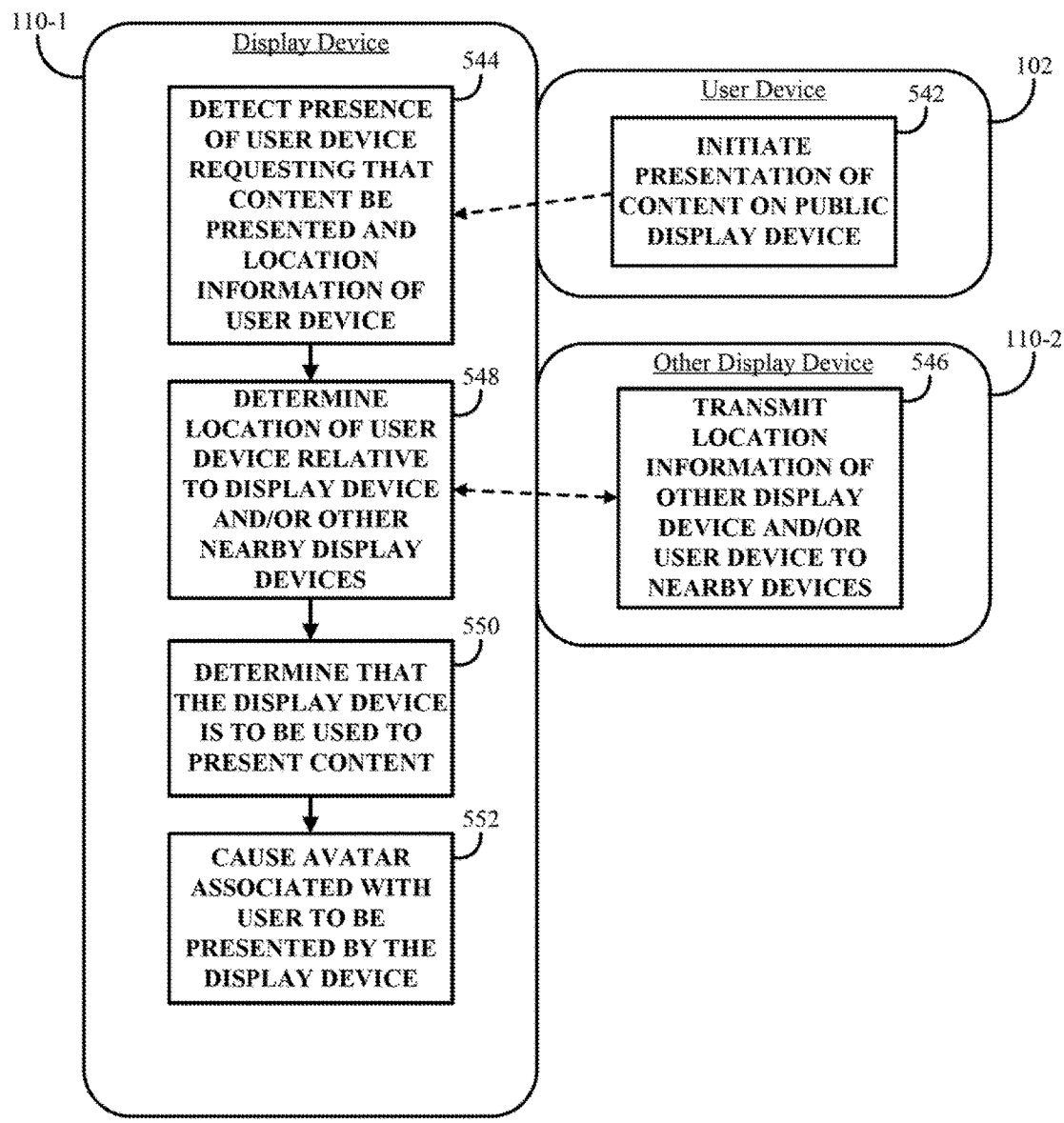

FIGS. 5A-5C show diagrams illustrating examples of data flows that can be used in conjunction with process 400 of FIG. 4 to discover and/or select public display devices on which to present content in accordance with some implementations of the disclosed subject matter.

FIG. 5A shows a diagram illustrating an example 500 of a data flow that can be used by server 220, user device 102, and display device 110 to discover and/or select one or more public display devices on which to present content in accordance with some implementations of the disclosed subject matter.

As shown in FIG. 5A, at 502, user device 102 can initiate presentation of content by a public display device. Any suitable technique or techniques can be used to initiate presentation of content by a public display device. For example, an application installed on user device 102 and being executed by user device 102 can receive an indication that content accessible by the application (or by another application installed on user device 102) is to be presented by a public display device. Such an indication can be received in response to any suitable input received by the user device and/or according to any suitable rule associated with the application. In a more particular example, the application can include a selectable user input element that, upon selection, causes content associated with the application to be presented by a public display device. In another more particular example, the user device can receive an audio signal indicating that content associated with an application that is currently being executed is to be presented by a public display device. Such an audio signal can be processed by the application and/or by another application executed by the user device. In yet another more particular example, the application can be associated with a rule specifying conditions in which content associated with the application is to be presented on one or more public display devices. Such a rule can be, for example, that certain content associated with the application is to be presented on public display devices when user device 102 is within a particular area. Such an area can be defined positively (e.g., within a particular city) or negatively (e.g., more than a threshold distance from work, school and/or home). As still another more particular example, the application can receive a signal transmitted to user device 102 from a server that indicates that content is to be presented by a public display device.

As another example, an operating system installed on, and being executed by, user device 102 can receive an indication that content associated with user device 102 (e.g., content associated with the operating system and/or with one or more applications installed on user device 102) is to be presented by a public display device. Such an indication can be received in response to any suitable input received by the user device and/or according to any suitable rule associated with the operating system. In a more particular example, the operating system can include a selectable user input element that, upon selection, causes content associated with one or more applications to be presented by a public display device. In another more particular example, the user device can receive an audio signal indicating that content associated with one or more applications is to be presented by a public display device. In yet another more particular example, the operating system can be associated with one or more rules specifying conditions in which content associated with one or more applications is to be presented by a public display device. As still another more particular example, the operating system can receive a signal transmitted to user device 102 from a server that indicates that content associated with one or more applications is to be presented by a public display device.

In some implementations, the initiation of presentation of content by a public display device can be performed by a device other than user device 102. For example, a server (such as server 220 and/or any other suitable server) can initiate presentation of content associated with user device 102. Any suitable server (or other suitable computing device) can use any suitable technique or combination of techniques to initiate presentation of content associated with user device 102. In such implementations, 502 can be omitted and/or can be performed by another device other than user device 102.

At 504, server 220 can receive a request to present content by a public display device. Such a request can be received using any suitable technique or combination of techniques and can be received from any suitable source. For example, the request received at 504 can be received from user device 102, from another server that initiated presentation of content by a public display device, and/or from another server that received a request from user device 102 to present content by a public display device.

In some implementations, such a request can include a token and/or other information that is to be used to access content that is to be presented on the public display device. For example, the token and/or other information can be used by server 220 (and/or any other suitable computing device) to access content that may not be otherwise publicly accessible and/or content that is personalized to a particular user. In a more particular example, the token and/or other information can include a username and password, an authorization code, an encryption key, identifying information of content to be accessed, an address associated with content to be accessed, and/or any other suitable information that can be used to access and/or personalize content to be presented. Additionally, in some implementations, such token and/or other information can allow server 220 limited access to content based on control settings associated with a user and/or with user device 102. For example, information included in the token and/or other information can be information that allows access to only certain information that is not personal and/or sensitive information.

At 506, server 220 can request and/or receive location information associated with user device 102. In some implementations, server 220 can request location information from user device 102 based on identifying information and/or address information of user device 102 received at 504. Additionally or alternatively, in some implementations, location information associated with user device 102 can be received without server 220 requesting such information. For example, location information associated with user device 102 can be transmitted with a request to present content that is received by server 220 at 504.

At 508, user device 102 can transmit location information associated with user device 102 to server 220 and/or to any other suitable computing device. In some implementations, user device 102 can transmit the location information in response to a request from server 220 for location information associated with user device 102. Additionally or alternatively, user device 102 can transmit location information (and/or cause such information to be transmitted) with a request that content be presented on a public screen initiated at 502. As described above in connection with 406 of FIG. 4, location information can include any suitable location information.

In some implementations, in response to a request for location information received at 508, user device 102 can prompt a user to consent to such location information being transmitted to server 220 and/or used to determine one or more public screens on which to present content.

In some implementations, location information for user device 102 can be determined by server 220 based on location information associated with user device 102 received from one or more display devices. For example, as described above in connection with 406 of FIG. 4, one or more public display devices 110 can determine location information associated with user device 102 with respect to public display device 110. In such an example, each of these one or more public display devices 110 can transmit such location information associated with user device 102 to server 220, and server 220 can use this information to determine location information associated with user device 102 and/or to select one or more public display devices on which to present content (e.g., as described above in connection with 408).

At 510, server 220 can retrieve and/or receive location information associated with one or more public display devices 110 that are near user device 102. As described above, location information for public display devices 110 can be retrieved from a database of known locations of display devices. Additionally or alternatively, server 220 can transmit a request to public display devices 110 that are known or expected to be near user device 102.

In some implementations, identifying information of public display devices 110 near user device 102 can be transmitted by user device 102. For example, user device 102 can receive signals from one or more public display devices 110 that are near user device 102 and can pass identifying information associated with the signal to server 220.

Additionally, in some implementations, server 220 can request and/or retrieve status information of one or more public display devices 110 near user device 102. Such status information can include any suitable information related to the public display device. For example, such information can include information described above in connection with 410 of FIG. 4.

At 512, public display device 110 can transmit location information associated with display device 110, identifying information of display device 110, and/or status information of display device 110 to server 220 and/or to any other suitable device (e.g., user device 102, a server maintaining a database of such display device information, etc.). As described above, in some implementations, such location information can include any suitable information, can be coordinate based, can include directionality of one or more screens of display device 110, can be relative to other structures and/or devices having a known location, etc. In some implementations, identifying information can include any suitable identifying information to allow server 220 and/or user device 102 to address display device 110 and/or cause content to be presented by a screen of display device 110. In some implementations, status information can include any suitable information such as information related to display device 110 as described above in connection with 410 of FIG. 4.

Information transmitted by display device 110 at 512 can be transmitted in response to a request from server 220 (e.g., as shown in FIG. 5), can be transmitted periodically to server 220 and/or any other suitable computing device, can be transmitted in response to a change in information about display device 110 (e.g., in response to a change in location, a change in availability, a change in terms as to what content can be presented using display device 110, etc.), and/or can be transmitted at any other suitable time or in response to any suitable event.

At 514, server 220 can select one or more display devices based at least in part on location information associated with display device 110, location information associated with user device 102, status information of display device 110, information about one or more other display devices 110, and/or any other suitable information that can be used in selecting a display device. In some implementations, server 220 can select one or more display devices using any suitable technique or combination of techniques, such as techniques described above in connection with 408 of FIG. 4.

At 516, server 220 can cause an avatar associated with a user of user device 102 to be presented on the one or more display devices selected at 514 in association with the content that was requested for presentation at 504. Examples of the presentation of content by one or more display devices 110 are described in more detail below in connection with FIGS. 6A-6C.

FIG. 5B shows a diagram illustrating another example 520 of a data flow that can be used by user device 102, server 220, and/or public display device 110 to discover and/or select one or more display devices on which to present content in accordance with some implementations of the disclosed subject matter.

As shown in FIG. 5B, at 522, user device 102 can initiate the presentation of content by a public display device. Any suitable technique or techniques can be used to initiate presentation of content by a public display device. For example, one or more techniques described above in connection with 502 can be used to initiate presentation of content by a public display device.

At 524, user device 102 can detect the presence of one or more public display devices 110. User device 102 can detect the presence of public display devices 110 using any suitable technique or combination of techniques. For example, user device 102 can use any suitable antenna and/or sensor to detect the presence of one or more public display devices. In a more particular example, user device 102 can detect one or more signals emitted by a public display device. Such signals can include peer-to-peer communication signals such as Bluetooth, RFID signals, optical signals, audio signals, and/or any other suitable signal or signals emitted by a public display device. In some implementations, user device 102 can transmit a request that nearby public display devices make their presence known, and a signal detected at 524 can be a signal emitted in response to such a request, which can be a broadcast signal, a multi-cast signal, a unicast signal, and/or any other suitable signal. Additionally or alternatively, public display device 110 can emit a broadcast signal that is directed at any nearby device. Such a broadcast signal can be emitted on any suitable basis (e.g., periodically) and/or in response to any suitable action.

In some implementations, detection of public display devices at 524 can be omitted. For example, detection of public display devices at 524 can be omitted in cases where user device 102 obtains location information from a server (e.g., server 220) that maintains a database of display device locations as described below in connection with 526 and 528.

At 526, user device 102 can request and/or receive location information associated with one or more of the public display devices whose presence was detected at 524. In some implementations, such location information can be determined based on a signal used to detect the presence of a public display device as described above at 524. For example, a signal emitted by display device 110 can include a signal indicating that display device 110 is present and/or a signal indicating location information associated with display device 110.

In some implementations, user device 102 can request location information for one or more of the display devices detected at 524 by transmitting such a request to server 220 that maintains a database (or other suitable data) of display device location information. For example, as described above in connection with 406 of FIG. 4, user device 102 can transmit location information associated with user device 102 and request location information for nearby public display devices 110 based on the location information associated with user device 102.

In some implementations, user device 102 can request location information from nearby public display devices 110 using any suitable technique or combination of techniques. For example, in some implementations, user device 102 can emit a broadcast signal directed at any and all public display devices that receive the signal, where the broadcast signal can include a request for location information associated with the public display device. As another example, in some implementations, user device 102 can emit a multi-cast signal directed to a group of public display devices (e.g., using address information of the public display devices, using a particular frequency corresponding to those public display devices, using a particular encryption key corresponding to those public display devices, etc.), such as the public display devices whose presence was detected at 524. Such a multi-cast signal can include a request for location information associated with the public display device. As yet another example, in some implementations, user device 102 can emit one or more unicast signals each directed to a particular display device 110 (e.g., using address information of the public display device, using a particular frequency, using a particular encryption key, etc.). Such a unicast signal can include a request for location information associated with a particular display device 110.

In some implementations, user device 102 can also request status information of nearby display devices 110 from server 220 and/or from display devices 110. Such status information can include, for example, information related to the display device as described above in connection with 410 of FIG. 4.

In some implementations, location information associated with detected display devices received at 526 can be stored, such that the information can be utilized when, for example, selecting one or more display devices on which to present content. For example, the location information can be cached in memory 306 of user device 102.

At 528, server 220 can transmit location information associated with one or more display devices near user device 102 in response to a request for location information for nearby display devices received from user device 102. As described above in connection with 406 of FIGS. 4 and 526, location information associated with user device 102 can be used by server 220 to retrieve location information for nearby display devices.

At 530, display device 110 can transmit location information associated with the display device (or multiple display devices) to one or more nearby devices (which can include user device 102 and/or other display devices 110, as well as any other suitable devices). As described above in connection with 524 and 526, display device 110 can transmit such location information as a response to a request from user device 102 and/or in response to any suitable criteria being met, such as passage of a particular period of time since the location information was last transmitted. Such location information can be transmitted as a broadcast signal, a multi-cast signal, a unicast signal and/or any other suitable signal.

In some implementations, display device 110 can include location information for itself and/or location information for other nearby display devices which may or may not be in range of user device 102 with the location information transmitted at 530. For example, display device 110 can transmit its location information to other display devices and vice versa. Display device 110 can cache location information for itself and/or location information received from other display devices. In some implementations, display device 110 can pass the location information for other display devices to user device 102. In such an example, this can allow location information for display devices with which user device 102 cannot directly communicate to be received by user device 102.

In some implementations, in addition to location information, server 220 and/or display device 110 can also transmit identifying information of display device 110, and/or status information of display device 110 to user device 102. As described above, identifying information can include any suitable identifying information to allow user device 102 and/or server 220 to address display device 110 and/or cause content to be presented by display device 110. As described above in connection with 410 of FIG. 4, status information can include any suitable information, such as information related to display device 110.

At 532, user device 102 can retrieve location information associated with user device 102. As described above, this information can be determined based on one or more signals received by user device 102, such as GPS signals, signals transmitted from one or more display devices 110, and/or any other suitable signals for determining the location of user device 102. In some implementations, the location information can be determined at 532 and/or can be retrieved from memory 306 of user device 102 based on a previous determination of the location of user device 102.

At 534, user device 102 can select one or more public display devices (e.g., display device 110 and/or any other suitable public display device) on which to present content based at least in part on the location information associated with the one or more display devices received at 526. For example, user device 102 can select one or more display devices as described above in connection with 408 of FIG. 4.

At 536, user device 102 can cause an avatar associated with a user of user device 102 and/or a user account associated with user device 102 to be presented on the one or more display devices selected at 534 in association with the content that was requested for which presentation was initiated at 522. Examples of presentation of content by one or more display devices 110 are described in more detail below in connection with FIGS. 6A-6C.

FIG. 5C shows a diagram illustrating an example 540 of a data flow that can be used by a first display device 110-1, user device 102 and another display device 110-2 to discover and/or select one or more display devices on which to present content in accordance with some implementations of the disclosed subject matter.

As shown in FIG. 5C, at 542, user device 102 can initiate presentation of content by a public display device. Any suitable technique or techniques can be used to initiate presentation of content by a public display device. For example, one or more techniques described above in connection with 502 can be used to initiate presentation of content on a public screen.

At 544, display device 110-1 can detect the presence of a user device (e.g., user device 102) that has initiated presentation of content by a public display device. Display device 110-1 can use any suitable technique or combination of techniques to detect the presence of user device 102. For example, techniques described above in connection with 524 of FIG. 5B for user device 102 to detect the presence of display device 110 can similarly be used by display device 110-1 to detect the presence of user device 102, with any suitable modifications that may be required.

Additionally, in some implementations, display device 110-1 can detect a location of user device 102, receive location information related to user device 102, and/or request location information for user device 102 at 544 (and/or at any other suitable time). For example, such location information can be determined, received and/or requested as described above in connection with 406 of FIG. 4, and/or using any other suitable technique or combination of techniques.

At 546, one or more other display devices 110-2 can transmit location information associated with display device 110-2, user device 102 (e.g., relative to display device 110-2), and/or any other suitable devices to nearby devices, such as display device 110-1. In some implementations, such information can be transmitted by display device 110-2 in response to a request (e.g., from display device 110-1) and/or can be transmitted on any other basis (e.g., periodically, when a nearby user device initiates presentation of content by a public display device, etc.). In some implementations, display device 110-1 can also transmit location information associated with display device 110-1 and/or user device 102 to nearby devices, such as display device 110-2.

In some implementations, display device 110-2 can also transmit identifying information of display device 110-2, and/or status information of display device 110-2 to display device 110-1. As described above, identifying information can include any suitable identifying information to allow display device 110-1 and/or user device 102 to address display device 110-2 and/or cause content to be presented by a screen of display device 110-2. As described above in connection with 410 of FIG. 4, status information can include any suitable information, such as information related to display device 110-2.

At 548, display device 110-1 can determine a location of user device 102 relative to display device 110-1, display device 110-2 and/or any other nearby public display devices. Note that in some implementations, nearby public display devices can include any public display device located within any suitable distance of display device 110-1. Additionally, in some implementations, nearby display devices can be determined based on one or more factors related to the location information associated with the user device and/or any other properties of the user device. For example, if user device 102 is located within a building, such as a mall, airport, stadium, etc., display devices located outside of the building can be considered to not be nearby. As another example, if user device 102 is moving at a speed that indicates that user 104 is walking, the distance at which a display device is considered to be a nearby display device can be smaller than in cases where user device 102 is moving at a speed that indicates that user 104 is using a vehicle (e.g., a bicycle, a bus, an automobile, etc.). In some implementations, display device 110-1 can communicate with nearby display devices using any suitable technique or combination of techniques, which can include peer-to-peer communication techniques, communication over a communication network such as a local area network, communication over the Internet, and/or using any other suitable communication technique or combination of techniques.

In some implementations, display device 110-1 can determine the location of user device 102, display device 110-1, display device 110-2, and/or any other suitable display devices using any suitable technique or combination of techniques. For example, display device 110-1 can determine the locations based only on proximity (e.g., a distance between user device 102 and display device 110-1), based on proximity and surroundings of display device 110-1 and/or user device 102, and/or based on any other suitable factor or combination of factors considered with proximity of the devices. In a more particular example, display device 110-1 can determine whether user device 102 is within a viewing area of a screen of display device 110-1. In some implementations, display device 110-1 can be programmed with one or more fixed viewing areas corresponding to one or more screens and can compare the location information associated with user device 102 with the viewing area to determine whether there is overlap.

In some implementations, display device 110-1 can determine the location of user device 102 with respect to one or more other nearby display devices, such as display device 110-2. In such implementations, multiple display devices (e.g., display device 110-1 and display device 110-2) can each determine location information for each other nearby display device and can independently determine whether to present the content initiated by user device 102. Additionally or alternatively, multiple display devices (e.g., display device 110-1 and display device 110-2) can coordinate to determine which display device is to present the content initiated by user device 102. In some implementations, multiple display devices (e.g., display device 110-1 and display device 110-2) can coordinate in a master-slave relationship such that, for example, display device 110-1 determines the location of user device 102 in relation to both display device 110-1 and display device 110-2 and determines which display device or devices are to present content. Note that, although example 540 is described in connection with two display devices, any suitable number of public display devices can communicate with display device 110-1 and display device 110-1 (and/or any other suitable display devices) can determine on which display device or devices content initiated for presentation by user device 102 is to be presented.

At 550, display device 110-1 can determine whether content initiated for presentation by user device 102 is to be presented by display device 110-1 and/or whether the content is to be presented by another display device such as display device 110-2. As described above, display device 110-1 can determine whether the content is to be presented by display device 110-1 and/or any other suitable display device based on any suitable criterion or criteria such as the proximity of display device 110-1 and user device 102, whether user device 102 is in a viewing area of display device 110-1, etc.

At 552, display device 110-1 can cause an avatar associated with a user of user device 102 to be presented by display device 110-1 (and/or by another display device, such as display device 110-2) in association with the content for which presentation was initiated at 542. Examples of presentation of content by one or more display devices 110 are described in more detail below in connection with FIGS. 6A-6C.

Figure 6A:
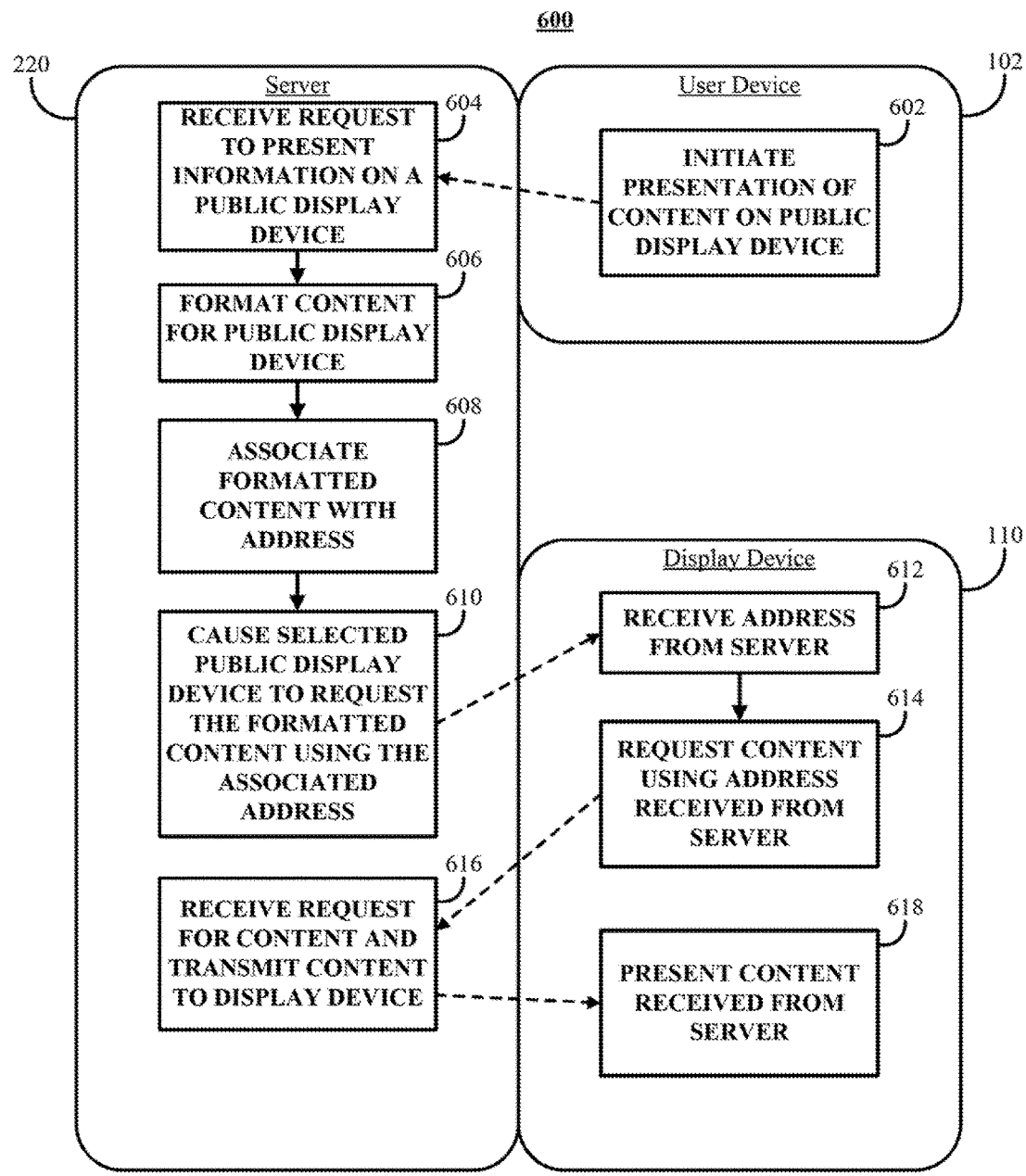
FIGS. 6A-6C show diagrams illustrating examples of data flows that can be used in conjunction with the process of FIG. 4 and data flows of FIGS. 5A-5C to cause content to be presented on a selected public display device in accordance with some implementations of the disclosed subject matter.
Figure 6B:
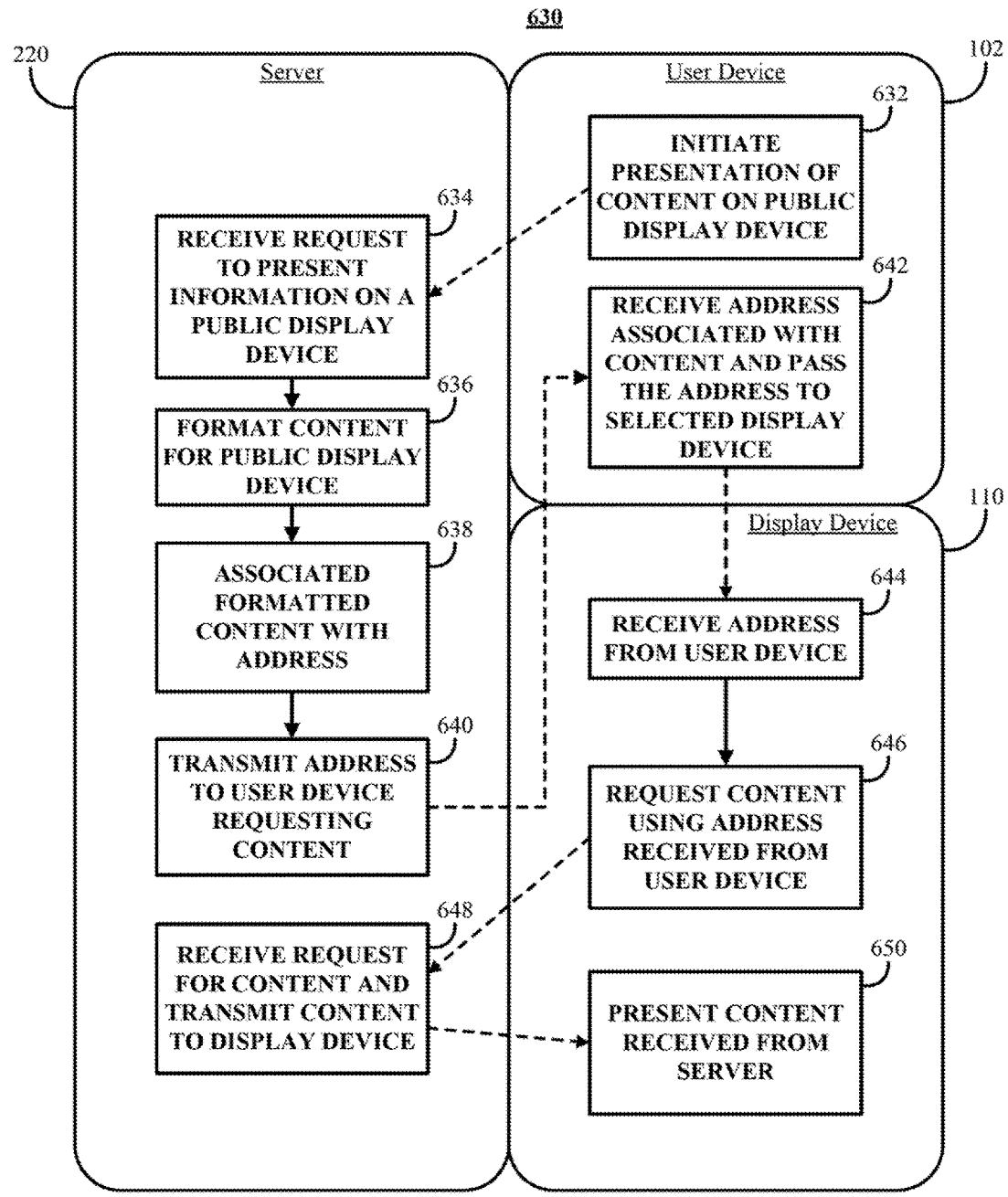
Figure 6C:
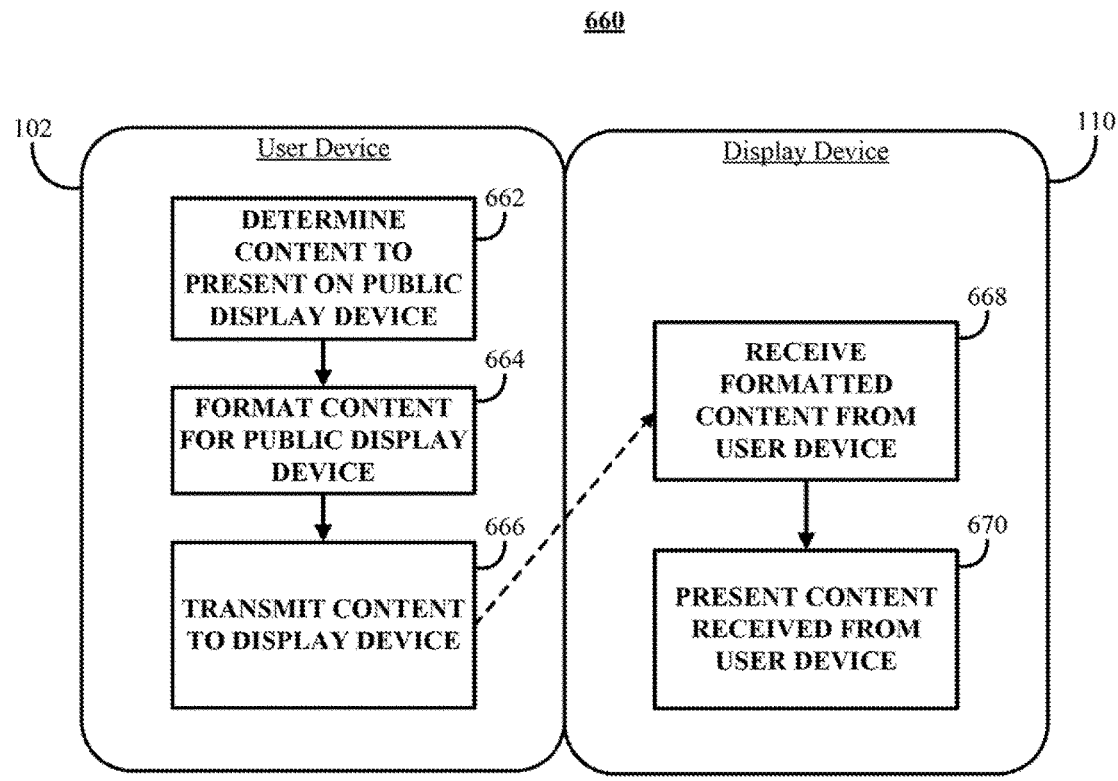

FIGS. 6A-6C show diagrams illustrating examples of data flows that can be used in conjunction with process 400 of FIG. 4 and data flows of FIGS. 5A-5C to cause content to be presented on a selected public display device in accordance with some implementations of the disclosed subject matter.

FIG. 6A shows a diagram illustrating an example 600 of a data flow that can be used by server 220, user device 102, and display device 110 to cause requested content to be presented by one or more display devices in accordance with some implementations of the disclosed subject matter.

At 602, user device 102 can initiate presentation of content by one or more public display devices. User device 102 can use any suitable technique to initiate presentation of content by one or more public display devices and can initiate such presentation in response to any suitable input. For example, user device 102 can use techniques described above in connection with 502 of FIG. 5 to initiate presentation of content by one or more public display devices in response to an input as also described above in connection with 502 of FIG. 5. As described above in connection with 502 of FIG. 5, presentation of content can be initiated by a device other than user device 102, such as by a server or other computing device (e.g., server 220 and/or any other computing device).

At 604, server 220 can receive a request to present content using a public display device. Such a request can be received using any suitable technique or combination of techniques and can be received from any suitable source. For example, such a request can be received as described above in connection with 504 of FIG. 5.

In some implementations, the request can include information that identifies the content that is to be presented. Such identifying information of the content to be presented can include any suitable information that can be used by server 220 to determine which content is to be presented by a public display device. For example, identifying information of the content can include a portion of a uniform resource identifier associated with the content. As another example, identifying information of the content can include any suitable information for identifying the information, such as an identification number associated with a request for the content. In a more particular example, information used to identify the content can include identifying information of user device 102 that requested that the content be presented and/or an application installed on and/or being executed by user device 102, where the application is associated with the content to be presented. This identifying information can be used, for example, to retrieve the content to be presented from a server associated with the content (an address of which can be included in a request for content, can be looked up based on identifying information of the application, and/or can be determined using any other suitable technique or combination of techniques). As described above in connection with 504 of FIG. 5, such identifying information can be included in, for example, a token which includes information that can be used to access the content to be presented.

In some implementations, a request to present content received at 604 can include identifying information of one or more display devices on which the content is to be presented. For example, in some implementations, user device 102, display device 110 and/or server 220 (which may or may not be the same as server 220 shown in FIG. 6A) can request that content be presented and can include identifying information (e.g., address information) of one or more display devices on which the content is to be presented.

In some implementations, any suitable technique or combination of techniques can be used by any suitable device or devices to determine which display device is to be used to present the requested content. For example, in some implementations, a determination of which display device or devices are to be used to present content can be made based on one or more of flows 500, 520, and/or 540 as described above in connection with FIGS. 5A-5C. Such a determination can be made prior to the request being issued, in parallel with a process for requesting the content, after the content is requested for presentation, and/or at any other suitable time or times.

At 606, server 220 can format content (or cause the content to be formatted) for a selected public display device (or devices) on which the content is to be presented. In some implementations, such formatting can be performed based on information about the public display device or devices on which the content is to be presented (e.g., as received at 410) and/or based on any other suitable information (e.g., how far the user is from a display device on which the content is to be presented). Formatting of the content can include any suitable formatting, such as formatting the size of a window in which the content is to be presented, formatting how large the content is to be presented within the window, colors to be used in presenting the content, how closely content is to be spaced during presentation, which content is to be presented (e.g., based on the sensitive and/or personal nature of the content), and/or any other suitable formatting.

In some implementations, server 220 can access the content that is to be presented and format the content at 606. Additionally or alternatively, server 220 can transmit instructions regarding how the content is to be formatted and/or parameters of a display device on which the content is to be presented to a server (and/or other suitable computing device) that is to transmit the content to the public display device for presentation.

At 608, server 220 can associate the content formatted at 606 with an address or location at which the content is to be retrieved. In some implementations, any suitable technique or combination of techniques can be used to associate the content with the address. For example, an association between the address and the content can be stored in memory 326 of server 220. As another example, the address can be associated with information that can be used to retrieve the content (and/or cause the content to be transmitted to a particular destination, such as display device 110).

Additionally, in some implementations, the address can be determined and/or created using any suitable techniques. For example, the address can be an address created in response to receiving the request to present content at 604. As another example, the address can be a pre-existing address associated with the content, which can be received, for example, with the request to present content at 604. In some implementations, server 220 can create the address associated with the formatted content. Additionally or alternatively, an address at which the content is to be accessed can be created by a computing device (such as a server) associated with a provider of the content (which may or may not be a third-party entity that does not own or operate server 220).

Additionally or alternatively, in some implementations, server 220 can cause the content to be stored at a location from which it can be communicated to display 110. For example, server 220 can cause the content to be pushed to one or more selected display devices 110 based on address information of the one or more selected display devices 110.

At 610, server 220 can cause one or more selected public display devices to request the formatted content using the address associated with the formatted content. For example, in some implementations, the address associated with the formatted content can be transmitted to one or more selected display devices (e.g., display device 110) based on address information associated with the selected display devices. In some implementations, information identifying which one or more screens of a particular display device are to be used to present the formatted content can be transmitted to the one or more selected display devices.

Additionally or alternatively, in some implementations, 610 can be omitted for one or more selected display devices, and server 220 can cause the formatted content to be pushed to the display device, as described above.

In some implementations, an address associated with the formatted content can be any suitable address that can be used to request content. For example, the address can include a uniform resource identifier (URI), a uniform resource number (URN), a uniform resource locator (URL), an internet protocol (IP) address, a media access control address, any other suitable address, and/or any suitable combination thereof.

At 612, display device 110 can receive the address from server 220. In some implementations, the address can include any suitable address from which the formatted content can be requested. For example, the address can include any suitable address information as described above in connection with 610.

In some implementations, instructions relating to formatting of the content can also be received at 612 (and/or can be received at any other time, such as at 618 with the formatted content). Such instructions can include a size of a window that is to be used to present the content, a screen and/or a portion of screen of display device 110 that is to be used to present the content, and/or any other suitable formatting information.

At 614, display device 110 can request the content using the address received from server 220. Display device 110 can use any suitable technique or combination of techniques to request the content. For example, display device 110 can execute a web browser (and/or any other suitable application) having a window of a particular size and/or positioned at a particular location, which can be used to request the content from the address or addresses received at 612. As another example, display device 110 can request the content from the address or addresses received at 612 using an operating system in lieu of a particular application (such as a web browser).

At 616, server 220 can receive a request for content and transmit content to display device 110. In some implementations, server 220 that receives the request for content at 616 can be a different server than a server that received the request to present content at 604, a server that formatted the content at 606, a server that associated the formatted content with an address at 608, and/or a server that caused the public display device to request the formatted content at 610.

In some implementations, for example, as described above in connection with 608 and 610, server 220 can push content to one or more selected display devices 110. In such implementations, one or more of 610-616 can be combined and/or omitted.

At 618, display device 110 can cause the content received from server 220 (or any other suitable source) to be presented. In some implementations, the content can be received and presented using any suitable technique or combination of techniques. For example, the content can be formatted as a web page, and presenting the content can include loading the web page and presenting the resultant content. As another example, the content can be formatted as a file including the content formatted as one or more media objects (e.g., image, video, text, etc.), and presenting the content can include downloading the file and presenting the media objects according to instructions included in the file and/or transmitted in association with the file. As yet another example, the content can be formatted as a stream of media content (e.g., a stream of video content), and presenting the content can include streaming the media content and using one or more applications, any other appropriate software (e.g., plug-ins, extensions, add-ons, applets, etc.), and/or any other suitable hardware to cause the content to be presented by display device 110. Any other combination of these and/or any other suitable techniques can be used to present the content.

FIG. 6B shows a diagram illustrating another example 630 of a data flow that can be used by server 220, user device 102, and display device 110 to cause requested content to be presented by one or more display devices in accordance with some implementations of the disclosed subject matter.

At 632, user device 102 can initiate presentation of content by one or more public display devices. Any suitable technique or combination of techniques can be used to initiate presentation of content, which can also be carried out by a device other than user device 102. For example, techniques described above in connection with 602 of FIG. 6A can be used to initiate presentation of content.

At 634, server 220 can receive a request to present content using a public display device. Any suitable technique or combination of techniques can be used to receive the request to present content and/or such a request can be received from any suitable source. For example, the request for content can be received in accordance with the techniques described above in connection with 604 of FIG. 6A.

At 636, server 220 can format the content (and/or can cause the content to be formatted) for a selected public display device (or devices) on which the content is to be presented. Any suitable technique or combination of techniques can be used to format the requested content. For example, the requested content can be formatted in accordance with the techniques described above in connection with 606 of FIG. 6A.

At 638, server 220 can associate the content formatted at 636 with an address or location at which the content is to be retrieved. Any suitable technique or combination of techniques can be used to associate the formatted content with the address. For example, the formatted content can be associated with the address in accordance with the techniques described above in connection with 608 of FIG. 6A. Additionally, as described above in connection with FIG. 6A, associating the formatted content with an address can be omitted in cases where the content is to be pushed to the display device.

At 640, server 220 can transmit the address to user device 102 to be relayed to a display device that is to be used to present the content. In some implementations, server 220 can use any suitable technique or combination of techniques to transmit the address to user device 102. Additionally, in some implementations, the address can be communicated to user device 102 in response to an initiation of the presentation of content on one or more public display devices, and user device 102 can cache or otherwise store the address to be communicated to one or more display devices 110 which are to be used to present the requested content. For example, as user device 102 moves through environment 100 of FIG. 1, user device 102 can communicate the address transmitted at 640 to various display devices 110-1 to 110-6 as needed.

At 642, user device 102 can receive the address associated with the formatted content and pass the address to the selected display device. For example, user device 102 can pass the address to a display device selected in accordance with process 400 and/or one or more data flows described in connection with FIGS. 5A-5C.

In some implementations, formatting information can also be passed to the selected display device at 642. Formatting information can include any suitable information to be used by the selected display device to present the content, such as information described above in connection with 606 of FIG. 6A.

At 644, display device 110 can receive the address or addresses from user device 102. As described above, in some implementations, display device 110 can also receive information related to formatting of the content associated with the address. Any suitable technique or combination of techniques can be used to receive the address from user device 102. For example, the address or addresses can be received in accordance with the techniques described above in connection with 612 of FIG. 6A for receiving such an address from server 220.

At 646, display device 110 can request content from server 220 using the address provided by user device 102. Any suitable technique or combination of techniques can be used to request content from server 220. For example, a request for content can be made to server 220 in accordance with the techniques described above in connection with 614 of FIG. 6A.

At 648, server 220 can receive a request for content and transmit content to display device 110. Any suitable technique or combination of techniques can be used by server 220 to receive the request for content and transmit content to display 110. For example, the request for content can be received by server 220 and server 220 can transmit the content in accordance with the techniques described above in connection with 616 of FIG. 6A.

At 650, display device 110 can cause the content received from server 220 (or any other suitable source) to be presented. Any suitable technique or combination of techniques can be used by display device 110 to present the content. For example, the content can be presented by display device 110 in accordance with the techniques described above in connection with 618 of FIG. 6A.

FIG. 6C shows a diagram illustrating an example 660 of a data flow that can be used by user device 102 and display device 110 to cause requested content to be presented on one or more display devices in accordance with some implementations of the disclosed subject matter.

At 662, user device 102 can determine that content is to be presented by a public display device and can determine which content is to be presented on the public display device. User device 102 can use any suitable technique or combination of techniques to determine that content is to be presented and/or determine which content is to be presented. For example, user device 102 can use techniques described above in connection with 602 of FIG. 6A for initiating presentation of content by one or more public display devices.

In some implementations, a display device on which the content is to be presented can be determined prior to determining which content is to be presented at 662, after determining which content is to be presented, and/or in parallel with determining which content is to be presented. Additionally, in some implementations, any suitable technique or combination of techniques can be used to select one or more display devices to be used to present content in accordance with, for example, process 400 and/or one or more data flows described in connection with FIGS. 5A-5C.

At 664, user device 102 can format content (and/or cause the content to be formatted) for a selected public display device (or devices) on which the content is to be presented. Any suitable technique or combination of techniques can be used to format the requested content. For example, the requested content can be formatted in accordance with the techniques described above in connection with 606 of FIG. 6A.

At 666, user device 102 can transmit the content that is to be presented to display device 110. In some implementations, user device 102 can transmit instructions to display device 110 to cause the content transmitted at 666 to be presented by display device 110. Any suitable technique or combination of techniques can be used to transmit the content and/or instructions to present the content. For example, in some implementations, user device 102 can transmit the content and/or instructions to display device 110 using peer-to-peer communication techniques (which can include intermediate devices, such as in an ad-hoc network). As another example, user device 102 can transmit the content and/or instructions to display device 110 over a network, such as a local area network, to which both user device 102 and display device 110 are connected. As yet another example, user device 102 can transmit the content and/or instructions using optical signals, audio signals, and/or any other suitable signal or signals that can be received by display device 110.

In some implementations, user device 102 can transmit formatting information to display device 110. Formatting information can include any suitable information to be used by the selected display device to present the content, such as information described above in connection with 606 of FIG. 6A.

In some implementations, user device 102 can transmit the content as media content (e.g., images, an avatar, text, etc.) or other discrete elements that can be used by display device 110 to format and present the content. For example, user device 102 can transmit the content as one or more files and/or objects and can transmit code (e.g., HTML, XML, Java, JavaScript, etc.) that is to be used to format and present the content transmitted as files and/or objects.

Additionally or alternatively, user device 102 can transmit the content as data that is to be presented by display device 110. For example, user device 102 can format the content as video data to be streamed and transmit the formatted content to display device 110 as a stream of video data that is to be presented by display device 110. As another example, user device 102 can format the content as image data and transmit the formatted content to display device 110 as an image file that is to be presented by display device 110. In such examples, the content that is to be presented can include text, images, video, an avatar associated with a user of user device 102, etc., and these individual elements can be combined and/or formatted by user device 102 as video data, image data, etc., which can then be transmitted to display device 110 for presentation. Display device 110 can receive the video data, image data, etc., and, using hardware, software and/or firmware associated with display device 110, can cause this data to be presented. Transmitting the content in this way can, for example, make it more difficult for display device 110 to extract text from the content because the text is received within video data and/or image data and not received as text data.

At 668, display device 110 can receive the formatted content from user device 102. Display device 110 can use any suitable technique or combination of techniques to receive the content from user device 102.

At 670, display device 110 can cause the content received from user device 102 (or any other suitable source) to be presented. Any suitable technique or combination of techniques can be used by display device 110 to present the content. For example, the content can be presented by display device 110 in accordance with the techniques described above in connection with 618 of FIG. 6A.

In some implementations, display device 110 can present the content based on formatting information received in connection with the content. For example, display device 110 can receive formatting information from user device 102 as described above in connection with 666. Additionally or alternatively, display device 110 can present the content as video data and/or image data received from user device 102, for example, as described above in connection with 666.

FIGS. 7A-7D show examples of a user interface for causing content to be presented by a public display device and presentation of content by a public display device in accordance with some implementations of the disclosed subject matter.

FIG. 7A shows an example 700 of a user interface 702 for presenting content by a public display device (e.g., display device 110) and content that is being presented on the public display device in accordance with some implementations of the disclosed subject matter.

As shown in FIG. 7A, user device 102 is presenting user interface 702 for providing directions to a restaurant (e.g., using a map application, a web browser application, etc.). In some implementations, user interface 702 can include a user input element 704 which, upon selection, can cause the content (in this case directions) to be presented to the user via one or more public display devices (e.g., using process 400 described above in connection with FIG. 4) and/or locally using user device 102. In some implementations, any suitable technique or combination of techniques can be used to present the directions. For example, the directions can be presented as turn-by-turn directions, a list of one or more actions to take to get to the restaurant from a current location, a map with a highlighted route, and/or using any other suitable technique or combination of techniques for presenting the directions.

In some implementations, prior to content associated with user device 102 being presented by display device 110, display device 110 can present any suitable content. For example, as shown in FIG. 7A, display device 110 is presenting content 706 that is associated with another user device (i.e., a user device other than user device 102). Avatar 708, presented with content 706, can be associated with a user associated with the other user device. Content 706 can include, for example, a notification for a user associated with avatar 708.

As another example, display device 110 can also present other content that may not be associated with a particular user and/or a particular user device. For example, as shown in FIG. 7A, display device 110 can present advertisements 710 and 712.

Additionally or alternatively, in some implementations, one or more portions of a screen of display device 110 that are not being used to present content associated with a particular user and/or a particular user device can be used to present any suitable content or no content at all. For example, a background image can be presented as content 710, the current local weather and/or a forecast of the local weather can be presented as content 712, etc. In some implementations, one or more portions of the screen of display device 110 that are not being used to present content associated with a particular user and/or a particular user device can be used to present content that changes based on any suitable criteria, such as the passage of time, one or more users being detected as being present near the screen of display device 110, etc.

In some implementations, for example, as shown in FIG. 7A, a screen of display device 110 can be partitioned into windows or areas that can each be used to present different content.

FIG. 7B shows an example 720 of user interface 702 including a query to receive user input to determine whether to present the content on a public display device in accordance with some implementations of the disclosed subject matter.

As shown in FIG. 7B, a user interface element 722 can be presented to query a user as to whether the content (e.g., the content which is to be presented in response to selecting "start" in FIG. 7A) is to be presented using one or more public display devices. User interface element 722 can be presented using any suitable technique or combination of techniques. For example, user interface element 722 can be presented as a pop-up window, a drop down list, etc. that can be used to receive input from a user regarding whether to use one or more public display devices to present the content, whether to use a display of user device 102 to present the content (and/or an audio output of user device 102), and/or an output of any other suitable device to present the content.

In some implementations, user interface element 722 can include a "No" user input element 724 and a "Yes" user input element 726. Selection of "Yes" user input 726 can cause the content to be presented by a public display device (selected, for example, using process 400 described above in connection with FIG. 4 and/or one or more flows described above in connection with FIGS. 5A-5C), while selection of "No" user input 724 can cause presentation using public display devices to be inhibited. Note that user interface element 722 is merely shown as an example and any suitable user interface can be used to determine whether to present content on one or more public display devices. Additionally, in some implementations, as described herein, a determination as to whether to present content using one or more public display devices can be made on the basis of settings associated with a user and/or a user device.

FIG. 7C shows an example 730 of display device 110 being used to present content associated with user device 102 in accordance with some implementations of the disclosed subject matter.

As shown in FIG. 7C, user interface 732 can be presented by user device 102. For example, user interface 732 can be presented by an application for presenting content (e.g., a map application in the case of directions), as a notification, and/or using any other suitable technique or combination of techniques. As shown, user interface 732 can include an avatar 734 that is associated with a user of user device 102 and/or is associated with the content presented by user interface 732. As described above, for example, in connection with 412 of FIG. 4, avatar 734 can be selected by a user and/or can be assigned. In some implementations, user interface 732 and/or avatar 734 can be presented by user device 102 for a predetermined period of time after presentation by a public display device is initiated, presented on a lock screen of user device 102 during presentation of the content by a public display device, a persistent notification in a notification manager of an operating system of user device 102, presented using any other technique or combination of techniques, and/or presented in response to any suitable criteria being met. It should be noted that the presentation of user interface 732 and avatar 734 in FIG. 7C is an illustrative example, and that user interface 732 and/or avatar 734 can be presented by user device 102 in any suitable manner. In some implementations, the presentation of user interface 732 and/or avatar 734 by user device 102 can be omitted.

In some implementations, for example as shown in FIG. 7C, display device 110 can present the requested content 736 (e.g., directions) which can correspond to user interface 732 and/or the content presented by user interface 702. Additionally, in some implementations, content 736 can be presented by display device 110 as a result of process 400 described above in connection with FIG. 4, one or more of flows described above in connection with FIGS. 5A-5C, one or more of flows described above in connection with FIGS. 6A-6C, and/or any other suitable process or data flow.

In some implementations, content 736 can be presented in association with avatar 734 which is associated with a user of user device 102, user device 102 and/or content 736 (and/or user interface 732). In some implementations, as described above in connection with 412 of FIG. 4, a size at which avatar 734 is presented (e.g., in relation to content 736, in relation to the window in which content 736 and avatar 734 are presented, etc.) can be based on a distance between display device 110 and user device 102.

FIG. 7D shows another example 740 of display device 110 being used to present content associated with user device 102 in accordance with some implementations of the disclosed subject matter. As shown in FIG. 7D, avatar 734 is presented relatively smaller than avatar 734 in FIG. 7C, which can be responsive to user device 102 moving relatively closer to display device 110. Note that distance between user device 102 and display device 110 is not represented in FIGS. 7A-7D, which show examples of content presented by user device 102 and display device 110. As another example, avatar 734 can be presented at a smaller size in response to a predetermined period of time passing since content 736 was first presented by display device 110 (e.g., after a user has had a chance to locate avatar 734). As yet another example, avatar 734 can be presented at a smaller size in response to a selection in a user interface of user device 102 acknowledging that the user has located avatar 734 as presented by display device 110.

FIG. 8 shows an example 800 of a process for determining which content is to be presented on public display devices based on control settings in accordance with some implementations of the disclosed subject matter.

At 802, process 800 can determine an initial control setting to be used to determine which content is to be presented by a public display device based on settings associated with a user of the user device requesting that the content be presented, settings associated with the user device requesting that the content be presented, and/or information about the public display device on which the content is to be presented.

In some implementations, any suitable settings can be associated with a user and/or a user device (e.g., user device 102). For example, settings can include a default control level at which to present content by a public display device. Such a default control level can include information indicating whether to present personal information and/or sensitive information, such as usernames, email addresses, account numbers, phone numbers, images, and/or any other suitable information of a personal and/or sensitive nature associated with a user and/or any other suitable entity (e.g., a contact, a business associated with the user, etc.). As another example, settings can include settings specific to an application with which the content to be presented is associated. For example, a first application, such as a map application, may not normally reveal much personal information and/or sensitive information when content associated with the application is presented by a public display device. In such an example, settings associated with the first application can permit all content associated with that application to be presented by a public display device. As another example, a second application, such as an email application, may normally reveal more personal information and/or sensitive information of a user associated with the email application and/or information of other users. In such an example, settings associated with the second application can inhibit most content associated with that application from being presented by a public display device. In some implementations, process 800 can receive input indicating what type of information is to be considered personal information. Such an indication can be a positive indication that indicates that a particular type of information is to be considered personal information, or such an indication can be a negative indication that indicates that a particular type of information is no longer to be considered personal information. Such indications of what is to be considered personal information can be pertinent to any suitable subset of applications, operating systems and/or user accounts associated with the user device and/or user. For example, a user can indicate that usernames associated with a particular application, such as a social networking service application, are not personal information. Additionally or alternatively, a user of a particular application or service can indicate an extent to which information and/or content associated with the user is personal information. For example, a user can indicate that all content and information associated with the user's account on a social networking service is to be considered personal information and not presented by a public display device.

In some implementations, process 800 can determine control settings based on information about the public display device on which the content is to be presented. For example, if information related to the public display device (e.g., received at 410 as described above in connection with FIG. 4) indicates that a viewable area of the display device is relatively public, process 800 can determine that the initial control settings are to be more stringent regarding the presentation of personal and/or sensitive information. As another example, if information related to the public display device indicates that a viewable area of the display device is relatively private, process 800 can determine that the initial control settings are to be less stringent regarding the presentation of personal information and/or sensitive information. As yet another example, if information related to the public display device indicates that content associated with one or more other users is being presented by the public display device, process 800 can determine that the initial control settings are to be more stringent regarding the presentation of personal information and/or sensitive information. As still another example, if information related to the public display device indicates that a threshold number of people are detected in proximity to the display device, process 800 can determine that the initial control settings are to be more stringent regarding the presentation of personal and/or sensitive information.

In some implementations, process 800 can determine control settings based on a distance between the user device associated with the content and the public display device being used to present the content. For example, if a user device is relatively distant from the display device, process 800 can determine that control settings are to be more stringent. As another example, if a user device is relatively closer to the display device, process 800 can determine that control settings are to be less stringent. Additionally, in some implementations, process 800 can control settings based on whether a user has brought a user device within a threshold distance of the display device that is being used to present the content, such as bringing an NFC antenna of the user device within an operational distance of an NFC antenna associated with the display device (e.g., as described above in connection with process 400 of FIG. 4). In such implementations, the user can take such an action at any suitable time and/or can be prompted to take such an action in response to a certain condition being met (e.g., if the display device may present personal information).

In some implementations, process 800 can determine control settings based on a size at which the content is to be presented by the public display device being used to present the content. For example, if the content is to be presented at a larger size, process 800 can determine that control settings are to be more stringent as the larger content may be more easily observed by people other than the user associated with the content. As another example, if the content is to be presented at a relatively small size, process 800 can determine that control settings are to be less stringent as the smaller content may be less easily observed by people other than the user associated with the content.

In some implementations, the control settings can be determined based on the settings associated with the user, settings associated with the user device, settings associated with an application with which the content is associated, information about the public display device, information about a size at which the content is to be presented, and/or any other suitable information.

In some implementations, a control level associated with the user, the user device and/or the application with which the content is associated can act as a floor such that process 800 cannot determine an initial control setting below the floor. For example, if user settings indicate that a most stringent control setting is to be used when presenting content using a public display device, process 800 can determine that the initial control setting is to be the most stringent control setting regardless of other information, such as privacy of the viewing area of the public display device.

At 804, process 800 can cause content to be presented based on the control setting determined at 802. For example, if process 800 determines that a relatively stringent control setting is to be used in presenting the content, process 800 can cause personal information and/or sensitive information to be omitted from presentation. As another example, if process 800 determines that a relatively stringent control setting is to be used in presenting the content, process 800 can cause personal information and/or sensitive information to be wholly or partially obscured or altered prior to presentation of the content. Process 800 can use any other suitable technique or combination of techniques to inhibit personal information and/or sensitive information from being presented.

In some implementations, a public display device (e.g., display device 110) and/or one or more applications executed by the public display device can be inhibited from storing certain user information that is used to request and/or receive content to be presented by the display device. For example, the public display device can be inhibited from storing a cookie or other information generated and/or received during a session in which content associated with a particular user device is presented. As another example, personal information associated with a user can be deleted after the personal information is used for a particular purpose, such as to access the content to be presented. In some implementations, other information can be retained, such as an indication that a particular user used the display device to present content related to a particular subject, a particular product, and/or any other suitable information. In such implementations, information identifying the user can be treated in one or more ways before it is stored or used, so that personal information is removed. For example, server 220 (and/or any other suitable computing device) can associate the user with identifying information that does not include personal information of the user (e.g., that does not include an email address, a username, etc.). In a more particular example, a unique random string of characters of a particular length can be associated with the user, and display device 110 can retain this number, which can later be used to determine whether the same user is interested in a certain topic based on the content that the user previously requested.

In some implementations, process 800 can cause any personal information and/or sensitive information stored by one or more computing devices involved in presenting content on a public screen to be erased from memory of the computing device (or otherwise disposed of) after a predetermined period of time has elapsed. For example, a public display device that presents the content (e.g., display device 110), a server that causes the content to be presented (e.g., server 220), and/or a user device associated with the content (e.g., user device 102) used in the process of causing content to be presented by the public display device and/or presenting the content by the public display device can store personal information during use in retrieving and/or presenting the content, and can cause that personal information to be erased (or otherwise disposed of) after the predetermined period of time has elapsed.

At 806, process 800 can determine whether user input has been received to update a user control setting. Such user input can be received using any suitable technique or combination of techniques, such as through a user interface described below in connection with FIGS. 9A-9F. If process 800 determines that user input to update user control settings has not been received ("NO" at 806), process 800 can proceed to 808.

At 808, process 800 can determine whether there has been a change in circumstances indicating that control settings are to be updated. In some implementations, any suitable change in circumstances can indicate that control settings are to be updated. For example, as described above in connection with 802, when a user device is relatively distant from a display device on which content is being presented the control setting can be set to be relatively stringent. As the user device moves closer to the display device, process 800 can determine that circumstances have changed and control settings are to be updated. As another example, as described above in connection with 802, when content associated with another user is being presented by the display device on which content is being presented, the control settings can be set to be relatively stringent. If the content associated with the other user is no longer being presented, process 800 can determine that circumstances have changed and that control settings are to be updated. Conversely, if content associated with yet another user begins to be presented by the display device, process 800 can also determine that circumstances have changed and that control settings are to be updated.

If process 800 determines that there has not been a change in circumstances to cause control settings to be updated ("NO" at 808), process 800 can return to 804 and continue to present content based on the previously determined control settings. Otherwise, if process 800 determines that user input to update control settings has been received ("YES" at 806) and/or that there has been a change circumstances to change control settings ("YES" at 808), process 800 can proceed to 810.

At 810, process 800 can determine updated control settings based on the user input (e.g., user input changing the control settings was received at 806) and/or the changed circumstances (e.g., changed circumstances that caused the control settings to be updated).

In some implementations, upon updating the control settings at 810, process 800 can return to 804 and cause content to be presented based on the updated control settings. For example, in response to the control settings being updated at 810, process 800 can cause presentation of personal information to be controlled in accordance with the updated settings. For example, if the control settings become less stringent, process 800 can cause more personal information to be presented, such as identifying information of a user from whom a message being presented by the public display device has been received. As another example, if the control settings become more stringent, personal information that was being presented can be inhibited from presentation. In a more particular example, in response to the control settings becoming more stringent, if a public display device was being used to present a feed associated with a user's social network account, images in the feed that are not publicly available (e.g., images that are not shared publicly by a user that posted the image) can be inhibited from presentation on the public screen.

FIGS. 9A-9F show examples of a user interface for setting control settings and content being presented on a public screen in accordance with the control settings in accordance with some implementations of the disclosed subject matter.

Figure 9A:
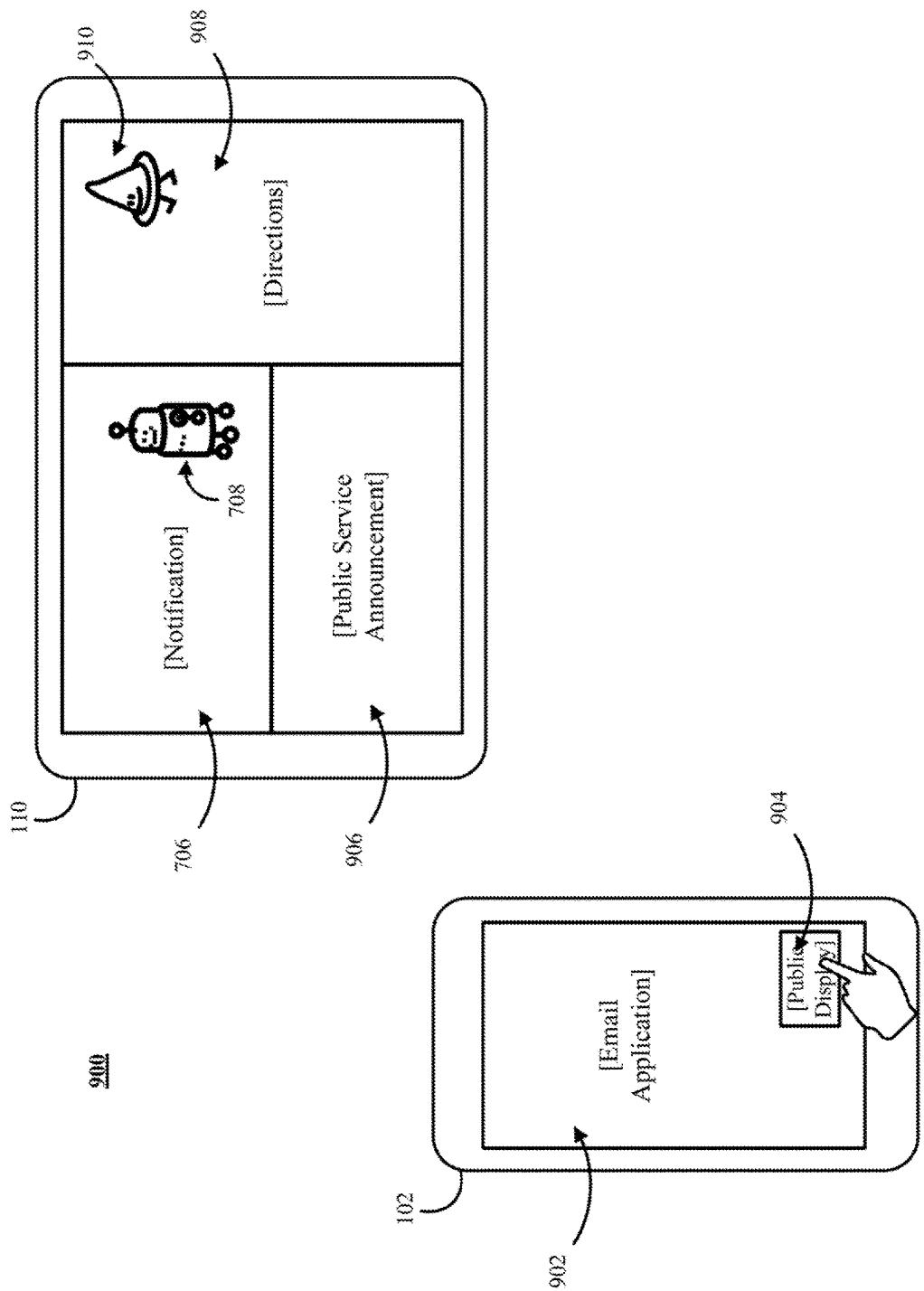

FIG. 9A shows an example 900 of a user interface 902 that includes content that can be presented using one or more public display devices. In some implementations, user interface 902 can include a user input element 904 that, when selected, can cause at least a portion of the content presented by user interface 902 to be presented by one or more public display devices. For example, selection of user input 904 can initiate presentation of at least a portion of the content presented by user interface 902 as described above in connection with 402.

Additionally or alternatively, selection of user input 904 can cause any other suitable content to be presented. For example, selection of user input 904 can cause content to be presented that is not currently presented by user interface 902 but that is associated with an application that caused user interface 902 to be presented.

As shown in FIG. 9A, display device 110 of example 900 is presenting content 706 which, as described above in connection with FIG. 7A, can include one or more notifications for a user associated with avatar 708. Additionally, display device 110 is presenting a public service announcement 906 which can include any suitable content, and directions 908 for a user associated with an avatar 910.

Figure 9B:
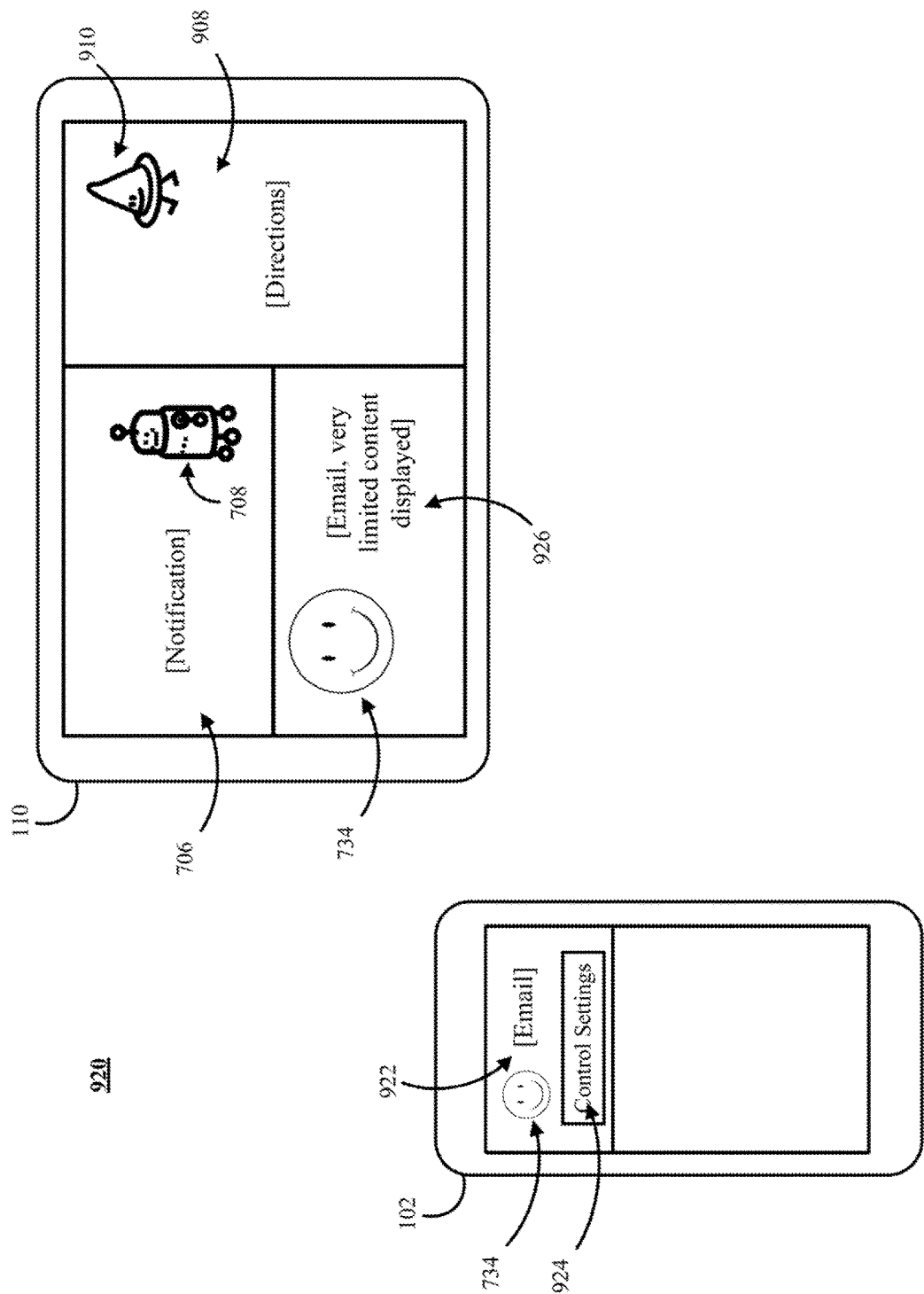

FIG. 9B shows an example 920 of user interface 922 that identifies content that is being presented by a public display device (e.g., as described above in connection with user interface 732 of FIG. 7C) and presents avatar 734 associated with a user of user device 102 in accordance with some implementations of the disclosed subject matter. In some implementations, example 920 shows user device 102 and display device 110 at a time after presentation of content is requested based on selection of user input 904.

In some implementations, user interface 922 can include a user input element 924 that can cause a user interface for changing control settings to be presented. As described above in connection with FIG. 8, a user selection to change the control settings can cause the content that is being presented to be changed.

As shown in FIG. 9B, display device 110 can present notification 706 and directions 908 that were being presented by display device 110 as shown in example 900 of FIG. 9A. In some implementations, display device 110 can also present content 926 and include avatar 734, in response to selection of user input element 904. As described above in connection with FIG. 8, in some implementations, the content that is presented can be limited based on control settings associated with a user of user device 102 (e.g., based on user account information of a user account associated with content 926), based on control settings associated with user device 102, based on information related to display device 110 (e.g., how many other users are using the display device to present content, how many people are around, etc.), based on a distance between display device 110 and user device 102, and/or based on any other suitable factor or combination of factors. For example, as shown in FIG. 9B, content 926 can be very limited based on the nature of the content (e.g., email can include a large amount of personal information and/or sensitive information), based on user settings, based on a distance between user device 102 and display device 110, and based on a size at which content 926 is presented. Limiting the content that is presented can, for example, include presenting only an amount of emails that are unread, a portion of the subject of a number of emails (where the number can be selected based on any suitable factor or factors), etc.

Figure 9C:
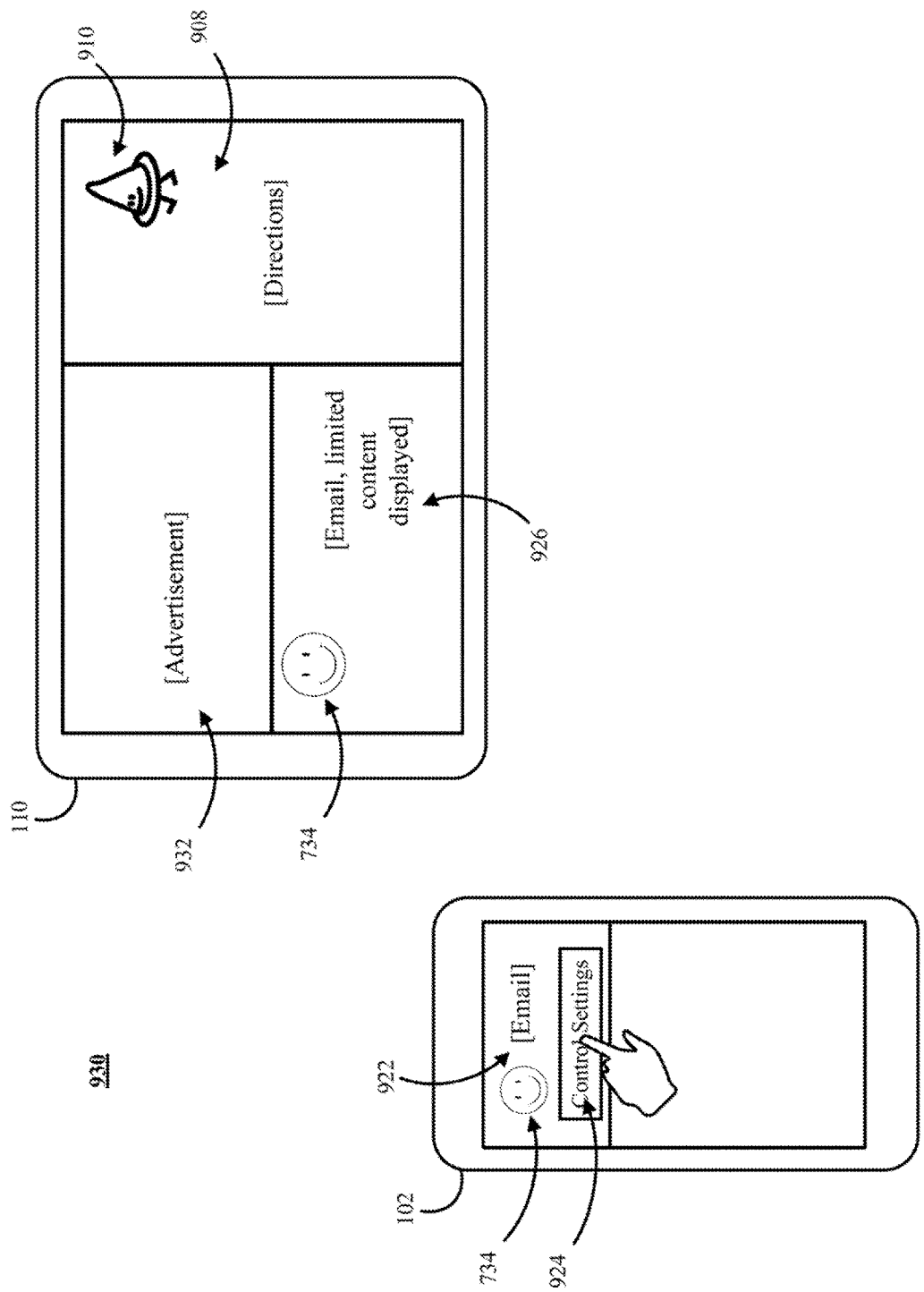

FIG. 9C shows an example 930 of user interface 922 presented by user device 102 and display device 110 presenting content associated with user interface 922 in accordance with some implementations of the disclosed subject matter. As shown in FIG. 9C, notification 706 has been replaced by an advertisement 932. Further, avatar 734 is presented at a smaller size relative to a window in which content 926 is presented (and/or relative to a size at which content 926 is presented). In some implementations, avatar 734 can be presented at a smaller size in response to any suitable change in circumstances and/or any other suitable criterion or criteria being met. For example, as described above in connection with FIG. 7D, avatar 734 can be presented at a smaller size in response to user device 102 moving closer to display device 110. As also shown in FIG. 9B, the content included in content 926 can be less limited based on the control settings having changed in response to changed circumstances (e.g., as described above in connection with process 800 of FIG. 8). In particular in FIG. 9C, the control settings may have changed based on user device 102 moving closer to display device 110 and/or based on notification 706 no longer being presented which can indicate, for example, that a user associated with notification 706 is no longer using display device 110. As also shown in FIG. 9C, a user is selecting user input 924 to cause a user interface for altering the control settings to be presented.

Figure 9D:
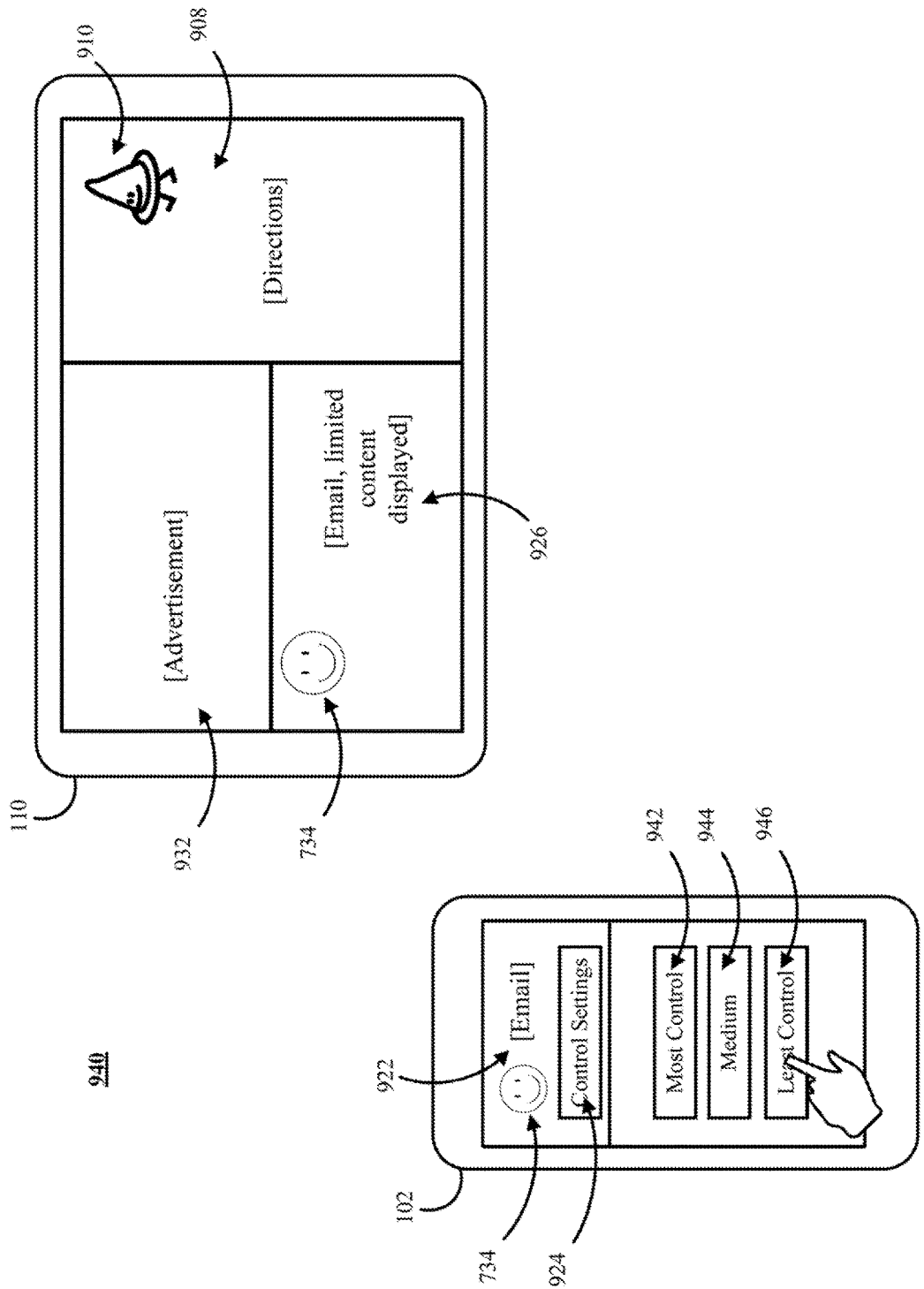

FIG. 9D shows an example 940 of user interface 922 including user input elements 942-946 for selection of a control level associated with user device 102 for presenting content in accordance with some implementations of the disclosed subject matter. In some implementations, a control level that is currently selected (if any) can be highlighted or otherwise indicated using any suitable technique or combination of techniques.

Although three control settings are shown in FIG. 9D, any suitable number of control settings can be presented and any suitable technique or combination of techniques can be used to adjust control settings. For example, in some implementations, control settings can be presented as one or more qualitative levels (e.g., high, medium, low), one or more quantitative levels (e.g., a number on a predetermined scale), descriptively (e.g., stating what content will be presented and what content will not be presented for each setting), using any other suitable technique or combination of techniques, or any suitable combination thereof.

In some implementations, a control level can be selected and/or adjusted using any suitable technique or combination of techniques. For example, a control level can be selected based on a selection of a user input corresponding to the control setting (which can be a software button as shown in FIG. 9D, a radio button, a check box, and/or any other suitable input). As another example, a control level can be selected based on a selection of a position of a slider corresponding to various control levels. As yet another example, a control level can be selected using a text input.

Figure 9E:
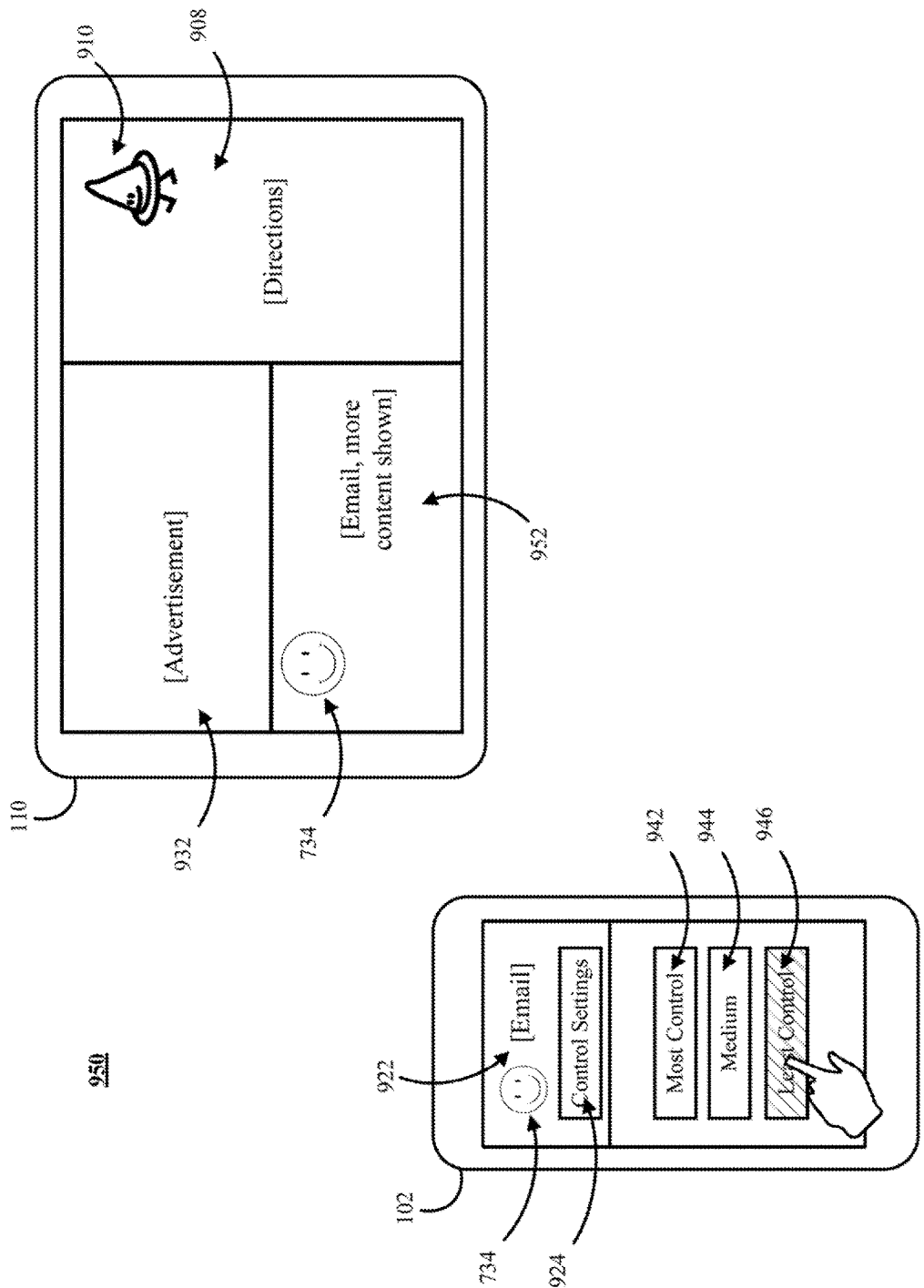

FIG. 9E shows an example 950 of user interface 922 after a particular control setting has been selected based on received input in accordance with some implementations of the disclosed subject matter. As shown in FIG. 9E, user input 946 is highlighted to indicate that it is a currently selected control level (e.g., based on a selection by a user shown in FIG. 9D). In some implementations, such as in accordance with process 800 described above in connection with FIG. 8, content 952 can include more content than is shown in example 940 of FIG. 9D. In some implementations, content 952 can still not include certain personal information and/or sensitive information despite the control level being set to the least restrictive setting by a user. For example, presentation of financial information such as account numbers can be inhibited, but an email address of a sender of an email can be presented where it would not have been presented in example 940.

FIG. 9F shows an example 960 where display device 110 presents content associated with user interface 922 without any restrictions in accordance with some implementation of the disclosed subject matter. As shown in FIG. 9F, content 962 can include the content that was requested for presentation with no restrictions. In some implementations, a size of a window in which content 962 is presented can be smaller than a window where content is presented with at least some level of restrictions, which can, for example, make it less likely that another user will be able to perceive information presented in content 962.

In some implementations, content 962 can be presented in response to any suitable change in circumstances and/or user input (e.g., as described above in connection with process 800 of FIG. 8). For example, if a distance between user device 102 and display device 110 is less than or equal to a threshold distance (e.g., two feet, three feet, etc.), content 962 can be presented. As another example, an input can be received by user device 102 indicating that content is to be presented with no restrictions. As yet another example, user device 102 (and/or any other suitable device) can be brought into proximity to a sensor that can verify that a user of user device 102 is requesting that content be presented without restrictions. As yet another example, a touchscreen input of display device 110 can be used to indicate that content is to be presented without restriction (which can require that a user's identity be verified using any suitable technique or combination of techniques such as by using credentials, biometrics, a physical token associated with the user, etc.).

In some implementations, when the window including content 962 decreases in size a space between windows can be used to present any suitable content, such as a background image 964, an advertisement, content associated with another user, any other suitable content, no content (e.g., a blank screen), or any suitable combination thereof.

In some implementations, the mechanisms described herein can include server-side software, client-side software, server-side hardware, client-side hardware, firmware, or any suitable combination thereof. For example, these mechanisms can encompass one or more web pages or web page portions (e.g., via any suitable encoding, such as Hyper Text Markup Language ("HTML"), Dynamic Hyper Text Markup Language ("DHTML"), Extensible Markup Language ("XML"), JavaServer Pages ("JSP"), Active Server Pages ("ASP"), Cold Fusion, or any other suitable approaches). As another example, these mechanisms can encompass a computer program that causes a processor (such as hardware processor 302, hardware processor 312 and/or hardware processor 322) to execute the mechanisms described herein. In a more particular example, these mechanisms can encompass one or more computer programs written in a programming language recognizable by user device 102, display device 110 and/or server 220 that is executing at least a portion of the mechanisms (e.g., a program written in a programming language, such as, Java, C, Objective-C, C++, C#, JavaScript, Visual Basic, HTML, XML, ColdFusion, any other suitable approaches, or any suitable combination thereof).

As described above, in situations in which the mechanisms described herein collect personal information about users, or can make use of personal information, the users can be provided with an opportunity to control whether programs or features collect user information (e.g., information about user actions stored on a user device 102, information about user actions stored on a remote device such as server 220, information about content presented by display device 110, etc.), and/or to control whether and/or how much personal information is presented and/or shared. In addition, certain data can be treated in one or more ways before it is stored or used, so that personal information is removed. For example, a user's identity can be treated so that no personal information can be determined for the user, or a user's geographic location can be generalized where location information is obtained (such as to a city block, a city, a ZIP code, or a state level), so that a particular location of a user cannot be determined. Thus, the user can have control over how information is collected about the user and used by a content server.

In some implementations, any suitable computer readable media can be used for storing instructions for performing the functions and/or processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In some implementations of the disclosed subject matter, the above described steps of the processes of FIGS. 4, 5A-5C, 6A-6C, and 8 can be executed or performed in any order or sequence not limited to the order and sequence shown and described in the figures. Also, some of the above steps of the processes of FIGS. 4, 5A-5C, 6A-6C, and 8 can be executed or performed substantially simultaneously where appropriate or in parallel to reduce latency and processing times. Furthermore, it should be noted that FIGS. 4, 5A-5C, 6A-6C, and 8 are provided as examples only. At least some of the steps shown in these figures may be performed in a different order than represented, performed concurrently, or omitted.

The provision of the examples described herein (as well as clauses phrased as "such as," "e.g.," "including," and the like) should not be interpreted as limiting the claimed subject matter to the specific examples; rather, the examples are intended to illustrate only some of many possible aspects. It should also be noted that, as used herein, the term mechanism can encompass hardware, software, firmware, or any suitable combination thereof.

Accordingly, methods, systems, and media for presenting requested content on public display devices are provided.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A method for presenting content on a public display device, the method comprising:
- receiving, using a hardware processor, a request from a mobile device to present content on a display device, wherein the request includes location information associated with the mobile device;
- selecting, without user input, a first display device from a plurality of display devices on which to present the content based at least in part on the location information associated with the mobile device and location information associated with each of the plurality of display devices;
- in response to selecting the first display device, causing a graphical representation associated with a user account of the mobile device and at least a first portion of the content to be presented by the first display device;
- selecting, without user input, a second display device from the plurality of display devices on which to present at least a second portion of the content based at least in part on updated location information associated with the mobile device and the location information associated with each of the plurality of display devices; and
- in response to selecting the second display device, causing the graphical representation associated with the user account of the mobile device and the second portion of the content to be presented by the second display.

2. The method of claim 1, further comprising receiving display device information associated with each of the plurality of display devices, wherein the display device information associated with each of the plurality of display devices includes the location information associated with that display device and an indication that the display device is configured to present content associated with mobile devices.

3. The method of claim 1, further comprising inhibiting presentation of the graphical representation associated with the user of the mobile device and presentation of the content by the first display device.

4. The method of claim 1, further comprising determining an address associated with the content, wherein causing the first portion of the content to be presented on the first display device comprises communicating the address to the first display device with instructions to retrieve and present content using the address.

5. The method of claim 1, further comprising:
- determining that the mobile device has moved closer with respect to the first display device based at least in part on the updated location information associated with the mobile device and location information associated with the first display device; and
- in response to determining that the mobile device has moved closer to the first display device, causing the graphical representation associated with the user of the mobile device to be presented by the first display device at a size that is smaller than a size at which the graphical representation was originally presented.

6. The method of claim 1, further comprising:
- determining an initial control setting to be used in determining whether to present personal information on the first display device of the plurality of display devices based at least in part on the display information associated with the first display device; and
- controlling presentation of personal information associated with the first portion of the content based on the initial setting.

7. The method of claim 6, wherein the display device information associated with the first display device includes information indicating a number of potential observers detected to be in a viewable area associated with the first display device.

8. The method of claim 6, wherein the determination of the initial control setting is further based on a distance determined based on the location information associated with the mobile device and the location information associated with the first display device.

9. The method of claim 6, further comprising:
- receiving an indication of an updated control level from the mobile device;
- determining an updated control setting based at least in part on the updated control level and the initial control setting; and
- controlling presentation of personal information associated with the content based on the updated control setting.

10. The method of claim 1, further comprising:
- determining that the content is associated with an application;
- in response to determining that the content is associated with the application, determining that presentation of content associated with the application is permitted based on user settings associated with the mobile device; and
- in response to determining that presentation of content associated with the application is permitted, causing the first portion of the content to be presented.

11. A system for presenting content on a public display device, the system comprising:
- a memory; and
- a hardware processor that, when executing computer-executable instructions stored in the memory, is configured to:
  - receive a request from a mobile device to present content on a display device, wherein the request includes location information associated with the mobile device;
  - select, without user input, a first display device from a plurality of display devices on which to present the content based at least in part on the location information associated with the mobile device and location information associated with each of the plurality of display devices;
  - in response to selecting the first display device, cause a graphical representation associated with a user account of the mobile device and at least a first portion of the content to be presented by the first display device;
  - select, without user input, a second display device from the plurality of display devices on which to present at least a second portion of the content based at least in part on updated location information associated with the mobile device and the location information associated with each of the plurality of display devices; and
  - in response to selecting the second display device, cause the graphical representation associated with the user account of the mobile device and the second portion of the content to be presented by the second display.

12. The system of claim 11, wherein the hardware processor is further configured to receive display device information associated with each of the plurality of display devices, wherein the display device information associated with each of the plurality of display devices includes the location information associated with that display device and an indication that the display device is configured to present content associated with mobile devices.

13. The system of claim 11, wherein the hardware processor is further configured to inhibit presentation of the graphical representation associated with the user of the mobile device and presentation of the content by the first display device.

14. The system of claim 11, wherein the hardware processor is further configured to determine an address associated with the content, wherein causing the first portion of the content to be presented on the first display device comprises communicating the address to the first display device with instructions to retrieve and present content using the address.

15. The system of claim 11, wherein the hardware processor is further configured to:
determine that the mobile device has moved closer with respect to the first display device based at least in part on the updated location information associated with the mobile device and location information associated with the first display device; and
in response to determining that the mobile device has moved closer to the first display device, cause the graphical representation associated with the user of the mobile device to be presented by the first display device at a size that is smaller than a size at which the graphical representation was originally presented.

16. The system of claim 11, wherein the hardware processor is further configured to:
determine an initial control setting to be used in determining whether to present personal information on the first display device of the plurality of display devices based at least in part on the display information associated with the first display device; and
control presentation of personal information associated with the first portion of the content based on the initial setting.

17. The system of claim 16, wherein the display device information associated with the first display device includes information indicating a number of potential observers detected to be in a viewable area associated with the first display device.

18. The system of claim 16, wherein the determination of the initial control setting is further based on a distance determined based on the location information associated with the mobile device and the location information associated with the first display device.

19. The system of claim 16, wherein the hardware processor is further configured to:
receive an indication of an updated control level from the mobile device;
determining an updated control setting based at least in part on the updated control level and the initial control setting; and
control presentation of personal information associated with the content based on the updated control setting.

20. The system of claim 11, wherein the hardware processor is further configured to:
determine that the content is associated with an application;
in response to determining that the content is associated with the application, determine that presentation of content associated with the application is permitted based on user settings associated with the mobile device; and
in response to determining that presentation of content associated with the application is permitted, cause the first portion of the content to be presented.

21. A non-transitory computer-readable medium containing computer executable instructions that, when executed by a processor, cause the processor to perform a method for presenting content on a public display device, the method comprising:
receiving a request from a mobile device to present content on a display device, wherein the request includes location information associated with the mobile device;
selecting, without user input, a first display device from a plurality of display devices on which to present the content based at least in part on the location information associated with the mobile device and location information associated with each of the plurality of display devices;
in response to selecting the first display device, causing a graphical representation associated with a user account of the mobile device and at least a first portion of the content to be presented by the first display device;
selecting, without user input, a second display device from the plurality of display devices on which to present at least a second portion of the content based at least in part on updated location information associated with the mobile device and the location information associated with each of the plurality of display devices; and
in response to selecting the second display device, causing the graphical representation associated with the user account of the mobile device and the second portion of the content to be presented by the second display.

* * * * *